COMMUNICATION EQUIPMENT SET, KEYBOARD, PRINTER AND RECORDER

Filed April 3, 1962

INVENTORS
CLAYTON H. CLARK
DONALD J. STEFANIK
BY Strauch, Nolan & Neale
ATTORNEYS INVENTORS
CLAYTON H. CLARK
DONALD J. STEFANIK
BY Strauch, Nolan & Neale
ATTORNEYS
P-887

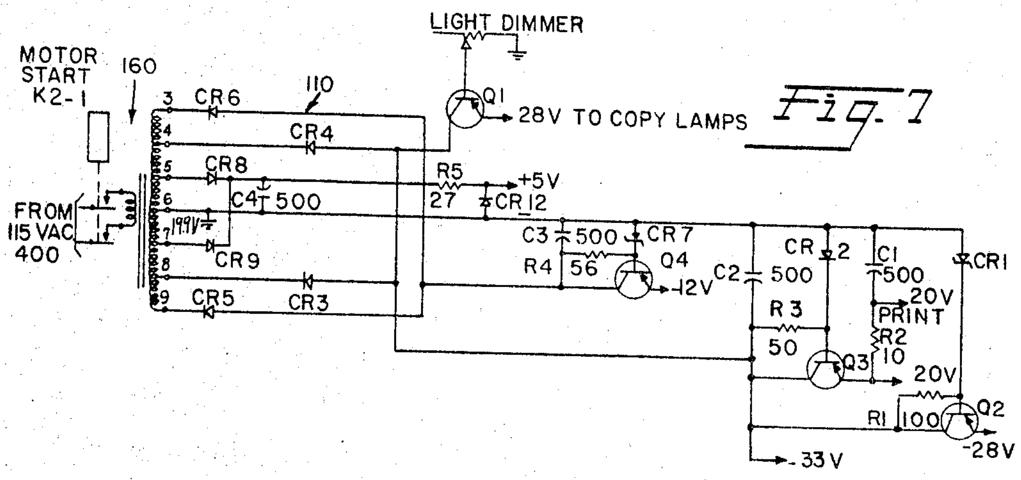

FIG. 7

| START STOP MACHINE ALPHABET | | | | | | | | | |
|---|---|---|---|---|---|---|---|---|---|
| COMMUNICATION & WEATHER LETTERS | COMMUNI-CATIONS FIGURES | WEATHER FIGURES | NUMBER OF IMPULSES START | 1 | 2 | 3 | 4 | 5 | STOP |
| A | — | ↑ | | ▨ | ▨ | | | | ▨ |
| B | ? | ⊕ | | ▨ | | | ▨ | ▨ | ▨ |
| C | : | ○ | | | ▨ | ▨ | ▨ | | ▨ |
| D | $ | ↗ | | ▨ | | | ▨ | | ▨ |
| E | 3 | 3 | | ▨ | | | | | ▨ |
| F | ! | → | | ▨ | | ▨ | ▨ | | ▨ |
| G | & | ↘ | | | ▨ | | ▨ | ▨ | ▨ |
| H | # | ↓ | | | | ▨ | | ▨ | ▨ |
| I | 8 | 8 | | | ▨ | ▨ | | | ▨ |
| J | ' | ↙ | | ▨ | ▨ | | ▨ | | ▨ |
| K | ( | ← | | ▨ | ▨ | ▨ | ▨ | | ▨ |
| L | ) | ↖ | | | ▨ | | | ▨ | ▨ |
| M | . | . | | | | ▨ | ▨ | ▨ | ▨ |
| N | , | ⦶ | | | | ▨ | ▨ | | ▨ |
| O | 9 | 9 | | | | | ▨ | ▨ | ▨ |
| P | Ø | Ø | | | ▨ | ▨ | | ▨ | ▨ |
| Q | 1 | 1 | | ▨ | ▨ | ▨ | | ▨ | ▨ |
| R | 4 | 4 | | | ▨ | | ▨ | | ▨ |
| S | BELL | BELL | | ▨ | | ▨ | | | ▨ |
| T | 5 | 5 | | | | | | ▨ | ▨ |
| U | 7 | 7 | | ▨ | ▨ | ▨ | | | ▨ |
| V | ; | ⦶ | | | ▨ | ▨ | ▨ | ▨ | ▨ |
| W | 2 | 2 | | ▨ | ▨ | | | ▨ | ▨ |
| X | / | / | | ▨ | | ▨ | ▨ | ▨ | ▨ |
| Y | 6 | 6 | | ▨ | | ▨ | | ▨ | ▨ |
| Z | " | + | | ▨ | | | | ▨ | ▨ |
| BLANK | — | — | | | | | | | ▨ |
| LINE FEED | | | | | ▨ | | | | ▨ |
| LETTERS | | | | ▨ | ▨ | ▨ | ▨ | ▨ | ▨ |
| FIGURES | | | | ▨ | ▨ | | ▨ | ▨ | ▨ |
| SPACE | | | | | | ▨ | | | ▨ |
| CARRIAGE RETURN | | | | | | | ▨ | | ▨ |

NOTE: ▨ = MARKING SIGNAL
□ = SPACING SIGNAL

FIG. 5

INVENTORS
CLAYTON H. CLARK
DONALD J. STEFANIK
BY Strauch, Nolan + Neale
ATTORNEYS
P-887

INVENTORS
CLAYTON H. CLARK
DONALD J. STEFANIK
BY Strauch, Nolan & Neale
ATTORNEYS COMMUNICATION EQUIPMENT SET, KEYBOARD, PRINTER AND RECORDER
Filed April 3, 1962
40 Sheets-Sheet 5
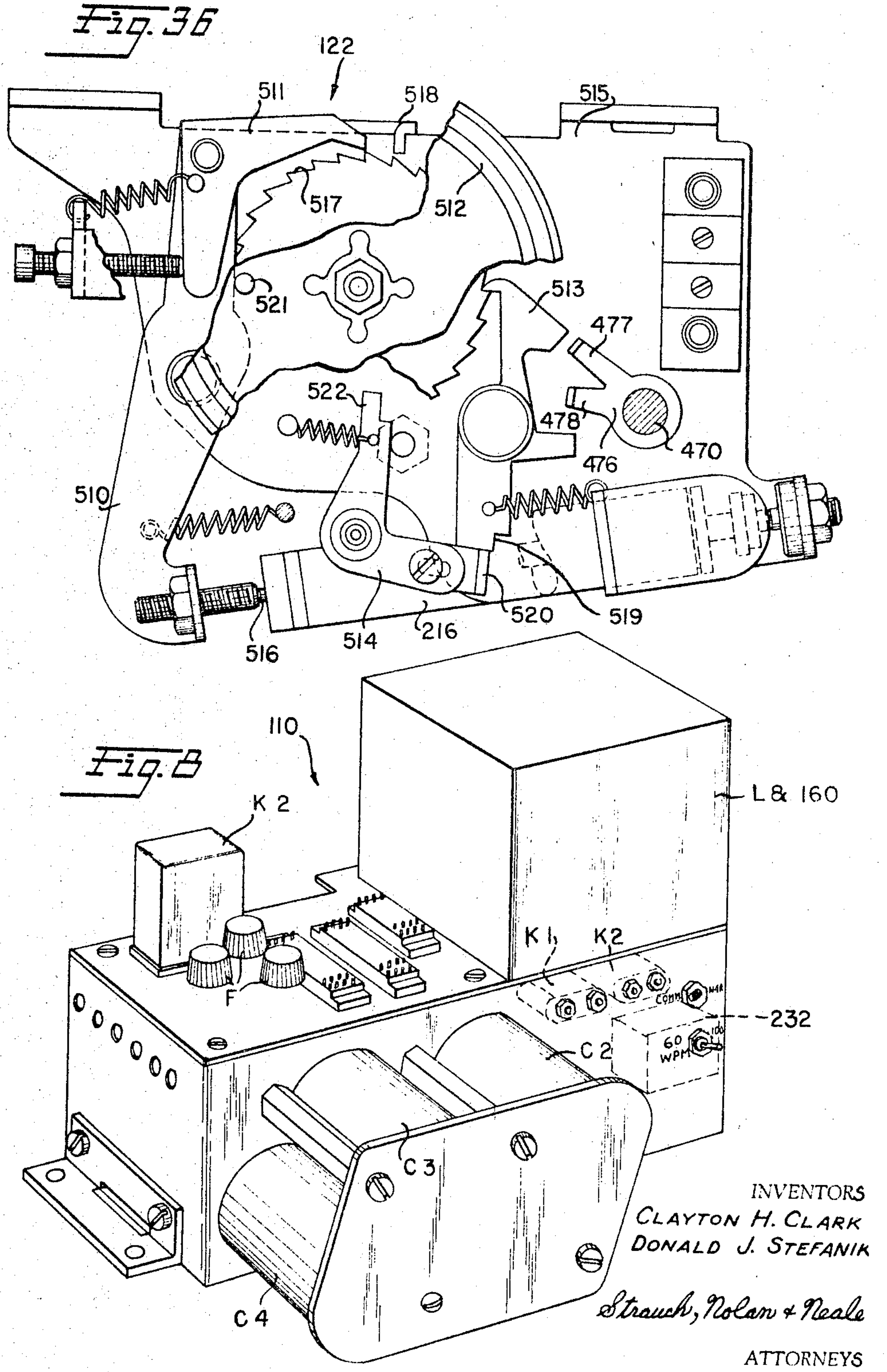
Fig. 36 Fig. B
INVENTORS
CLAYTON H. CLARK
DONALD J. STEFANIK
Strauch, Nolan + Neale
ATTORNEYS INVENTORS
CLAYTON H. CLARK
DONALD J. STEFANIK
BY Strauch, Nolan & Neale
ATTORNEYS
P-887

COMPONENTS NOT ON MODE PANEL ARE SHOWN FOR REFERENCE ONLY.
MODE PANEL RELAY COILS ARE 500 OHMS.
P/O INDICATES "PART OF"

INVENTORS
CLAYTON H. CLARK
DONALD J. STEFANIK
BY Strauch, Nolan & Neale
ATTORNEYS INVENTORS
CLAYTON H. CLARK
DONALD J. STEFANIK
Strauch, Nolan & Neale
ATTORNEYS
P-887

A. INVERTER (Q1 FOR DRIVERS IS 2N458); B. PEDESTAL GATE; C. DELAY; D. SINGLE DIODE GATE; E. OR GATE WITH INHIBITOR; F. OR GATE; G. NOR GATE; H. NAND GATE; J. AND GATE; K. REGISTER; L. ONE SHOT; M. COUNTER OR DIVIDER; N. FREE-RUNNING MULTIVIBRATOR; P. EMITTER FOLLOWER

INVENTORS
CLAYTON H. CLARK
DONALD J. STEFANIK
BY
Strauch, Nolan + Neale
ATTORNEYS
P-887

INVENTORS
CLAYTON H. CLARK
DONALD J. STEFANIK
BY Strauch, Nolan & Neale
ATTORNEYS
P-887

INVENTORS
CLAYTON H. CLARK
DONALD J. STEFANIK

BY Strauch, Nolan & Neale

ATTORNEYS

INVENTORS
CLAYTON H. CLARK
DONALD J. STEFANIK
BY Strauch, Nolan & Neale
ATTORNEYS
P-887

| ↑ | ↓ | BAUDOT 54321 | BINARY POSITION | COUNT SET INTO COUNTER |
|---|---|---|---|---|
| 3 | E | 00001 | 2 | (14) |
| - | A | 00011 | 4 | (12) |
| BELL | S | 00101 | 6 | (10) |
| 8 | I | 00110 | 7 | (9) |
| 7 | U | 00111 | 8 | (8) |
| $ | D | 01001 | 10 | (6) |
| 4 | R | 01010 | 11 | (5) |
| ' | J | 01011 | 12 | (4) |
| , | N | 01100 | 13 | (3) |
| ! | F | 01101 | 14 | (2) |
| : | C | 01110 | 15 | (1) |
| ( | K | 01111 | 16 | (0) |
| 5 | T | 10000 | 17 | (31) |
| " | Z | 10001 | 18 | (30) |
| ) | L | 10010 | 19 | (29) |
| 2 | W | 10011 | 20 | (28) |
| # | H | 10100 | 21 | (27) |

| ↑ | ↓ | BAUDOT 54321 | BINARY POSITION | COUNT SET INTO COUNTER |
|---|---|---|---|---|
| 6 | Y | 10101 | 22 | (26) |
| Ø | P | 10110 | 23 | (25) |
| I | Q | 10111 | 24 | (24) |
| 9 | O | 11000 | 25 | (23) |
| ? | B | 11001 | 26 | (22) |
| & | G | 11010 | 27 | (21) |
| . | M | 11100 | 29 | (19) |
| / | X | 11101 | 30 | (18) |
| ; | V | 11110 | 31 | (17) |
| | FIGS. | 11011 | 28 | (20) |
| | LTRS. | 11111 | 32 | (16) |
| | SPACE | 00100 | 5 | (11) |
| | CAR.RET. | 01000 | 9 | (7) |
| | LINE FEED | 00010 | 3 | (13) |
| | BLANK | 00000 | 1 | (15) |

INVENTORS
CLAYTON H. CLARK
DONALD J. STEFANIK
BY Strauch, Nolan & Neale
ATTORNEYS Oct. 18, 1966 C. H. CLARK ETAL 3,280,256

COMMUNICATION EQUIPMENT SET, KEYBOARD, PRINTER AND RECORDER

Filed April 3, 1962

40 Sheets-Sheet 14

INVENTORS

CLAYTON H. CLARK

DONALD J. STEFANIK

BY Strauch, Nolan & Neale

ATTORNEYS

P-887

Oct. 18, 1966 C. H. CLARK ETAL 3,280,256

COMMUNICATION EQUIPMENT SET, KEYBOARD, PRINTER AND RECORDER

Filed April 3, 1962

40 Sheets-Sheet 15

INVENTORS

CLAYTON H. CLARK

DONALD J. STEFANIK

BY Strauch, Nolan & Neale

ATTORNEYS

P-887

INVENTORS
CLAYTON H. CLARK
DONALD J. STEFANIK

BY Strauch, Nolan & Neale
ATTORNEYS
P-887

INVENTORS
CLAYTON H. CLARK
DONALD J. STEFANIK
BY Strauch, Nolan & Neale
ATTORNEYS
P-887

INVENTORS
CLAYTON H. CLARK
DONALD J. STEFANIK
BY Strauch, Nolan + Neale
ATTORNEYS
P-887

INVENTORS
CLAYTON H. CLARK
DONALD J. STEFANIK

BY Strauch, Nolan & Neale

ATTORNEYS
P-887

INVENTORS
Clayton H. Clark
Donald J. Stefanik
BY Strauch, Nolan & Neale
ATTORNEYS
P-887

Oct. 18, 1966 C. H. CLARK ETAL 3,280,256

COMMUNICATION EQUIPMENT SET, KEYBOARD, PRINTER AND RECORDER

Filed April 3, 1962

40 Sheets-Sheet 21

INVENTORS
CLAYTON H. CLARK
DONALD J. STEFANIK

BY Strauch, Nolan + Neale

ATTORNEYS

INVENTORS
CLAYTON H. CLARK
DONALD J. STEFANIK
BY Strauch, Nolan & Neale
ATTORNEYS

INVENTORS
CLAYTON H. CLARK
DONALD J. STEFANIK

BY

Strauch, Nolan + Neale
ATTORNEYS
P-887

INVENTORS
CLAYTON H. CLARK
DONALD J. STEFANIK

BY Strauch, Nolan + Neale
ATTORNEYS

INVENTORS
CLAYTON H. CLARK
DONALD J. STEFANIK

BY Strauch, Nolan + Neale

ATTORNEYS
P-887

INVENTORS
CLAYTON H. CLARK
DONALD J. STEFANIK

BY Strauch, Nolan & Neale
ATTORNEYS
P-887

Oct. 18, 1966 C. H. CLARK ETAL 3,280,256

COMMUNICATION EQUIPMENT SET, KEYBOARD, PRINTER AND RECORDER

Filed April 3, 1962

40 Sheets-Sheet 27

INVENTORS
CLAYTON H. CLARK
DONALD J. STEFANIK

Strauch, Nolan + Neale

ATTORNEYS

INVENTORS
CLAYTON H. CLARK
DONALD J. STEFANIK
BY Strauch, Nolan & Neale
ATTORNEYS Oct. 18, 1966 C. H. CLARK ETAL 3,280,256

COMMUNICATION EQUIPMENT SET, KEYBOARD, PRINTER AND RECORDER

Filed April 3, 1962 40 Sheets-Sheet 29

INVENTORS
CLAYTON H. CLARK
DONALD J. STEFANIK

BY Strauch, Nolan & Neale
ATTORNEYS

INVENTORS
CLAYTON H. CLARK
DONALD J STEFANIK

BY

Strauch, Nolan & Neale
ATTORNEYS
P-887

INVENTORS
CLAYTON H. CLARK
DONALD J. STEFANIK
BY Strauch, Nolan + Neale
ATTORNEYS INVENTORS
CLAYTON H. CLARK
DONALD J. STEFANIK
BY Strauch, Nolan & Neale
ATTORNEYS
P-887

Oct. 18, 1966 C. H. CLARK ETAL 3,280,256

COMMUNICATION EQUIPMENT SET, KEYBOARD, PRINTER AND RECORDER

Filed April 3, 1962

40 Sheets-Sheet 33

INVENTORS
CLAYTON H. CLARK
DONALD J. STEFANIK

BY Strauch, Nolan & Neale

ATTORNEYS

INVENTORS
CLAYTON H. CLARK
DONALD J. STEFANIK

BY Strauch, Nolan + Neale
ATTORNEYS

INVENTORS
CLAYTON H. CLARK
DONALD J. STEFANIK

BY Strauch, Nolan & Neale

ATTORNEYS
P-887

INVENTORS
CLAYTON H. CLARK
DONALD J. STEFANIK
BY Strauch, Nolan & Neale
ATTORNEYS
P-837

INVENTORS
CLAYTON H. CLARK
DONALD J. STEFANIK
BY Strauch, Nolan & Neale
ATTORNEYS
P-887

COMMUNICATION EQUIPMENT SET, KEYBOARD, PRINTER AND RECORDER

INVENTORS
CLAYTON H. CLARK
DONALD J. STEFANIK

BY *Strauch, Nolan + Neale*

ATTORNEYS

INVENTORS
CLAYTON H. CLARK
DONALD J. STEFANIK

BY Strauch, Nolan & Neale
ATTORNEYS

COMMUNICATION EQUIPMENT SET, KEYBOARD, PRINTER AND RECORDER

Filed April 3, 1962

40 Sheets-Sheet 40

INVENTORS
CLAYTON H. CLARK
DONALD J. STEFANIK

BY Strauch, Nolan & Neale

ATTORNEYS
P-887

3,280,256
COMMUNICATION EQUIPMENT SET, KEYBOARD, PRINTER AND RECORDER

Clayton H. Clark, Mundelein, and Donald J. Stefanik, Berwyn, Ill., assignors to SCM Corporation, New York, N.Y., a corporation of New York Filed Apr. 3, 1962, Ser. No. 184,820
13 Claims. (Cl. 178—79)

This invention relates to a communications equipment set, primarily intended for use in telegraphic communication. However, it may be adapted for use with other data processing applications and particularly relates to an encoding keyboard, a drum type printer, a magnetic tape recorder and related control equipment.

This equipment was developed to serve a telegraphic station use which required two or more interconnected teletypewriter sets with provision for utilizing simultaneous sending and receiving, for example, two separate line calls should be capable of being received on the two printers while a third call is being simultaneously sent on another line from the keyboard or the recorder.

The inventive equipment is versatile, compact and reliable and to this end: various new concepts of mechanism and operation are incorporated in a small keyboard having keys arranged with standard typewriter spacing and constructed in a weatherproof manner to the maximum feasible extent; a completely new, extremely small, magnetic tape recorder was developed, capable of remote control of record, rewind and playback operations; a drum type continuously rotating page printer was developed incorporating many novel subcomponents such as specific relatively inexpensive drum construction, paper feed mechanism and the print hammer carriage mechanism with its feed and carriage return mechanisms, as well as some conventional subcomponents such as the ribbon feed and reverse mechanisms; and various electronics which inter-relate the major subcomponents during the different modes of operation were developed.

Accordingly, a primary object resides in the provision of a multiple bit code signal communication teletypewriter set including keyboard, printer and magnetic tape recording units and a common power supply unit and transistorized electronic controls for all units and a time base device for said keyboard transmitter.

Another object of this invention resides in the provision of a novel keyboard, transmitter, printer and tape recorder-reader set in which electronic circuits in the keyboard transmitter encode keyboard selections in both parallel and serial form in sequential order; electronic controls include a mode control means permitting selective code transmission output under control of the keyboard and of the recorder with monitoring in either case by the printer and further include means enabling conjoint transmission of serial code form information from the keyboard transmitter, at a transmission rate controlled by a time base device, to the printer and of the same information in parallel code form from the keyboard transmitter to the recorder-reader.

A further object resides in the provision of a novel keyboard, printer and tape recorder combination having inter-related electronic controls: the keyboard being constructed to mechanically encode key selected characters (or functions) to transfer the code to keyboard electronics circuits in parallel registered form and to selectively transfer such parallel form signal information (1) into recorder electronics or (2) into the inter-related electronics for conversion to line speed serial code form and transmission to the printer and a signal line with monitoring by the printer; the recorder having electronic controls enabling (1) receipt of parallel keyboard signals and conversion of such signals into high speed serial digital pulses together with coincidence synchronizing pulses and recording each coded signal and its coinciden synchronizing pulses in parallel record tracks on reco tape, or (2) transmission by playback and high spe electronic conversion of the played back recorded seri pulses into parallel pulses passed into the electronic ke board parallel register and hence through the inter-relat electronics for conversion to line speed serial code for and transmission to a signal line with monitoring by t printer.

Further novel features and other objects of this inve tion will become apparent from the following detailed d scription, discussion and the appended claims taken conjunction with the accompanying drawings showing preferred complete set, subcomponent structures, ele tronics and embodiments, in which:

FIGURE 5 is a chart which illustrates the standa weather and communication symbols corresponding to five unit Baudot code;

FIGURE 7 is a simplified schematic of a power supp circuit, one of which is included with each of Units and 2 in a set;

FIGURE 8 is a perspective view of the power supp subassembly showing several components which are phy cally mounted on the power supply unit but are not a tually in the power supply circuit;

Figure 1:
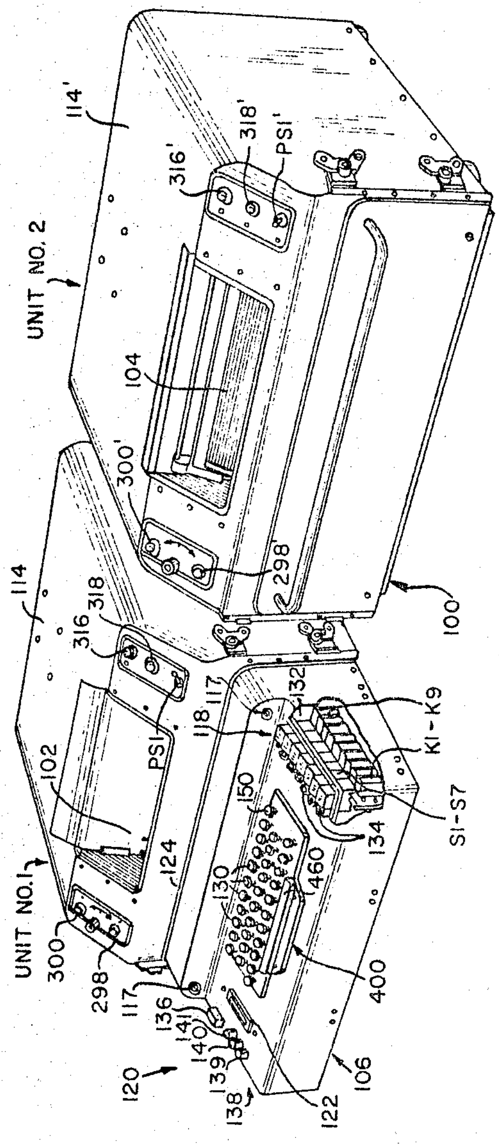
FIGURE 1 is a perspective view of a teletypewrit set constructed in accord with the present invention wi Unit 1 on the left and Unit 2 on the right.
Figure 11:
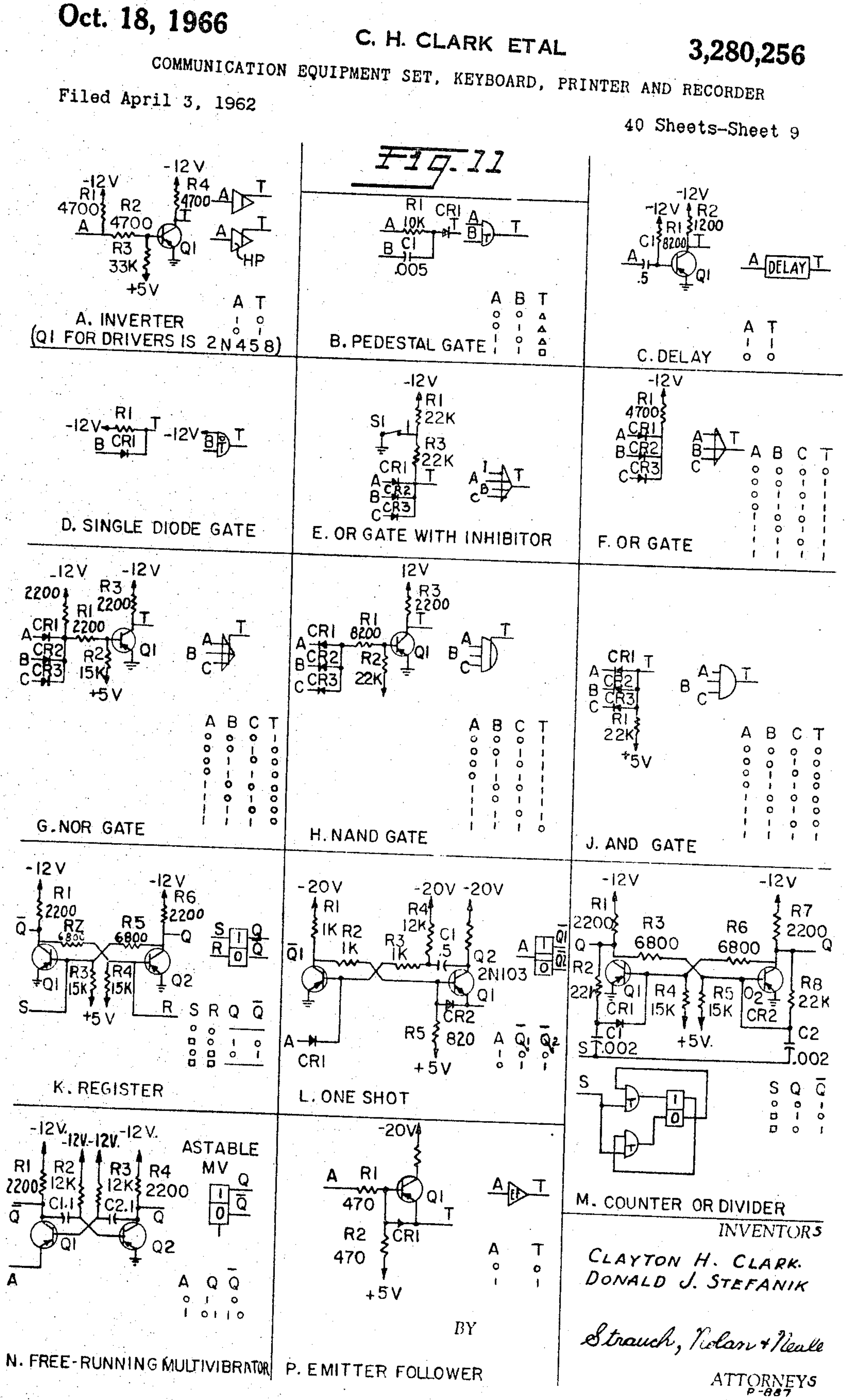
Figure 12A:
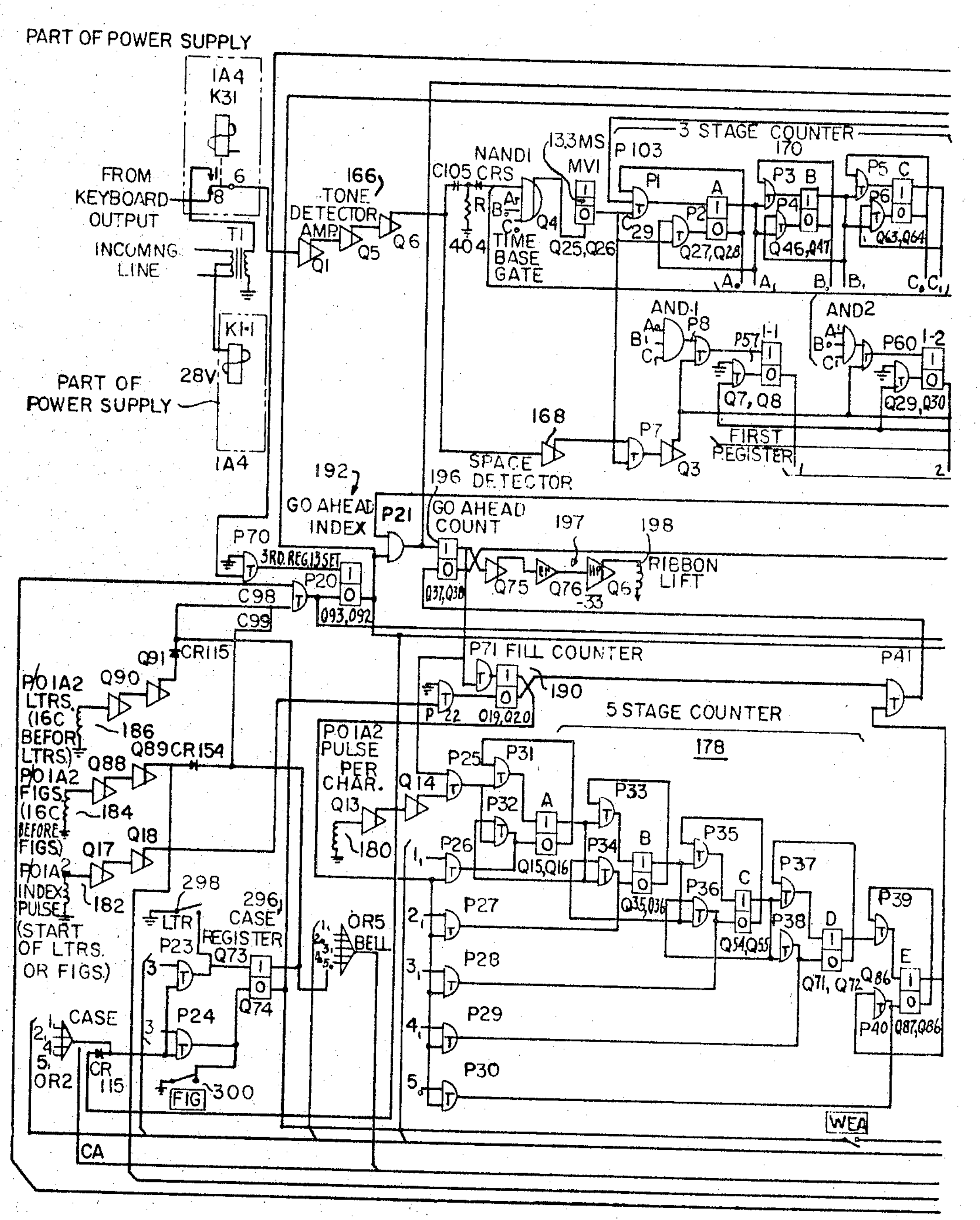
Figure 12B:
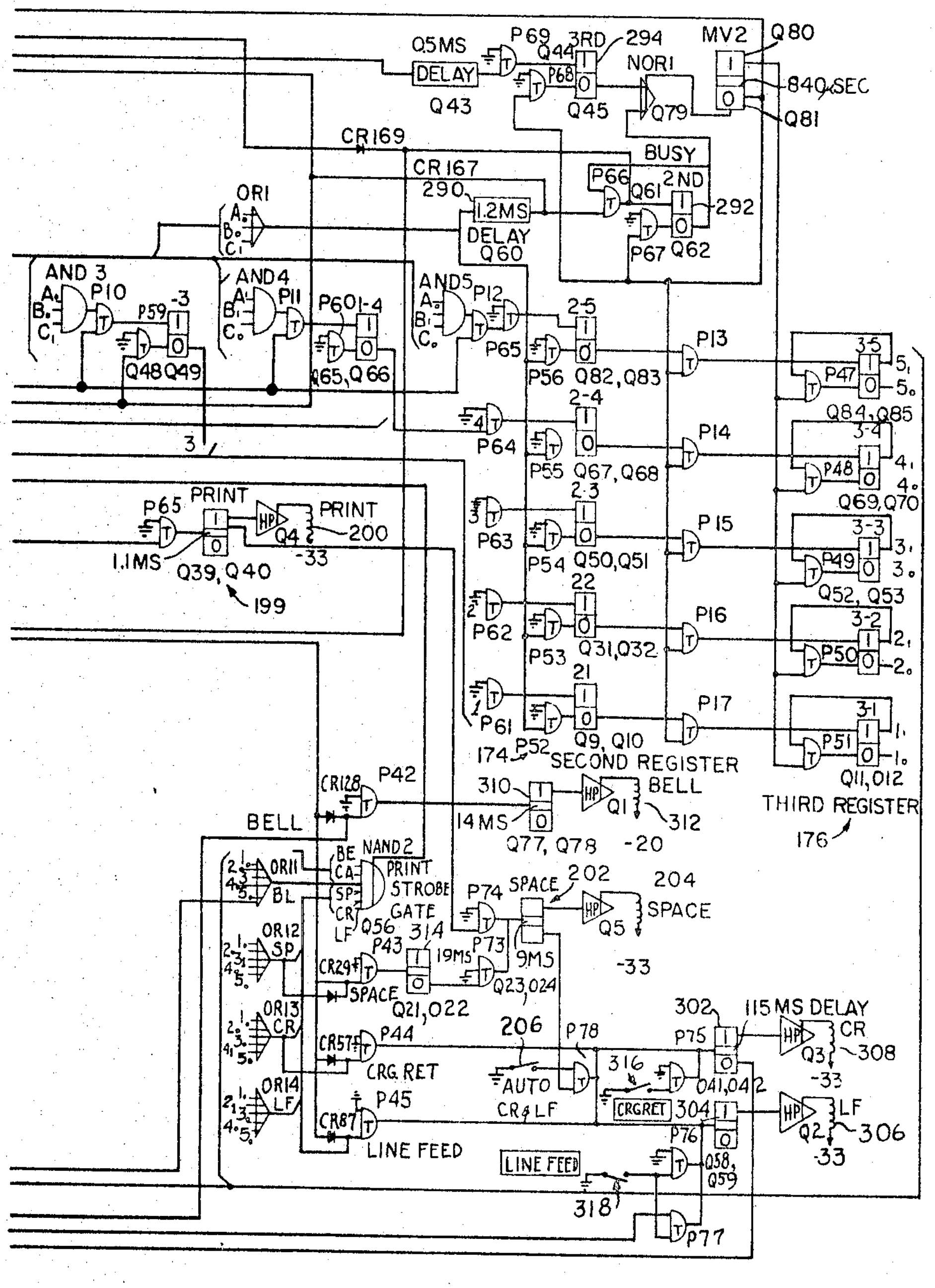
Figure 13:
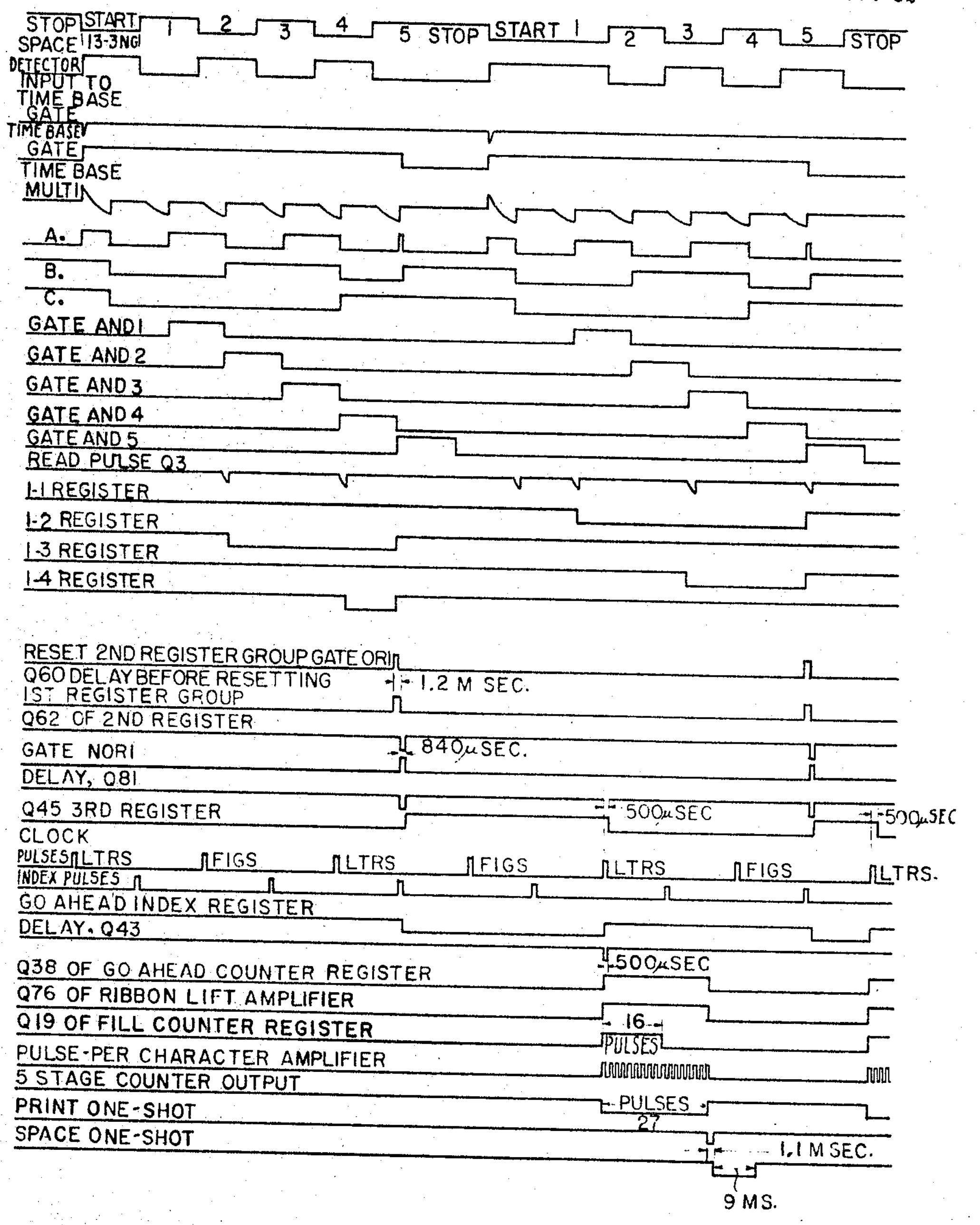
Figure 14:
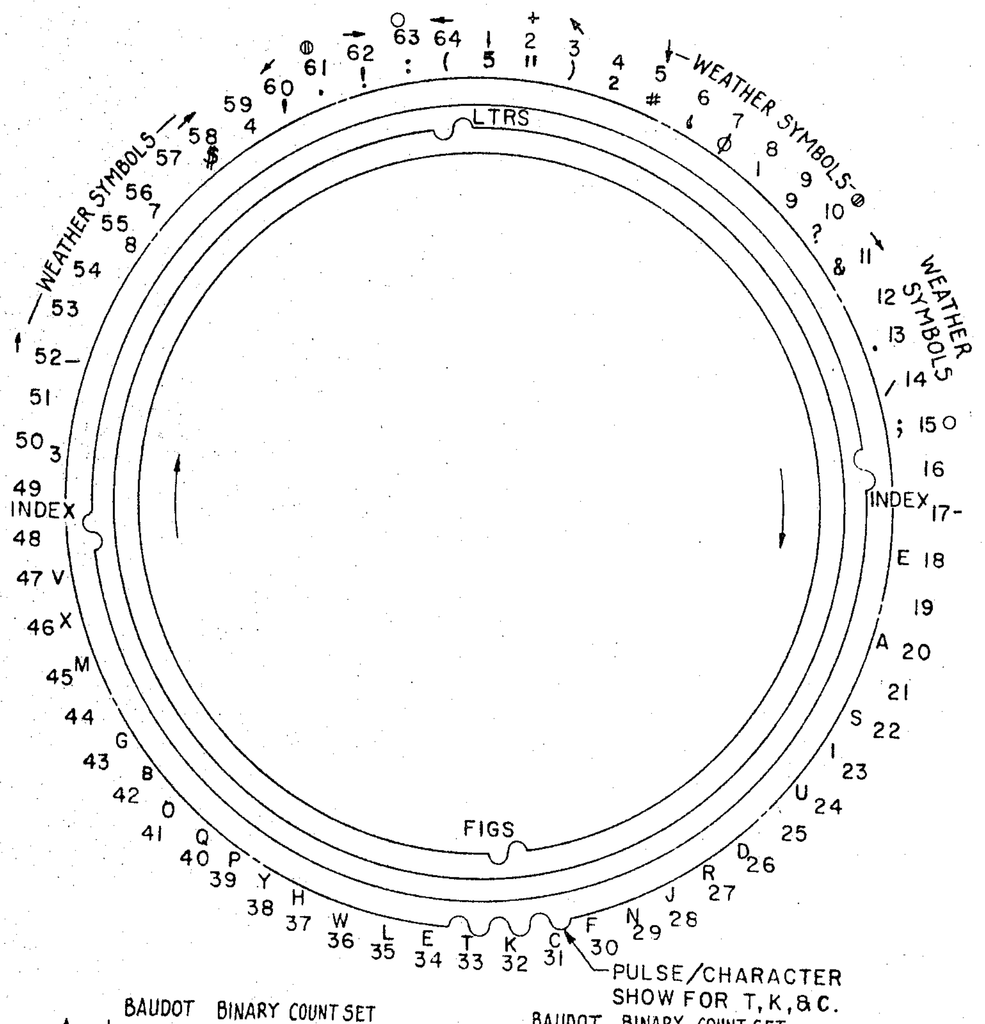
Figure 15:
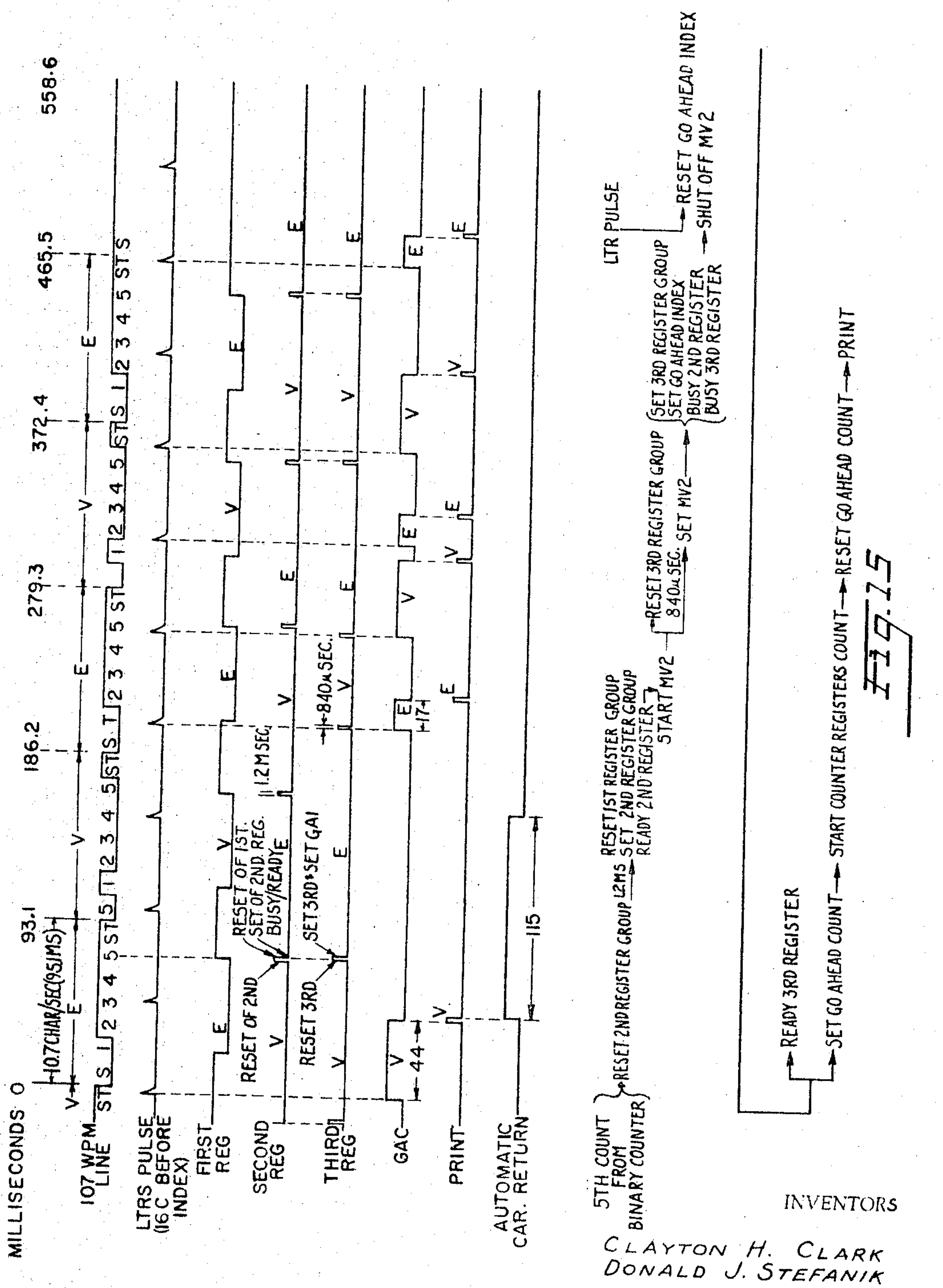
Figure 16A:
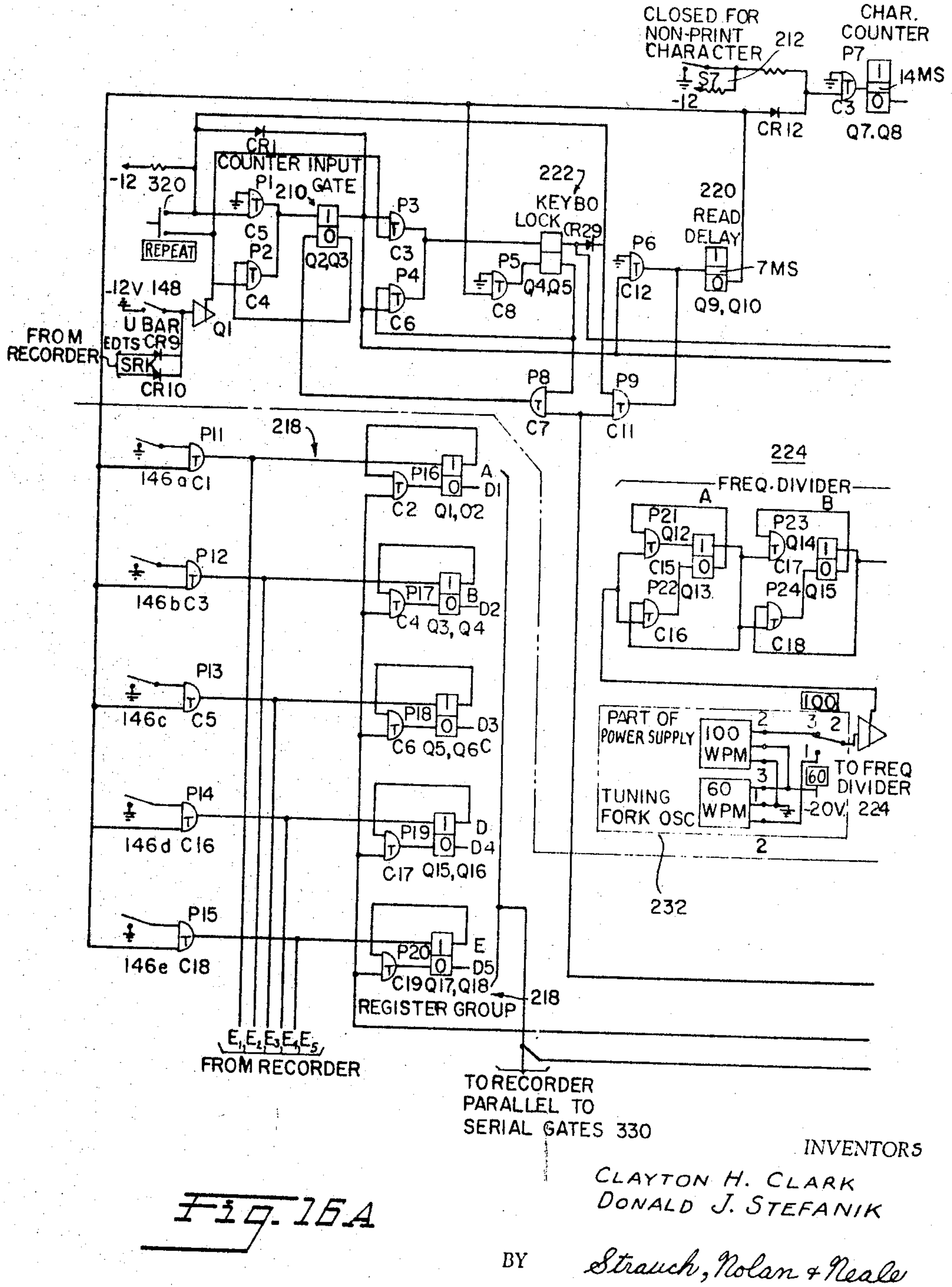
Figure 16B:
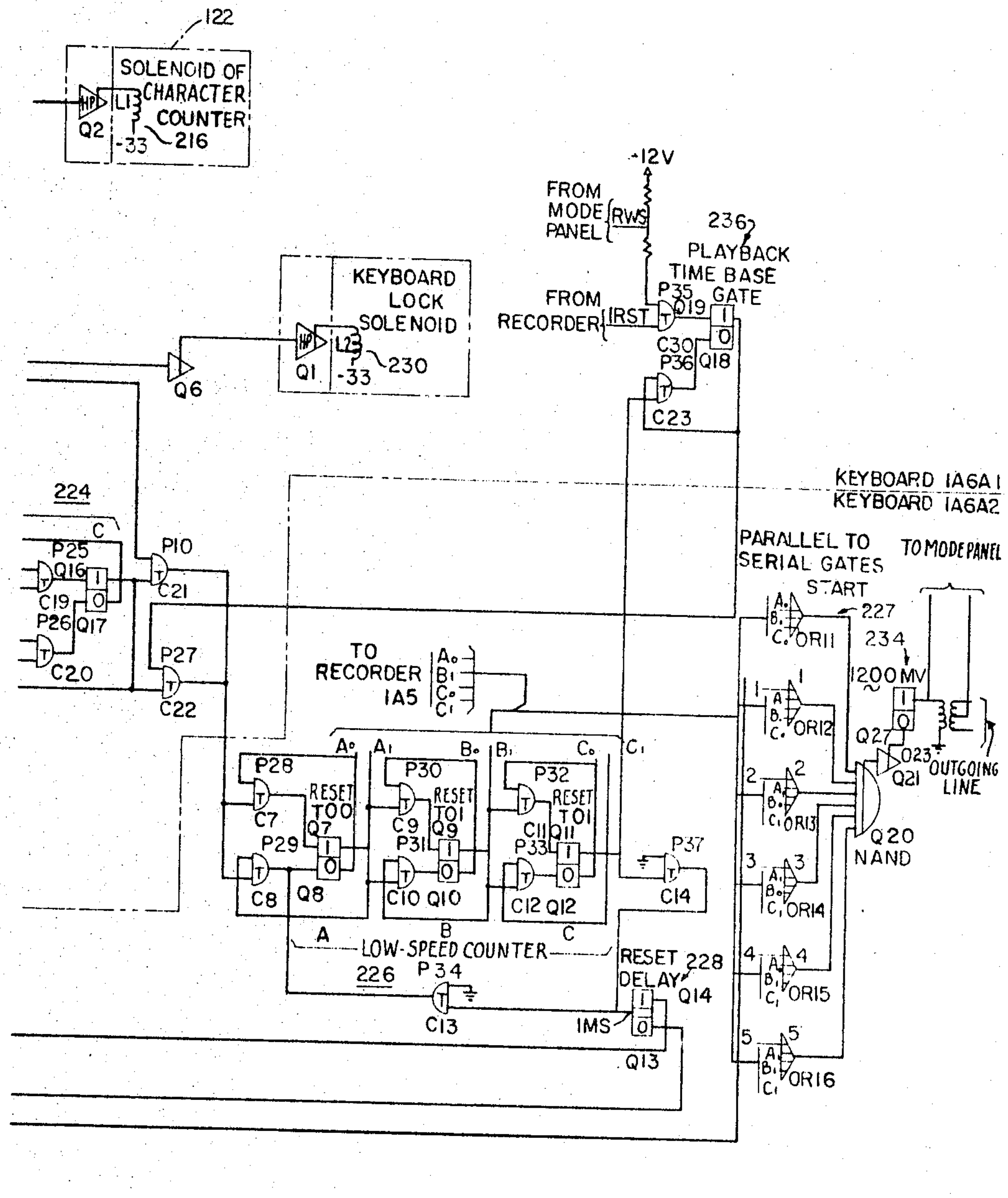
Figure 17:
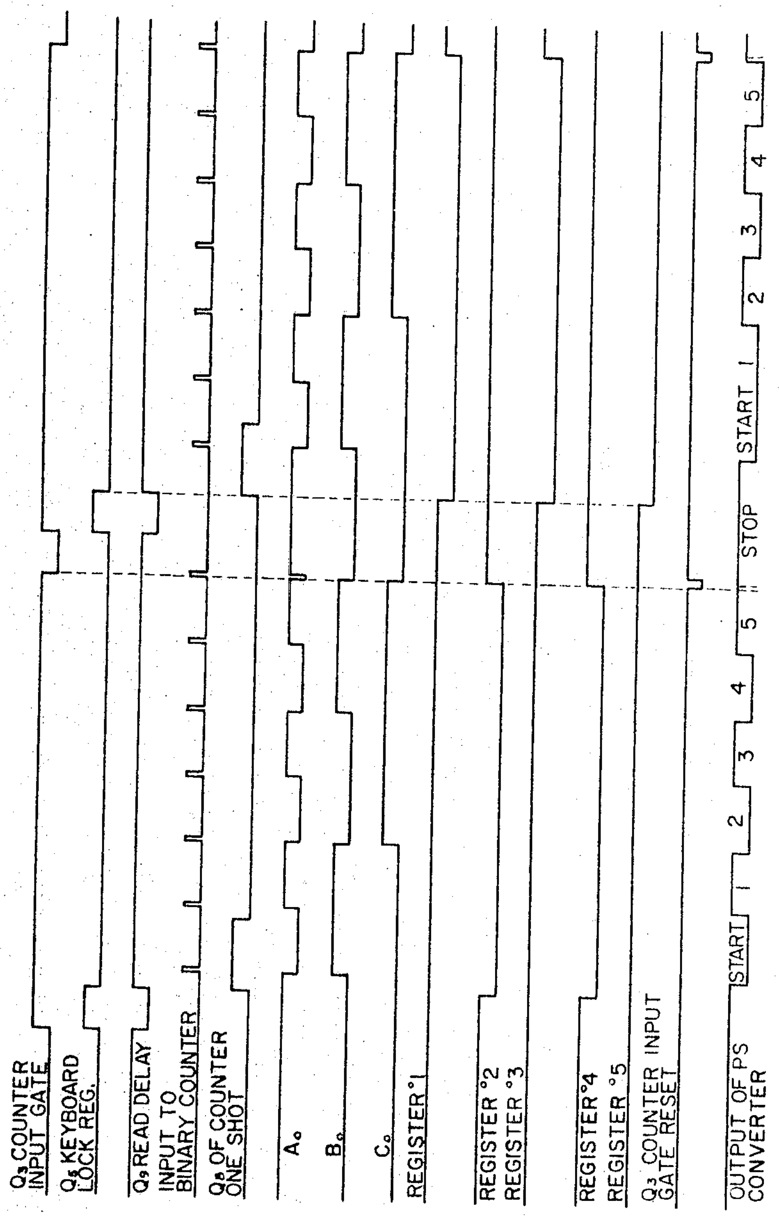
Figure 18A:
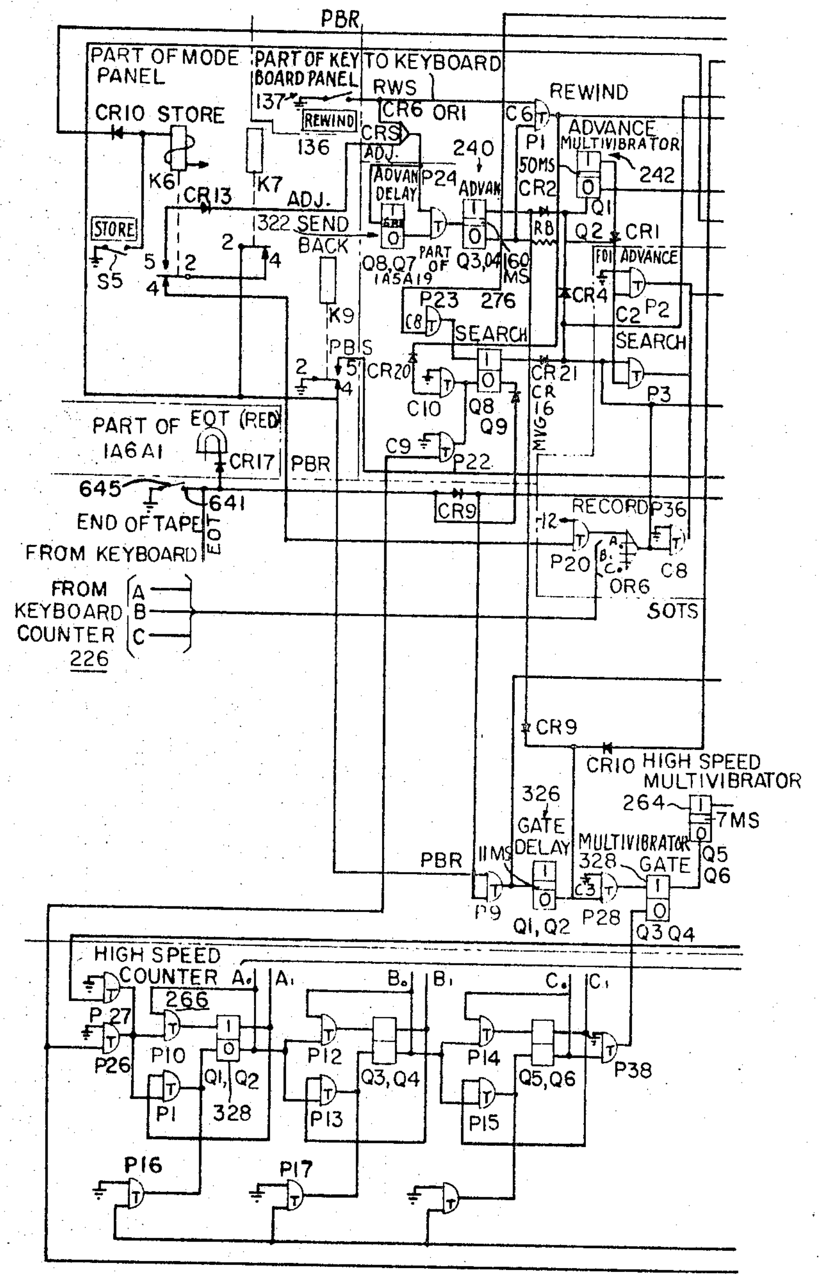
Figure 18B:
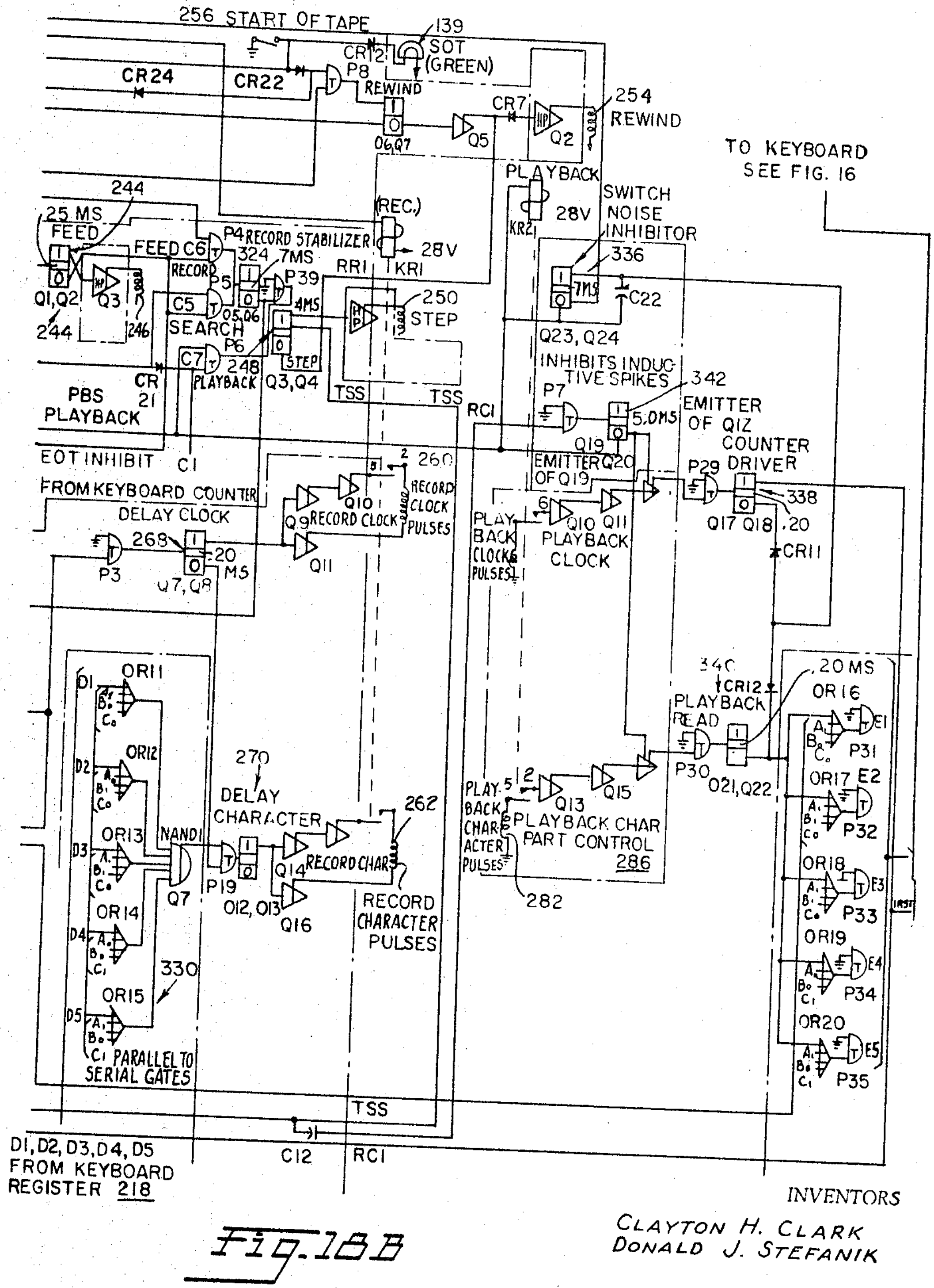
Figure 19:
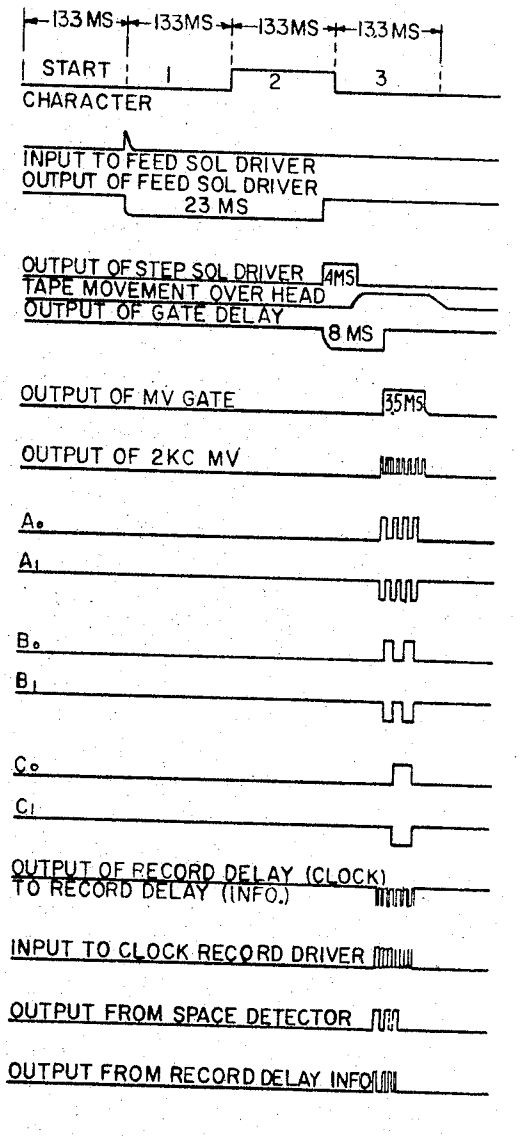
Figure 20:
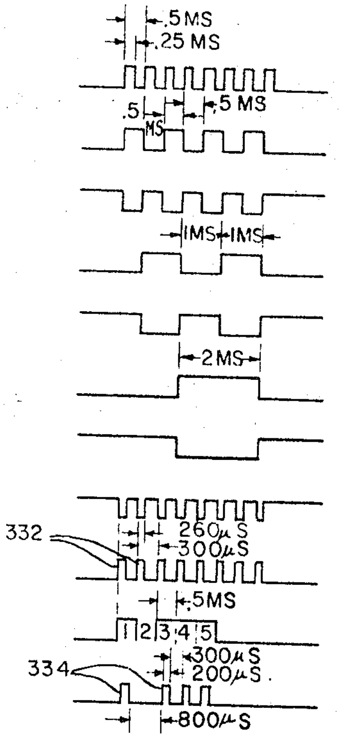
Figures 21, 22:
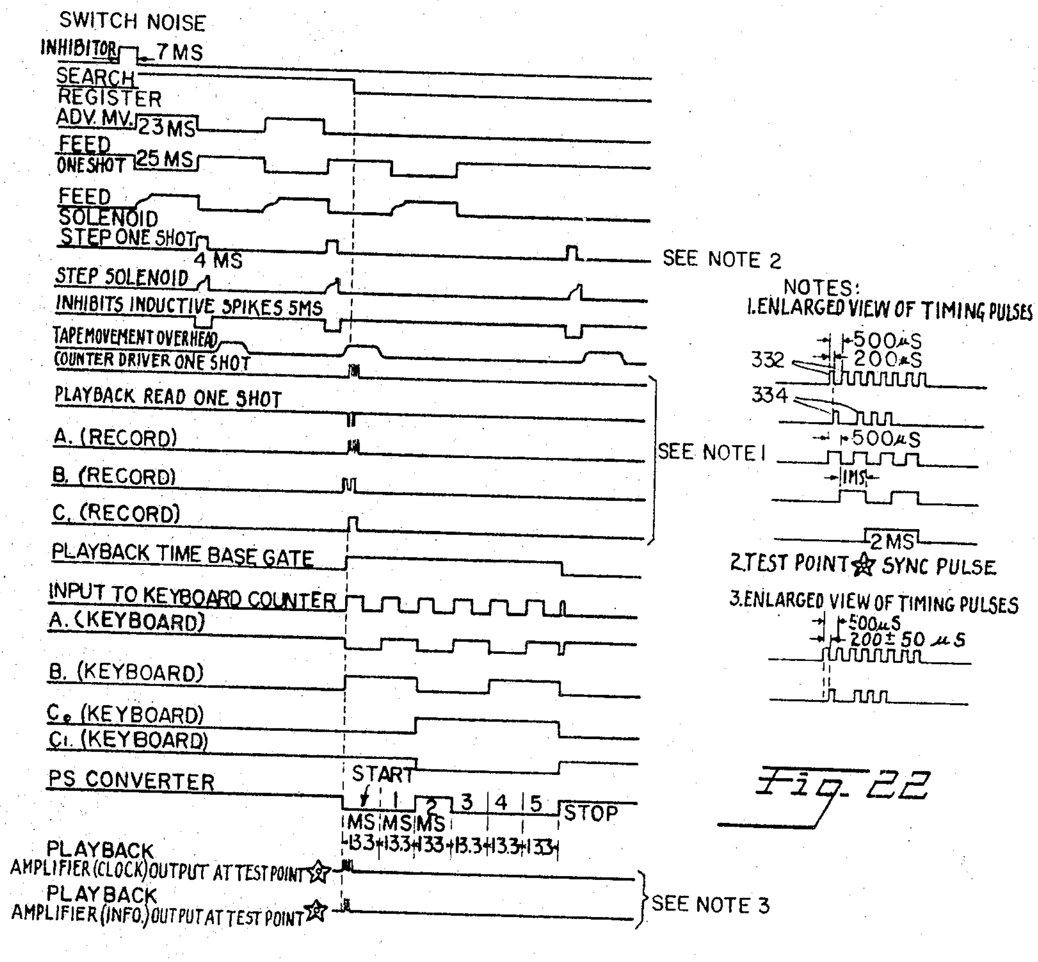
Figure 23:
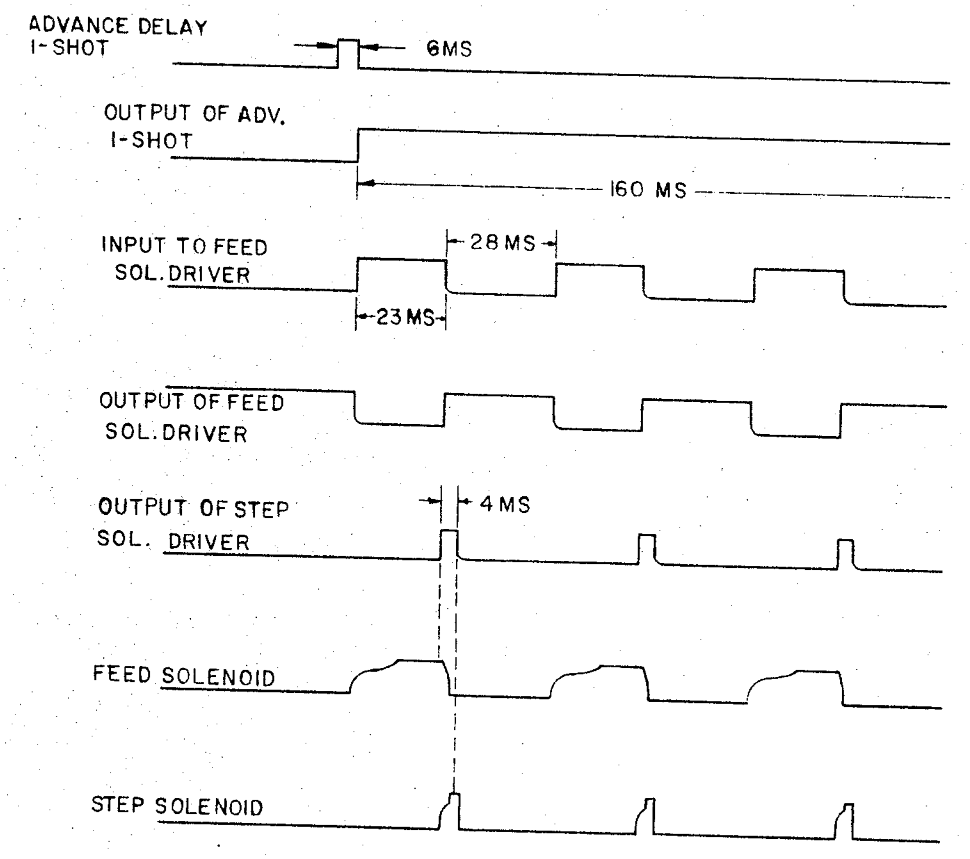
Figure 24:
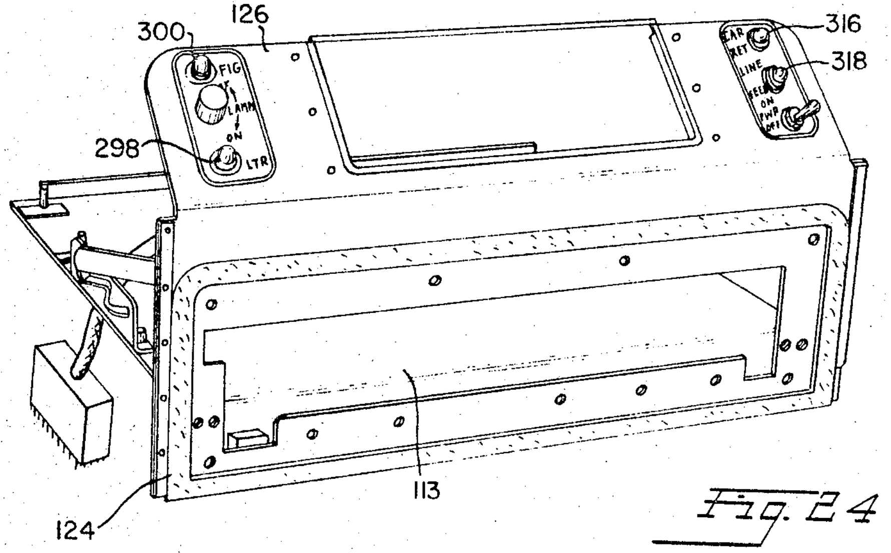
Figure 25:
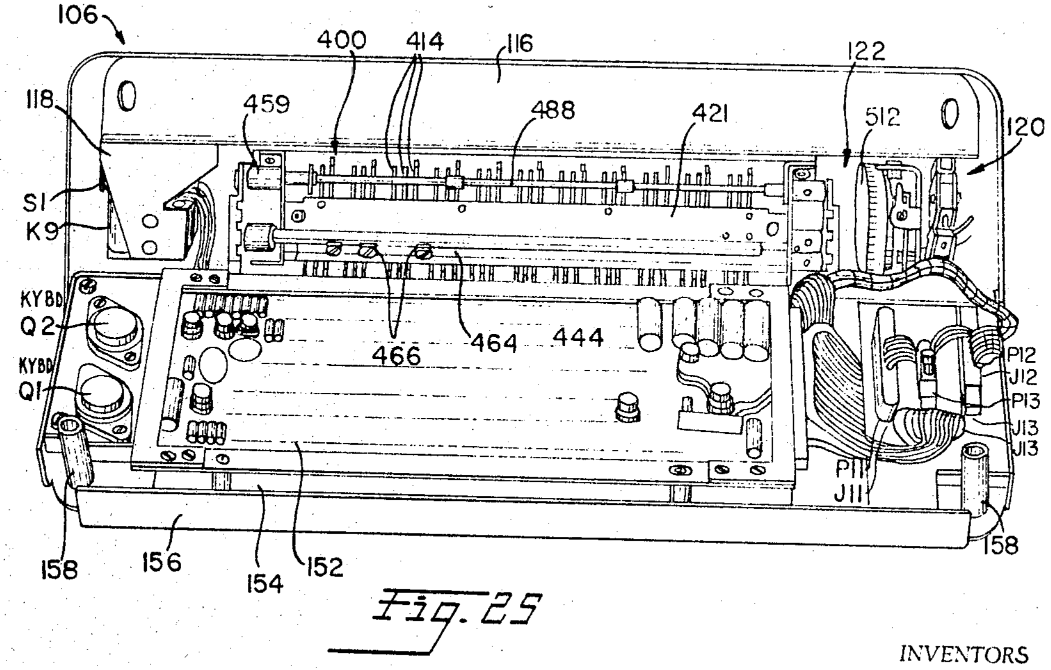
Figure 26:
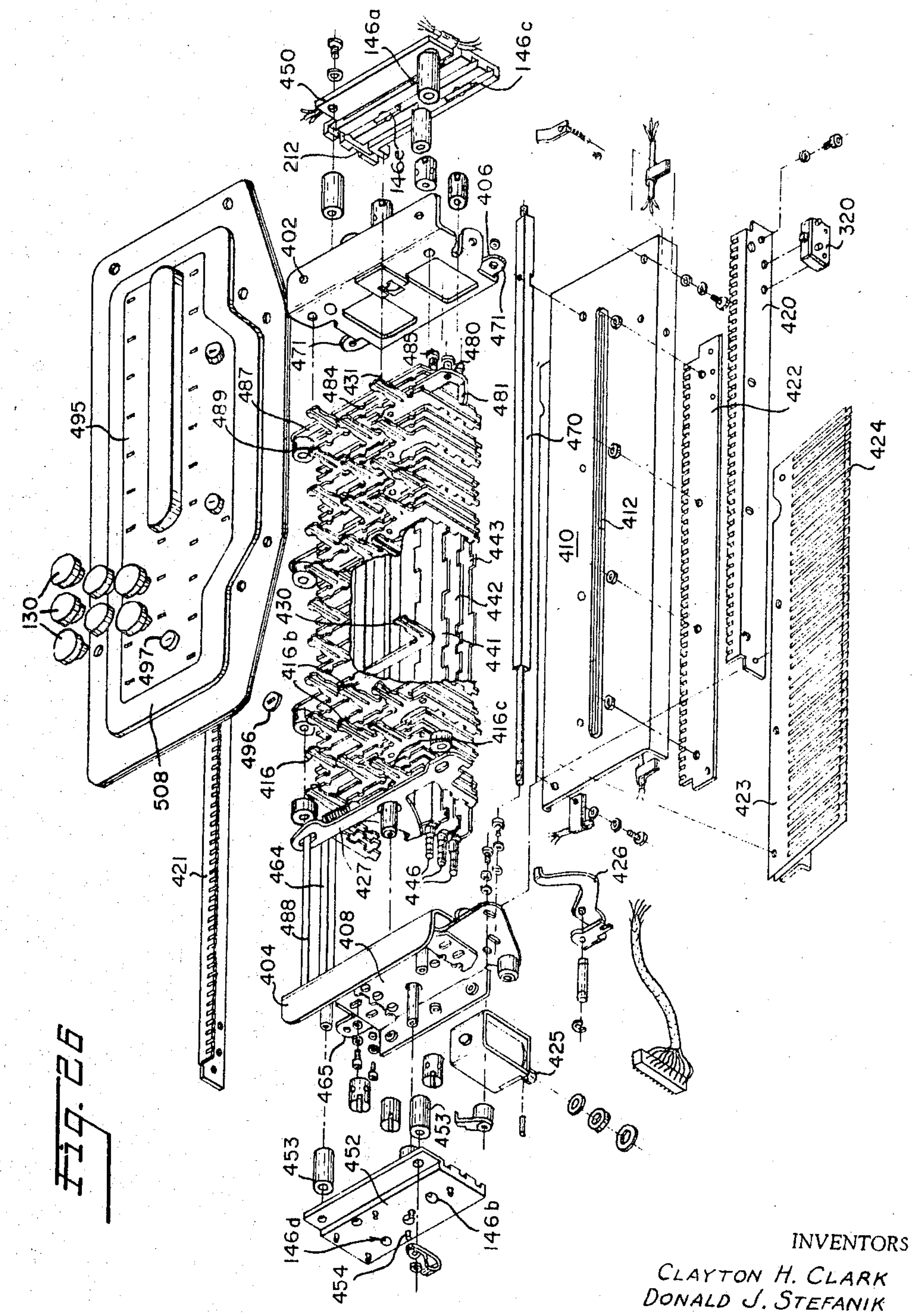
Figure 27:
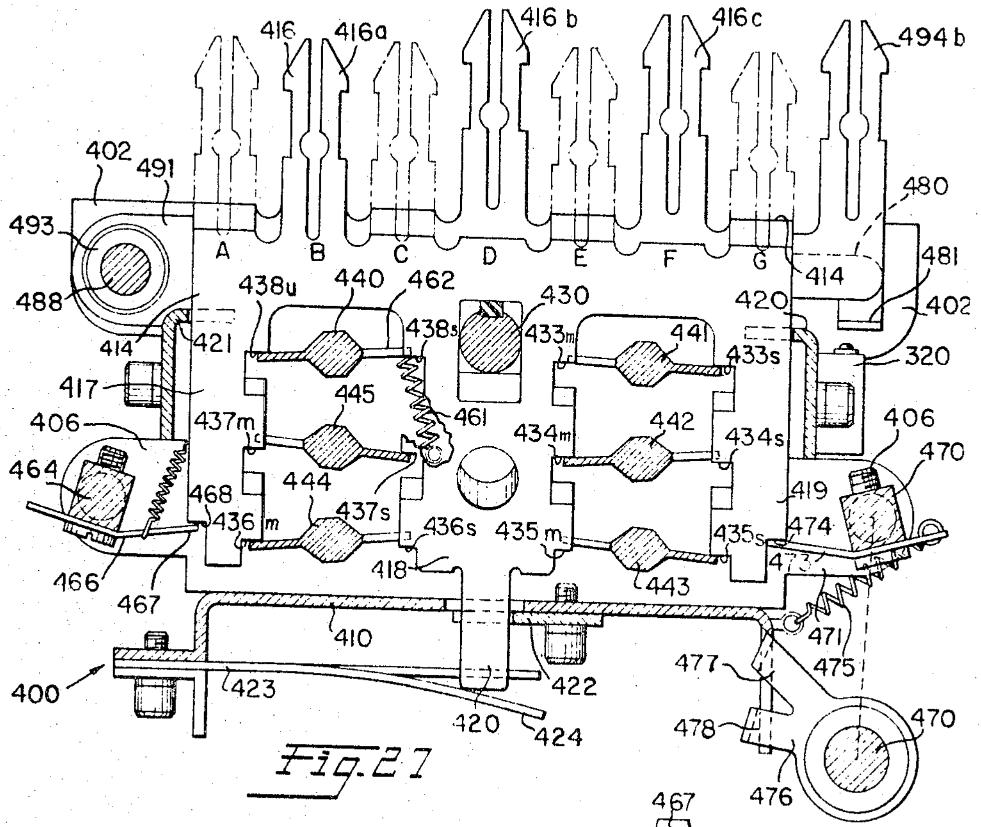
Figure 30:
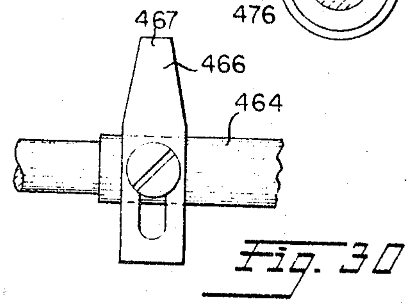
Figure 28:
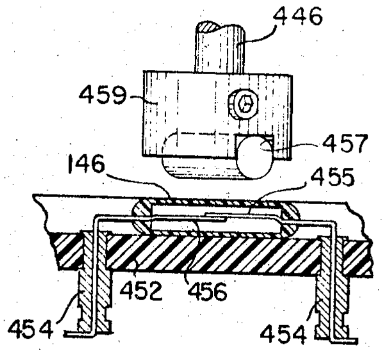
Figure 31:
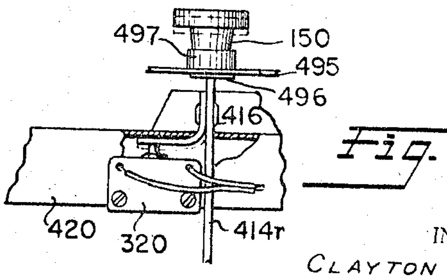
Figure 29:
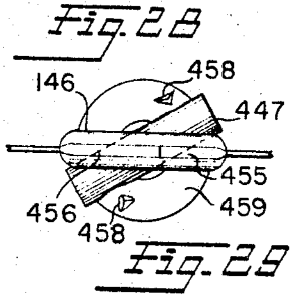
Figures 32, 33, 34, 35:
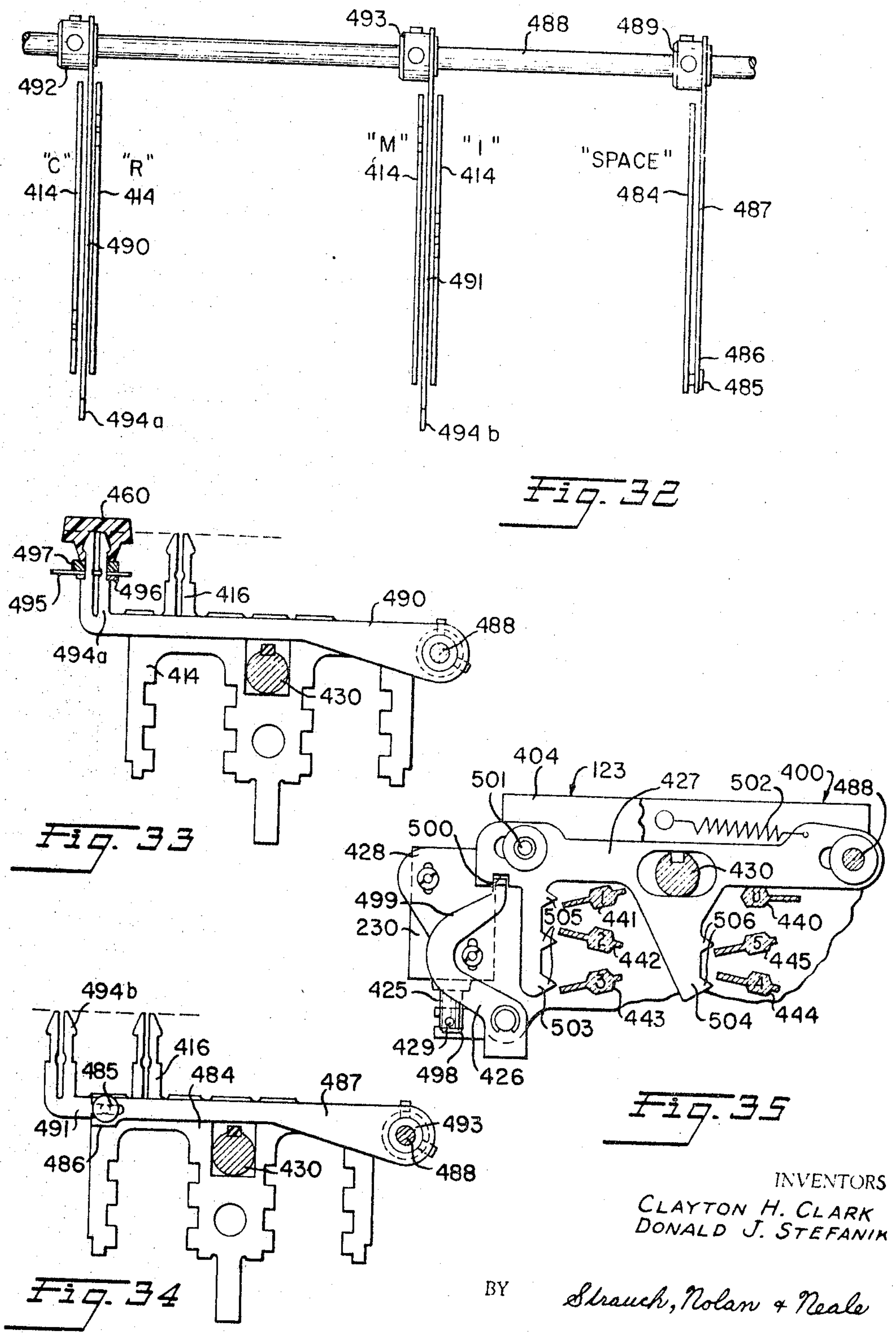
Figure 37:
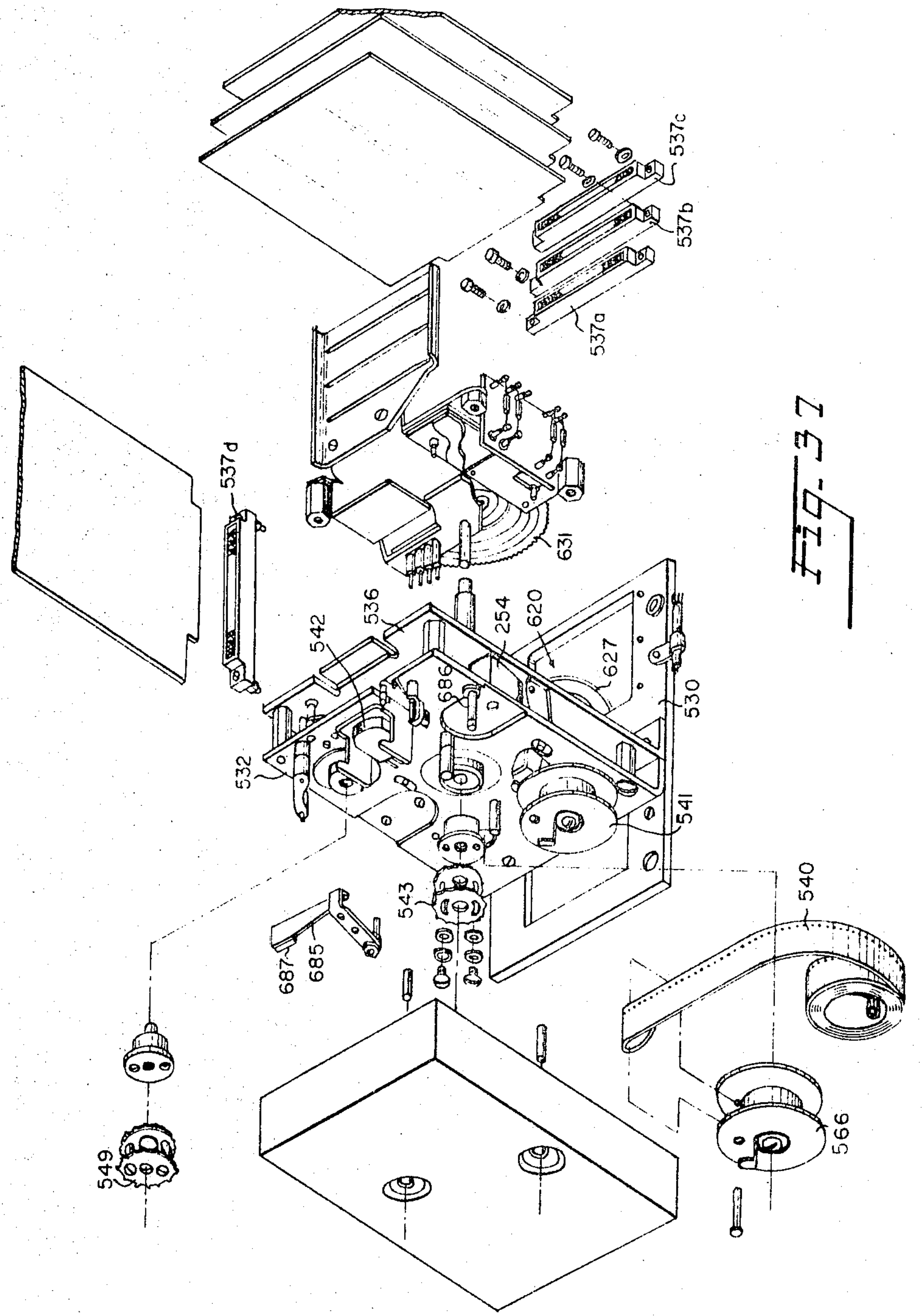
Figure 38:
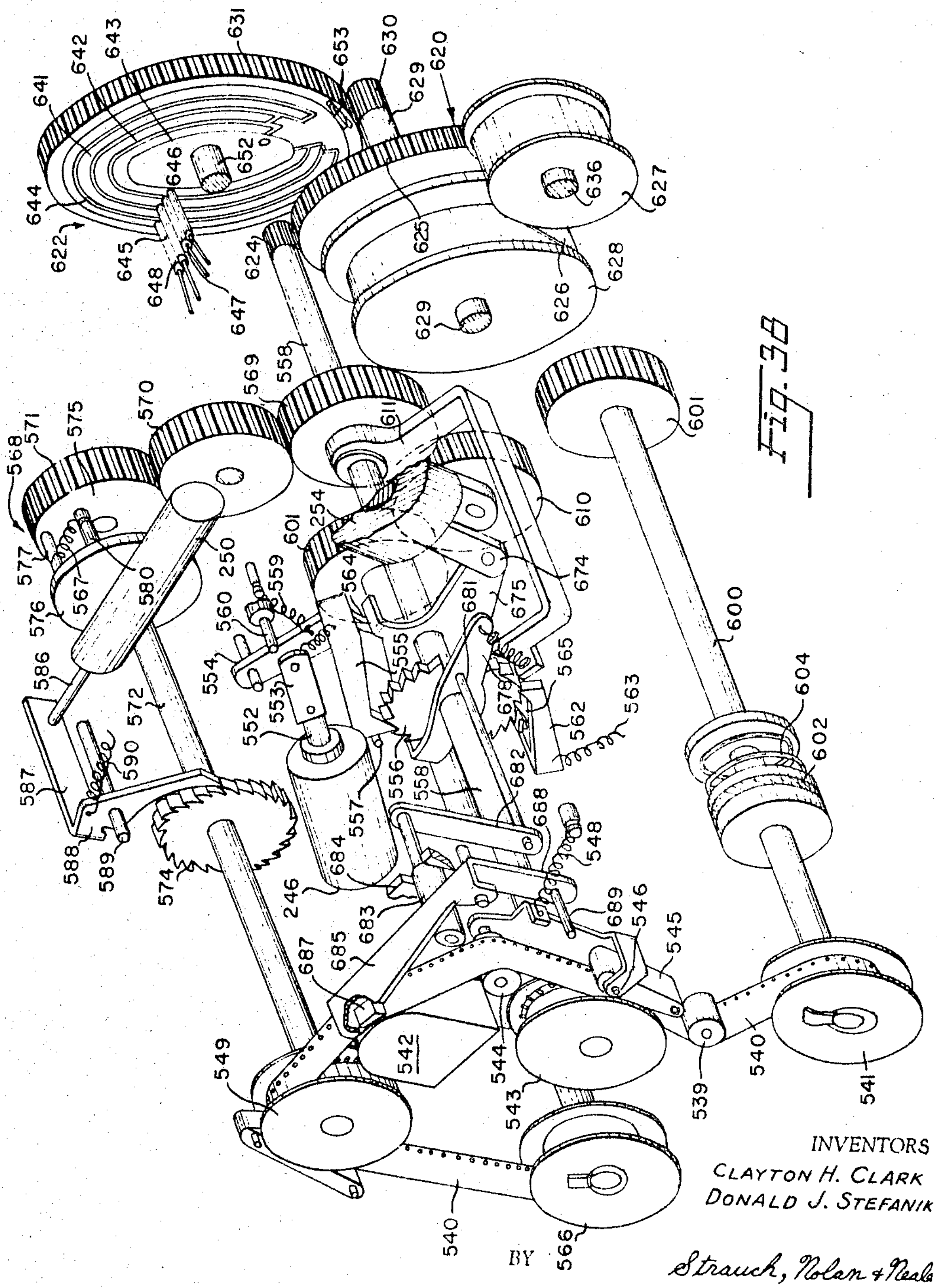
Figure 39:
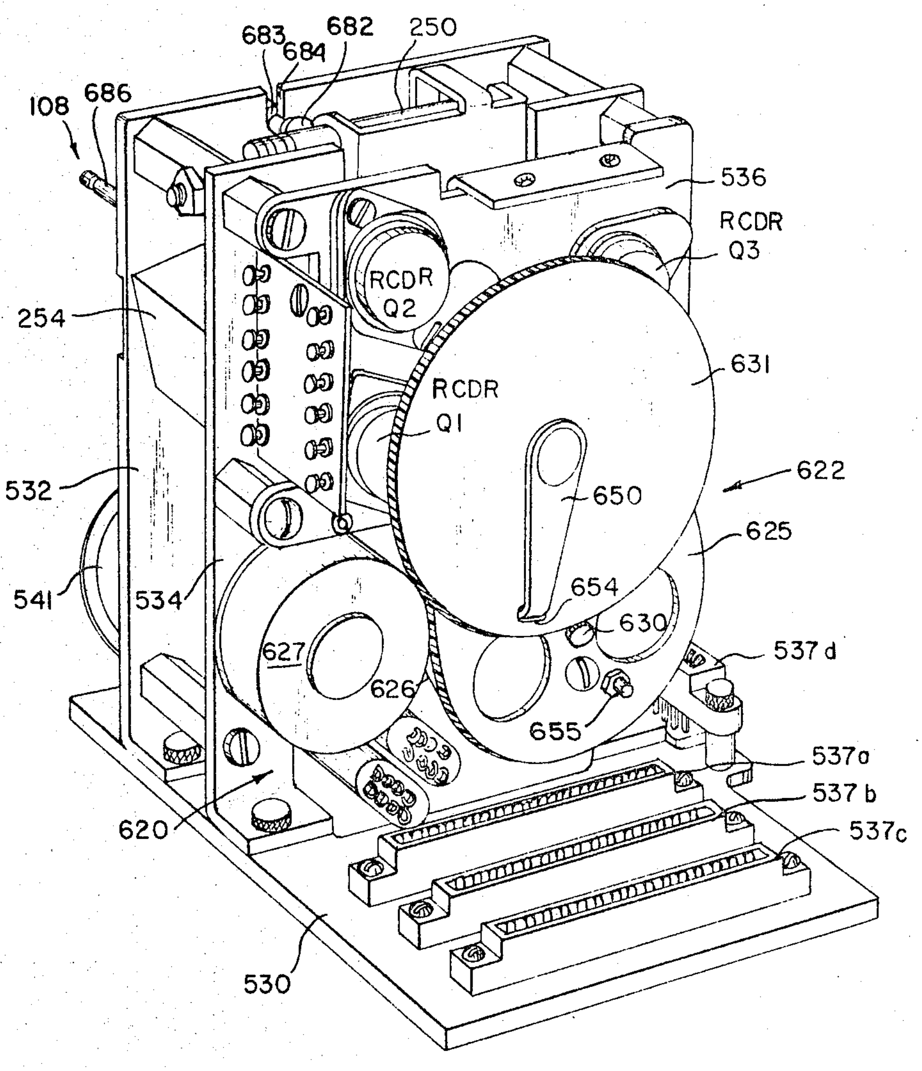
Figures 40, 41, 42:
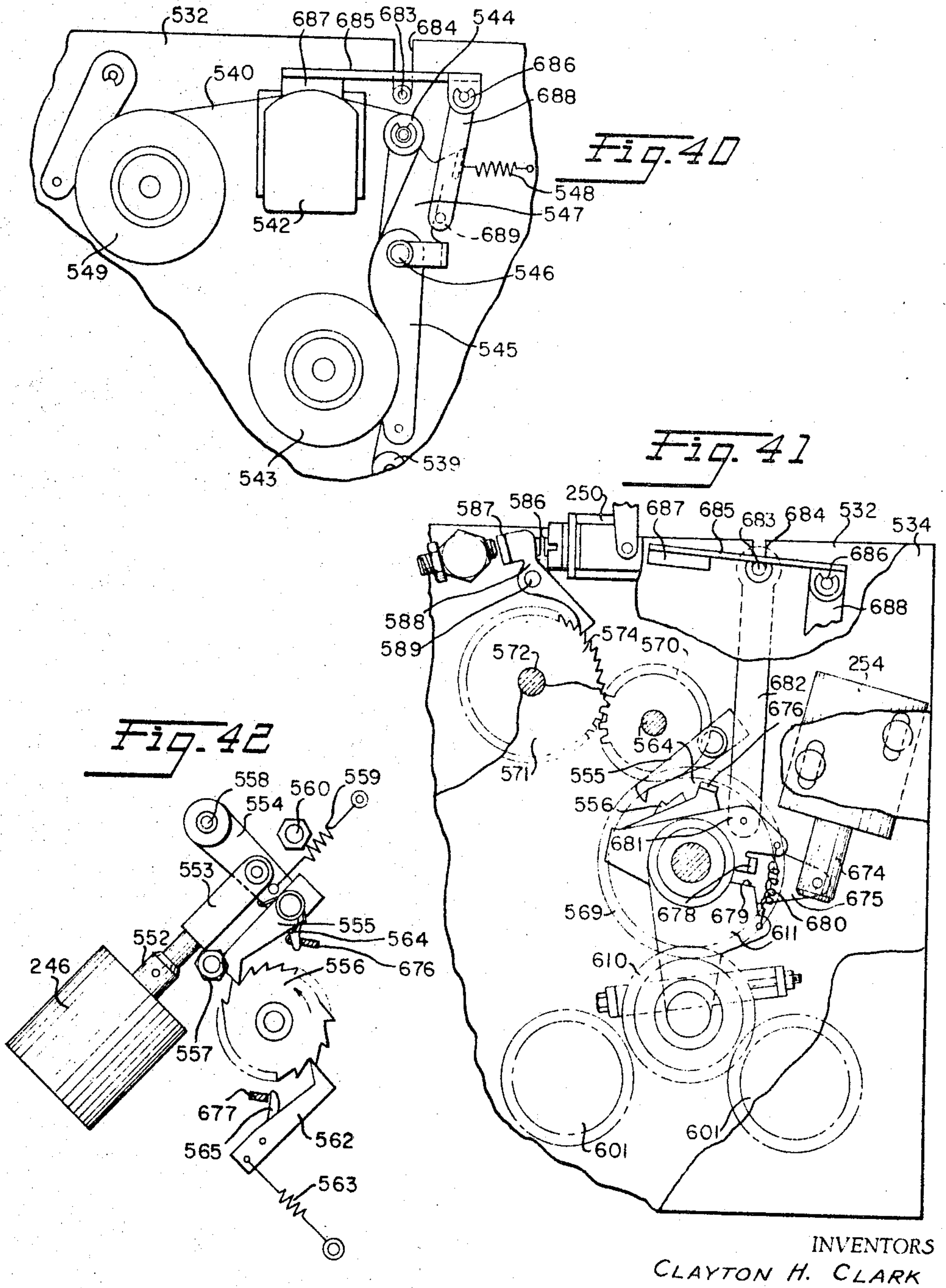
Figure 43:
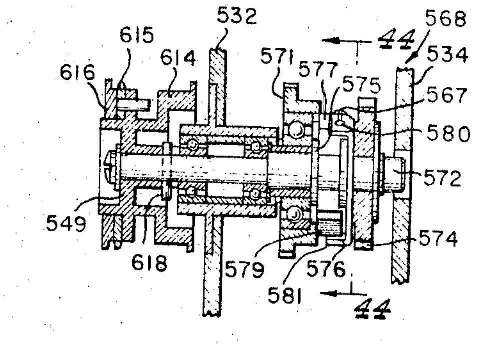
Figure 44:
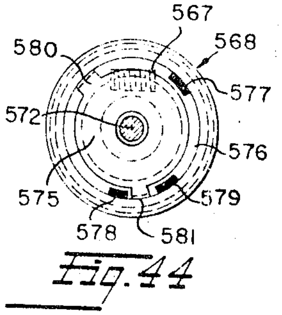
Figures 46, 48:
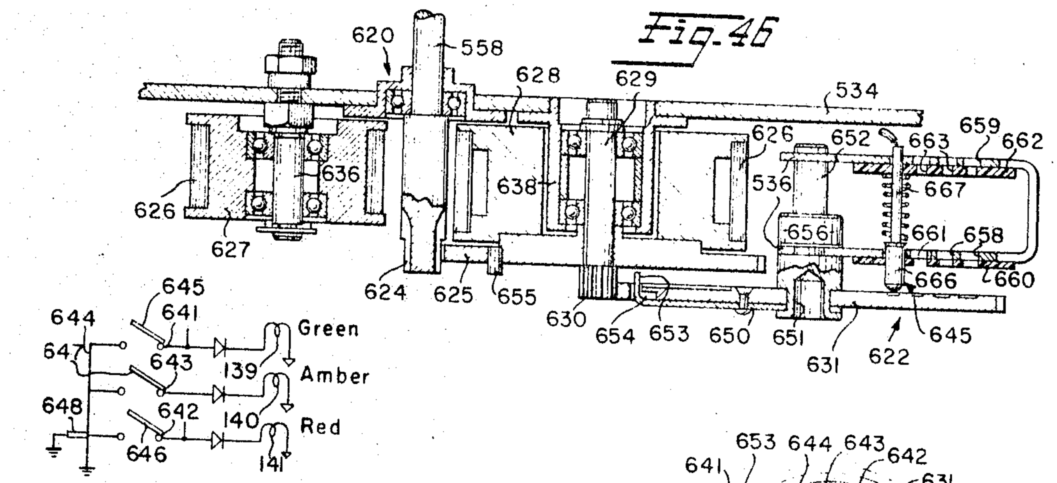
Figure 45:
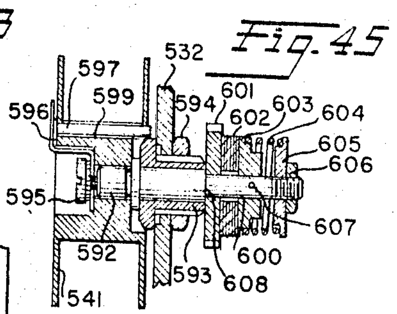
Figure 47:
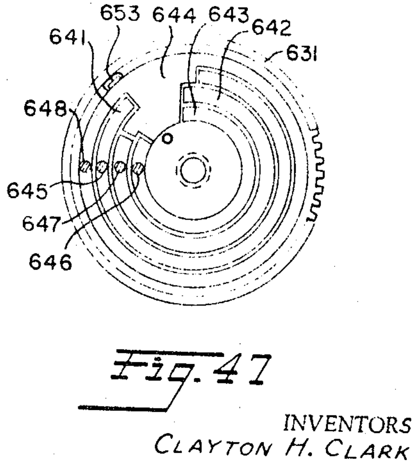
Figure 49:
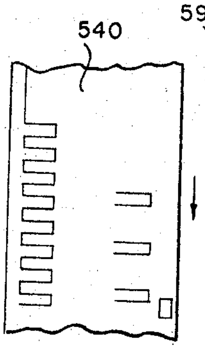
Figures 50, 53:
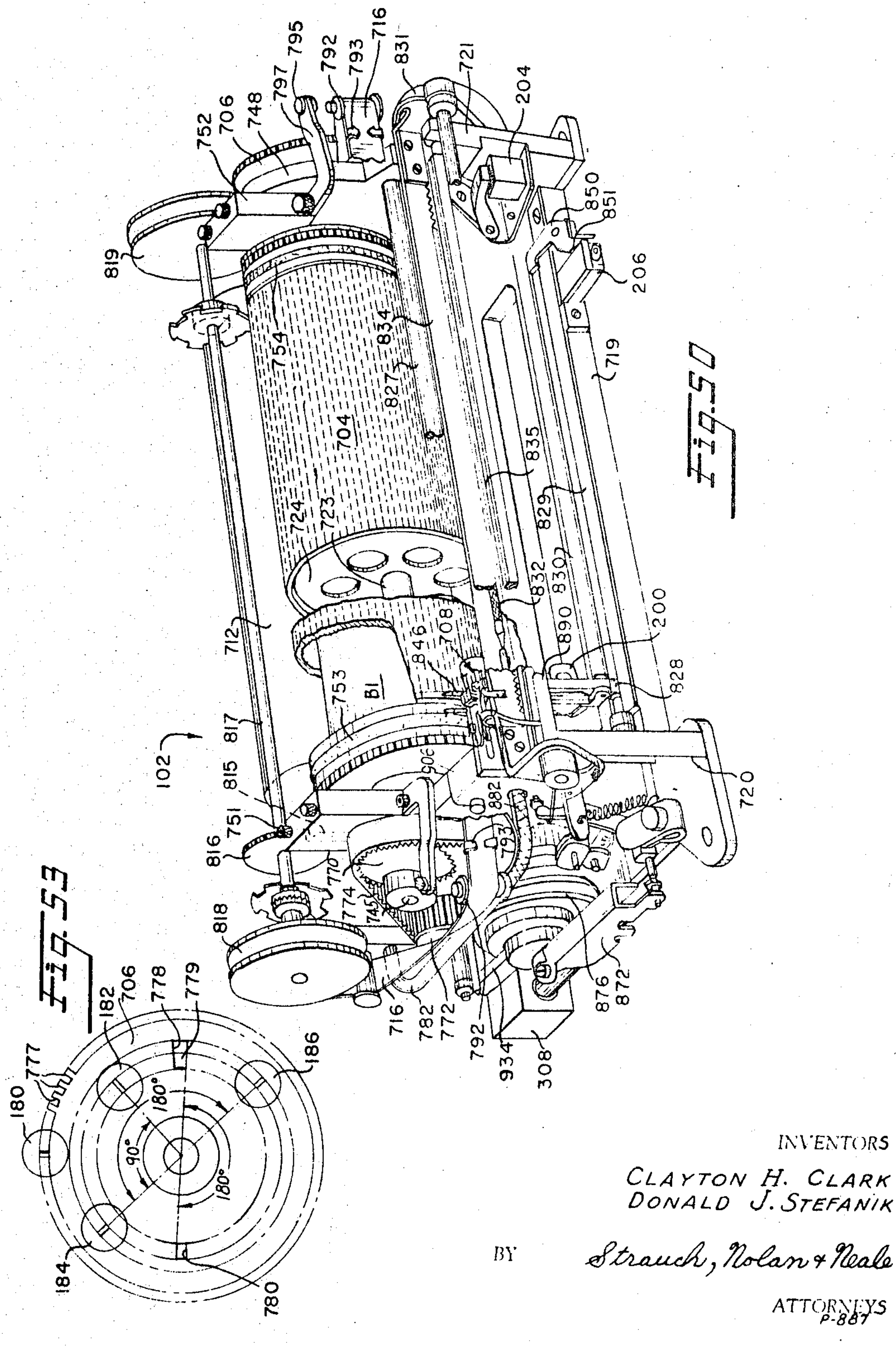
Figures 51, 52:
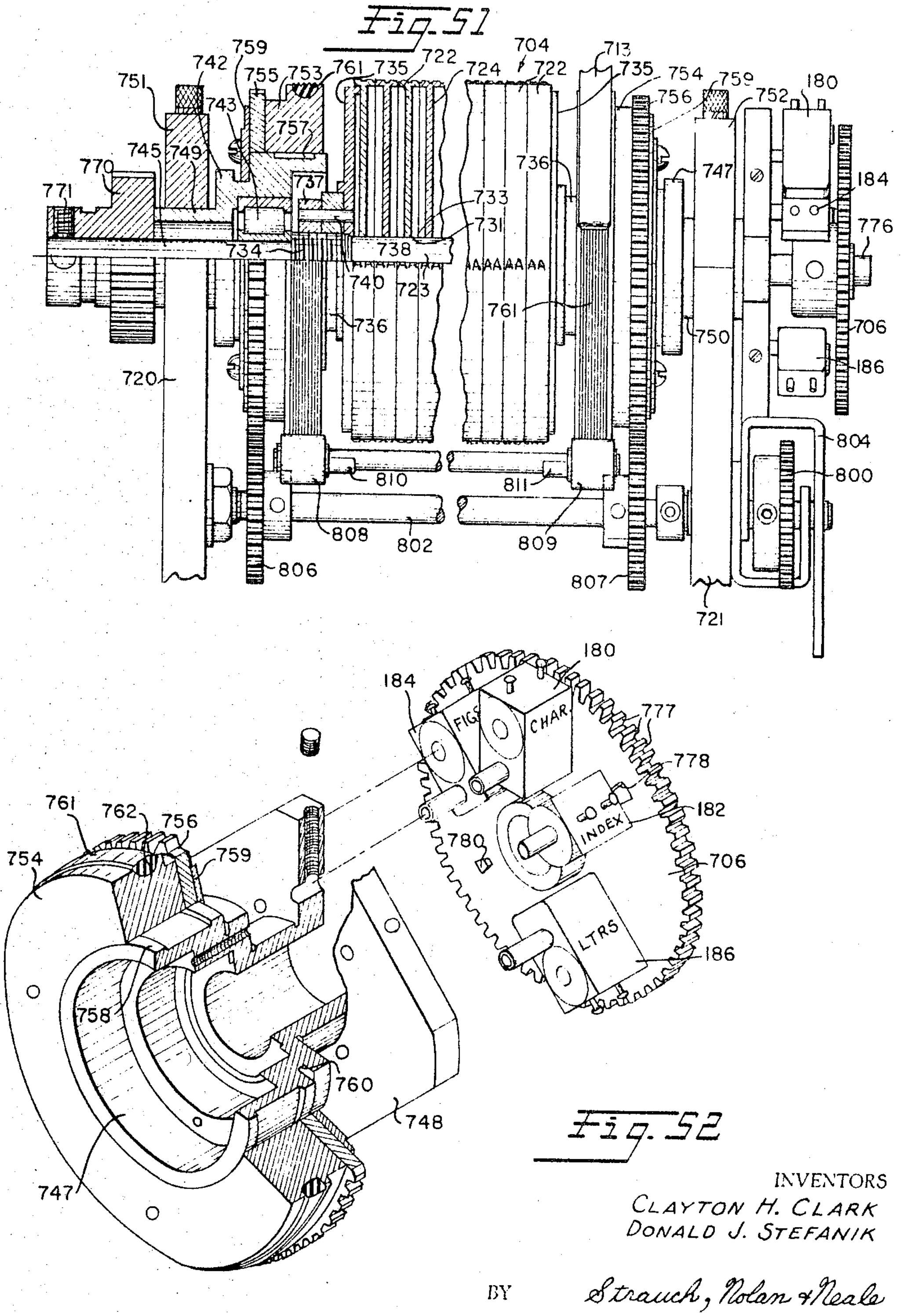
Figure 54:
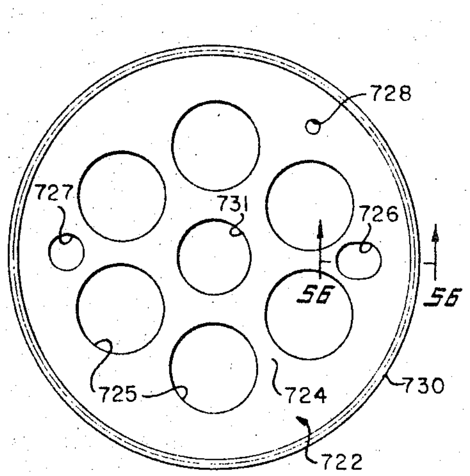
Figure 55:
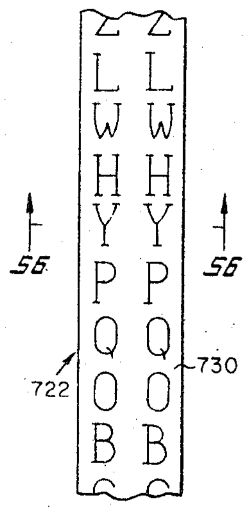
Figure 57:
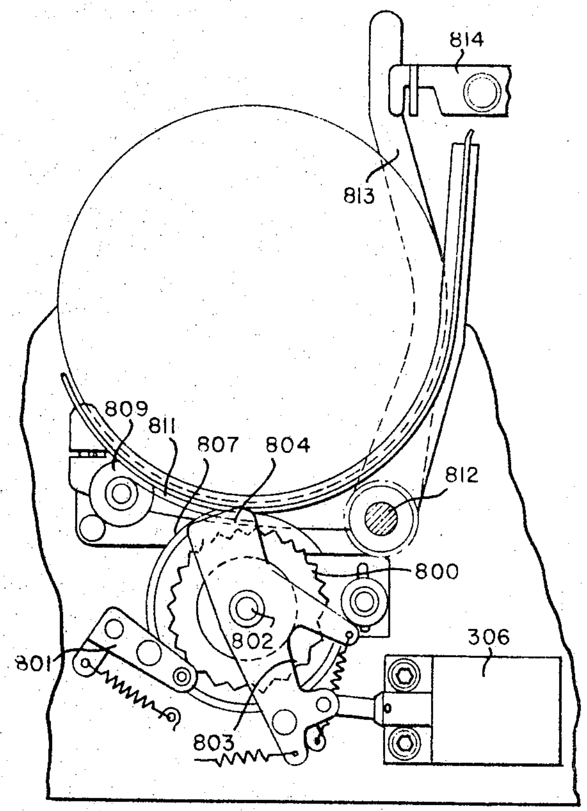
Figure 56:
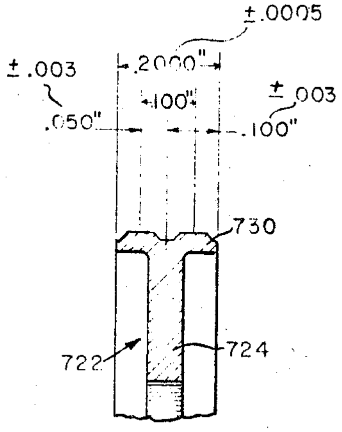
Figures 58, 59:
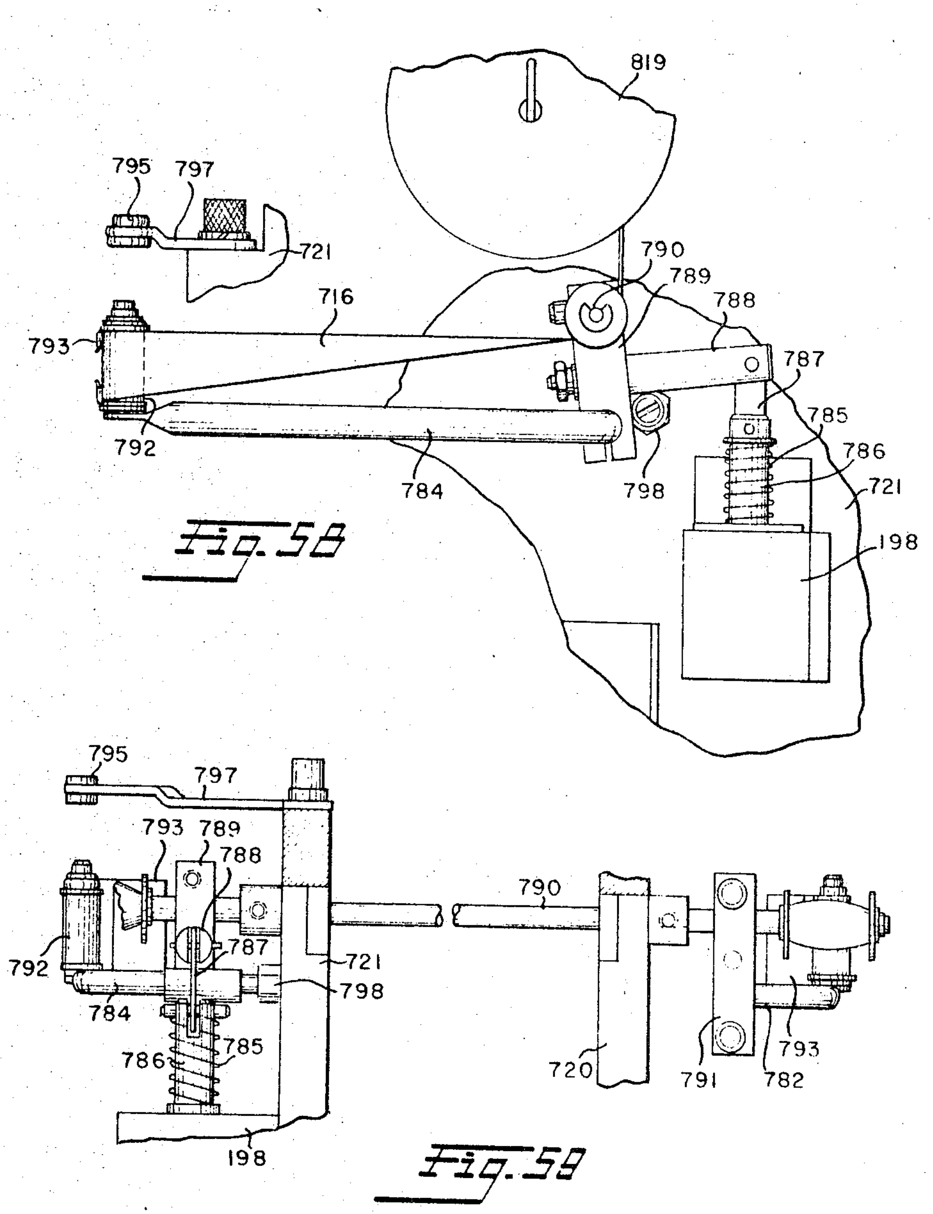
Figures 60, 61, 62:
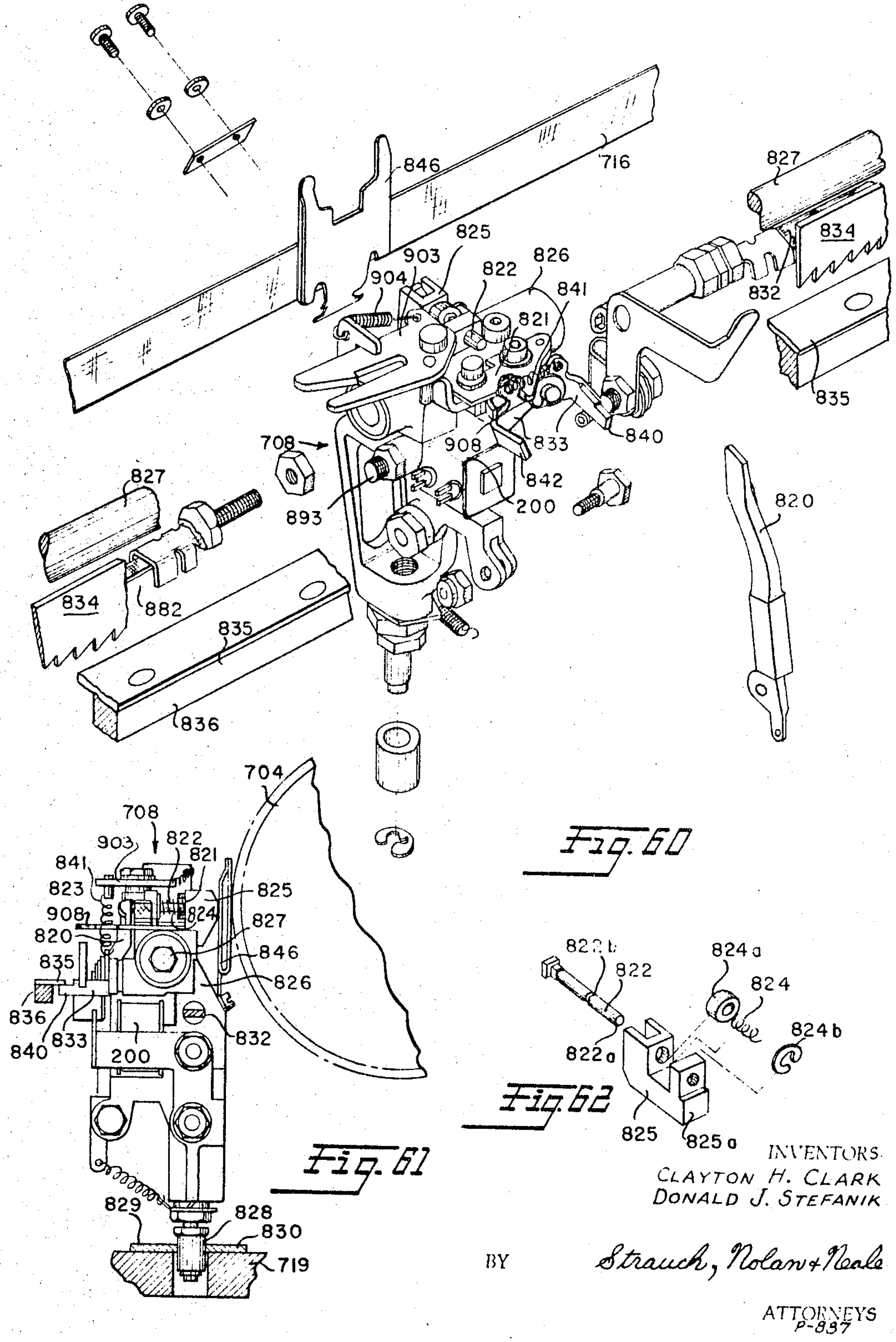
Figure 63:
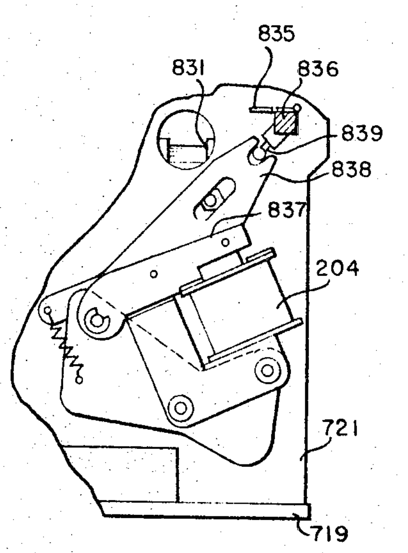
Figure 64:
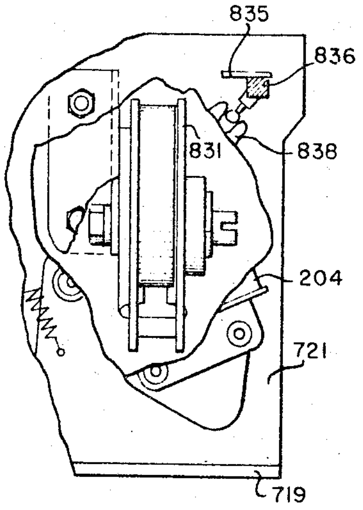
Figure 65:
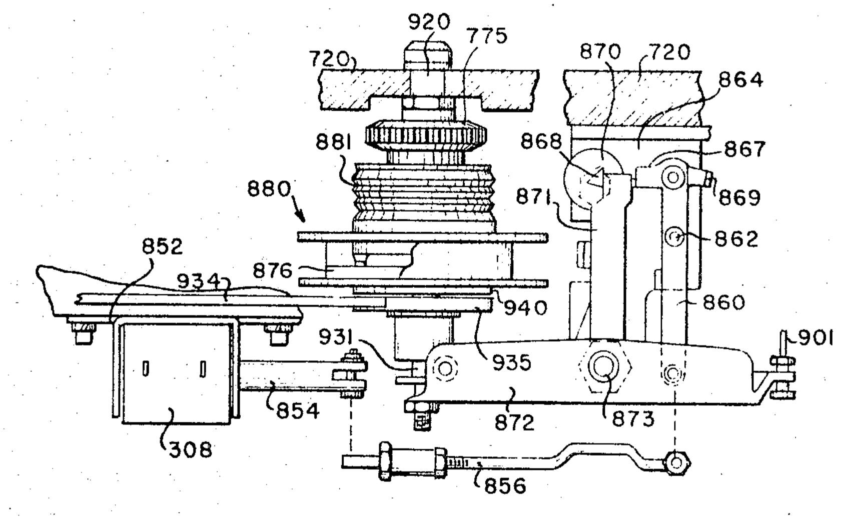
Figures 66, 67:
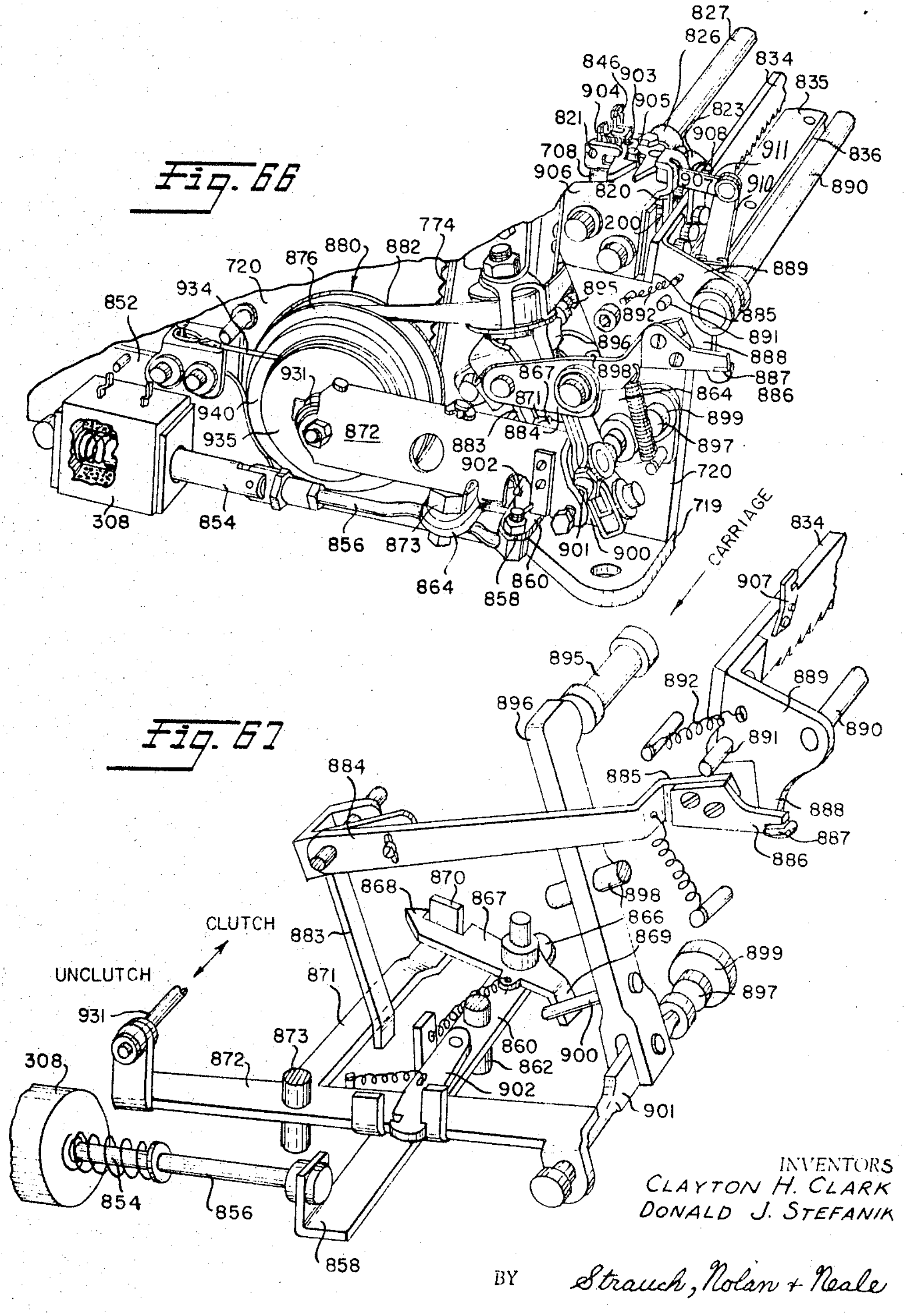
Figure 68:
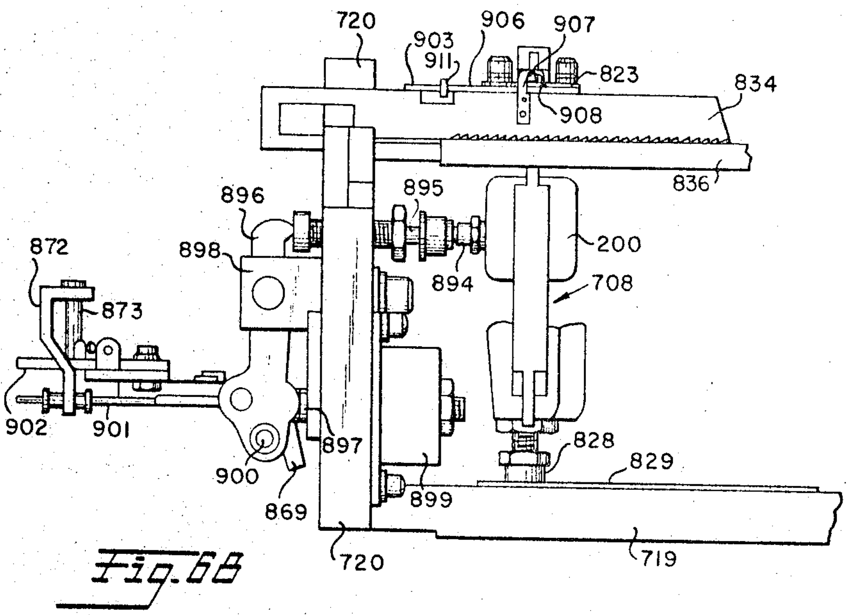
Figure 69:
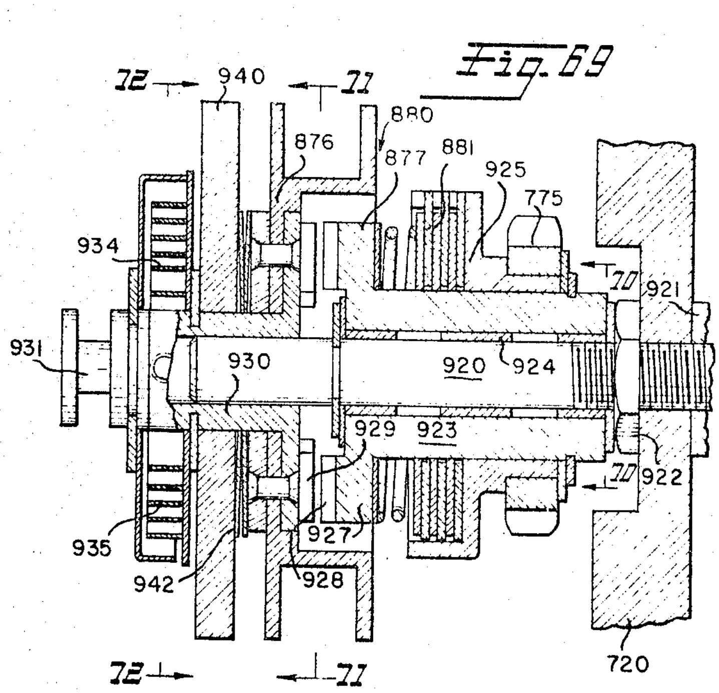
Figure 70:
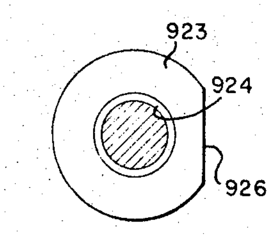
Figure 71:
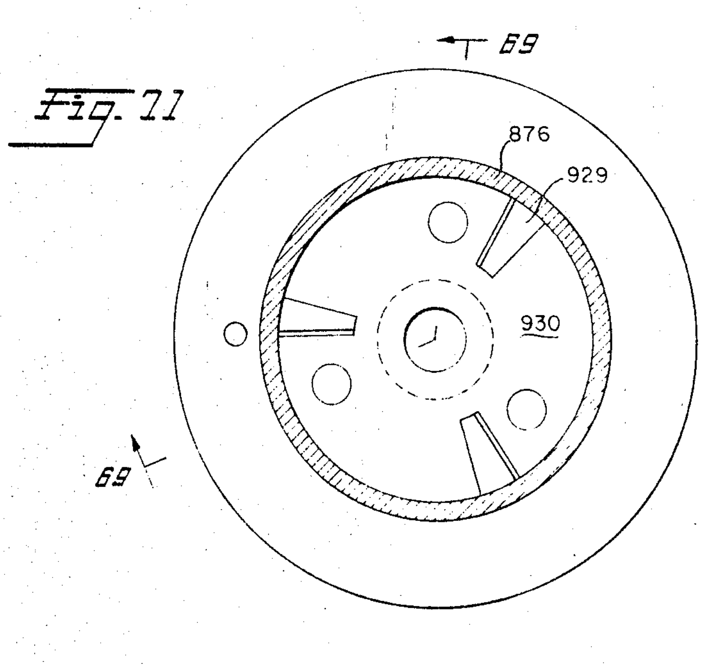
Figure 72:
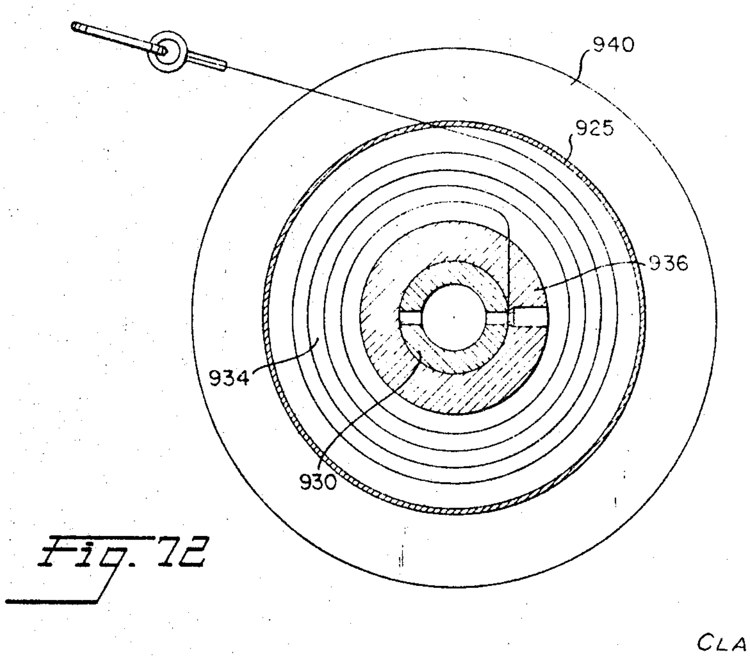

FIGURE 11 includes 14 separate blocks identified the letters A through P, each illustrating a basic sc matic circuit corresponding to a specific logic symb and enabling convenient construction of the electroni represented by the following logic diagrams;

FIGURE 12 is shown on two sheets as FIGURES 1 and 12B and is a logic diagram for the electrical and el tronic circuitry of the printer;

FIGURE 13 is a timing chart for the printer ope tions;

FIGURE 14 is a chart indicating the character positi on each of the plurality of typewheels in the drum wi superimposed pulsing clock teeth for each character cover the alternate positions of the index pulses and t positions of the pulsing notches for letters and figur (see also FIGURE 53) together with a chart showing t Baudot position representations of each character togeth with their binary numerical positions and the pulse cou which is set into the printer electronic counter comp nents;

FIGURE 15 is an auxiliary timing chart representing the automatic carriage return functions of the printer;

FIGURE 16 is shown on two sheets as FIGURES 16A and 16B and is a logic diagram for the keyboard unit;

FIGURE 17 is a timing diagram for the keyboard;

FIGURE 18 is shown on two sheets as FIGURES 18A and 18B and is a logic diagram for the magnetic tape recorder;

FIGURE 19 is a timing chart for the magnetic tape recorder recording operation, and FIGURE 20 is an expanded detail porton of some of the recording pulses shown in the more comprehensive chart of FIGURE 19;

FIGURE 21 is a timing chart for the recorder playback operation, and FIGURE 22 is an expanded detail portion of various timing pulses shown in FIGURE 21;

FIGURE 23 is a timing chart for the recorder operations during a rewind condition;

FIGURE 24 is a perspective view of the Unit #1 drawer with all operating components removed;

FIGURE 25 is a rear view of the keyboard unit, removed from the #1 unit drawer front panel and with its rear wall opened and swung down to illustrate the general arrangement of subassemblies and components which are mounted in the keyboard unit;

FIGURE 26 is a partially broken away and partially exploded perspective view of the mechanical keyboard structure apart from the other components of the keyboard unit seen in FIGURES 1 and 25;

FIGURE 27 is an enlarged vertical cross-section of the keyboard structure illustrating the shape of the key plates and the manner in which they are mounted and cooperate with the code bails, the non-count shaft and the counter reset shaft, the reset lever itself being shown as offset from its normal position for clarity;

FIGURE 28 is an enlarged detail view of one of the glass enclosed reed switches and its rockably mounted code bail magnet operator;

FIGURE 29 is an end view of the reed switch and magnet operator seen in FIGURE 28;

FIGURE 30 is a detail plan view of one of the tabs used on the counter reset shaft and on the non-count shaft;

FIGURE 31 is a detail front view of the repeat key, its special key plate assembly and the repeat switch;

FIGURES 32, 33 and 34 are fragmentary views showing details of the space lever and space plate assembly;

FIGURE 35 is a fragmentary view illustrating the solenoid actuated code bail locking assembly;

FIGURE 36 is an enlarged partially fragmentary side view of the character counter located in the keyboard unit;

FIGURE 37 is a partially broken away and partially exploded perspective view of the magnetic tape recorder structure;

FIGURE 38 is a skeletonized perspective view illustrating all of the tape recorder drive trains, and includes the tape wheels, sprocket wheels, solenoids, negator spring and commutator gear;

FIGURE 39 is a rear perspective view of the recorder unit with the printed circuit boards removed;

FIGURE 40 is a detail view looking at the front of the recorder and illustrates the tape feed and stepping wheels and the path of the tape as it passes over the record and playback head;

FIGURE 41 is also a detail view looking from the front of the recorder but with the front plate substantially broken away to illustrate the stepping mechanism and the rewind mechanism, the rewind solenoid being shown in energized position;

FIGURE 42 is a further detail view of components just behind the front plate and can be better oriented by visualizing it as an overlay on FIGURE 41, showing the tape feeding solenoid and its linkage to the feed pawl seen in FIGURE 41;

FIGURE 43 is a vertical cross-section view illustrating the arrangement of the spring biased lost motion stepping mechanism for the tape stepping wheel;

FIGURE 44 is a section taken on line 44—44 of FIGURE 43;

FIGURE 45 is a vertical cross section view illustrating the friction clutch and drive gear as used on each tape spool;

FIGURE 46 is a cross-section lay-out view of the negator spring and commutator assembly;

FIGURE 47 is a detail view of the printed circuit on the commutator gear;

FIGURE 48 is an electrical detail schematic of the commutator circuit;

FIGURE 49 is an enlarged detail view of a segment of tape with a clock and character digital pulse pattern superimposed;

FIGURE 50 is a front perspective view of the printer, primarily to illustrate the general arrangement of printer components and therefore omitting many details which are illustrated in the following figures;

FIGURE 51 is a partially sectioned elevation view showing the print drum with its drive gear, clock assembly, and bearing mounting and also illustrating the paper feed components;

FIGURE 52 is a partially sectioned and partially exploded detail perspective view illustrating the left hand drum bearing housing assembly and the drum clock components;

FIGURE 53 is a diagrammatic view of the drum clock disc showing relative positions and overlapping paths of the indexing and LTRS and FIGS notches, as well as the positions of the clock heads relative to each other;

FIGURE 54 is a side elevation view of one of the plurality of double typewheel discs from which the type drum is assembled;

FIGURE 55 is a layout detail view of a portion of the double type on the periphery of a typewheel;

FIGURE 56 is a machine drawing detail, shown in section taken on lines 56—56 of FIGURES 54 and 55, and illustrates the drum assembly register slot and the requisite manufacturing tolerances for a disc with standard teletypewriter characters;

FIGURE 57 is an elevation detail view from the right hand side illustrating the paper feed pressure roller mounting and the paper feed ratchet, pawl and solenoid, one of the feed wheels being shown only in outline;

FIGURE 58 is a detail view taken from the righthand side of the printer illustrating the righthand ribbon lift assembly which includes the ribbon lift solenoid;

FIGURE 59 is a detail view from the rear illustrating the ribbon lift components;

FIGURE 60 is a detail perspective of the print hammer carriage assembly, several components being illustrated in exploded position for clarity;

FIGURE 61 is a side elevation view of the print hammer carriage assembly looking from the righthand side;

FIGURE 62 is a detail exploded perspective of the print hammer block subassembly;

FIGURE 63 is a detail elevation view of the inside of the righthand printer support plate showing the space solenoid assembly;

FIGURE 64 is an elevation view from the same position as FIGURE 63 excepting that a wall portion is broken away to show the print hammer carriage spacing spring drum;

FIGURE 65 is a detail plan view of the carriage return clutch, its operating solenoid and some of the operating linkage, and will be more clearly understood if analyzed together with FIGURES 66 and 67;

FIGURE 66 is a perspective view looking at the carriage return operating mechanism mounted on the outside of the lefthand vertical support plate;

FIGURE 67 is a skeleton schematic of the carriage return operating links (actual assembly seen in FIGURE 66), latches, etc., with all fixed support pivot pins (or studs) having hatched ends;

FIGURE 68 is a detail front elevation view showing only the linkages which accomplish tripping of latches and declutching upon completion of carriage return to a start-of-line position;

FIGURE 69 is an enlarged cross-section view of the carriage return clutch and return belt drum assembly;

FIGURES 70, 71 and 72 are sections taken on lines 70—70, 71—71 and 72—72, respectively, of FIGURE 69, illustrating the sleeve flat used to lock the discs on the driven member of the input friction clutch, FIGURE 71 illustrating the form of teeth on the positive clutch members, and FIGURE 72 illustrating the preliminary return spring drum.

GENERAL

Figure 2:
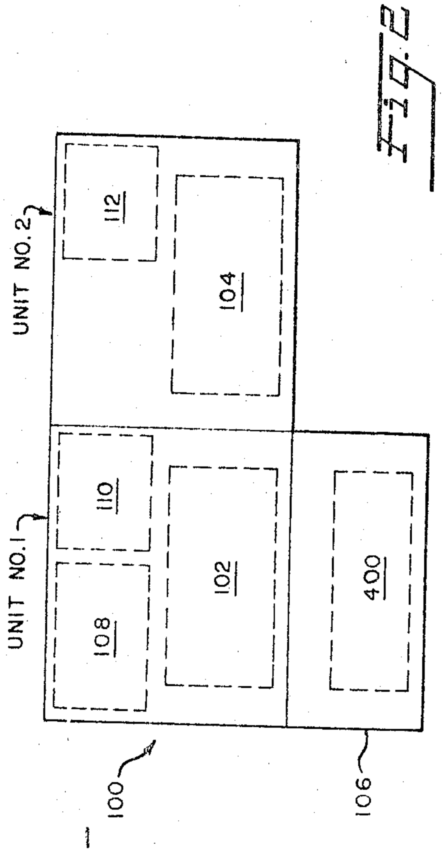
FIGURE 2 is a diagrammatic plan view representi the general layout of the units and the major subcomp nents, the latter being illustrated by dotted lines.

An over-all view of the exemplary teletypewriter set 100 is shown in perspective in FIGURE 1 and diagrammatically in FIGURE 2. This equipment was initially developed for shipboard installation for use in telegraphic communication from ship-to-ship and from ship-to-shore, and accordingly, certain aspects of weatherproofing are included in this disclosure.

The set is a send-receive teletypewriter set designed for keyboard sending and magnetic tape recorder sending, page copy monitoring and page copy receiving. Two or more sets can be interconnected directly and operated with, or without, the use of intermediate equipment. Simultaneous sending and receiving is possible with a set, one call being received on one printer 102 of the set, a second call being received on the second printer 104 of the set, and a third call being sent from either the keyboard 106 or the tape recorder 108.

The set can operate at 60 or 100 w.p.m. in conjunction with three separate loops: two receive, and one send. A tone frequency of 1200 cycles is employed on the loops for neutral, start-stop, Baudot-code signaling. By suitable redesign the units of the set can accommodate other codes.

Figure 3:
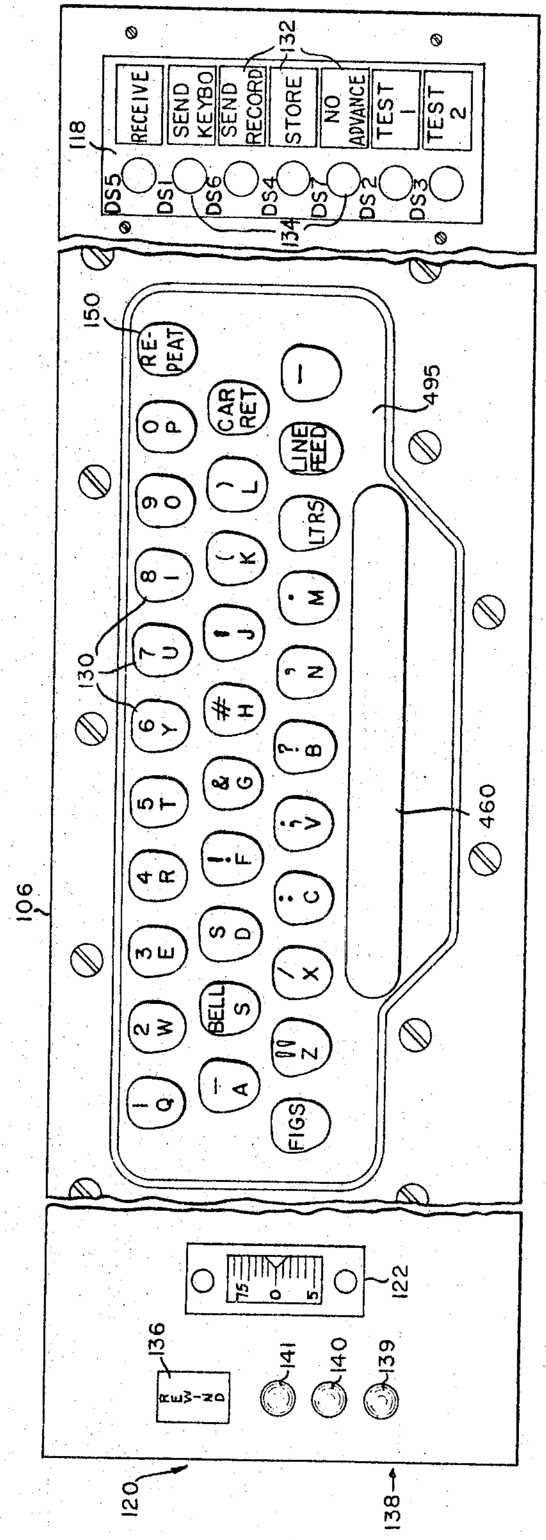
FIGURE 3 is a plan view of the keyboard illustrati the key arrangement, indicators and the mode control f the set.
Figure 4:
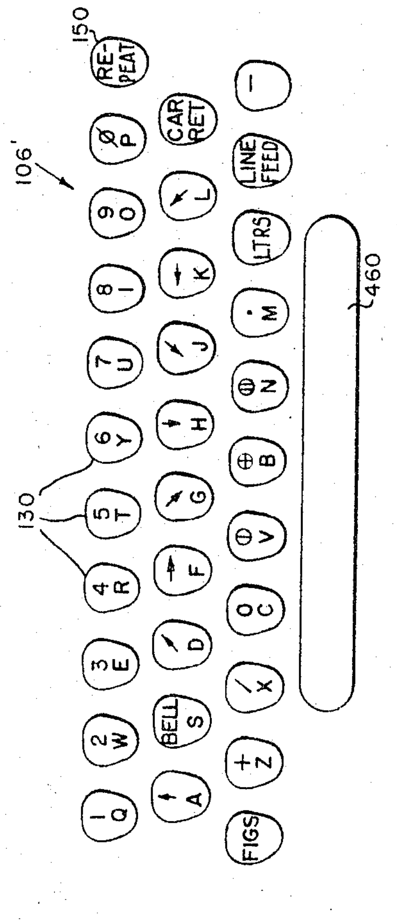
FIGURE 4 illustrates the same arrangement of keys shown in FIGURE 3 but with some different charact legends as necessary when the set is to be used as a weath information set.

Referring to FIGURES 3, 4 and 5, the keyboard keys 130 may be equipped with communication or weather symbol key caps, a weather "type" drum being used for the printer to convert to use with the weather symbol key cap equipped keyboard 106'.

A complete teletypewriter set (FIGURE 1) consists of two Units, Unit 1 and Unit 2. Unit 1 contains a printer 102, a keyboard unit 106, a magnetic tape recorder 108 and a power supply unit 110. As represented in FIGURE 2, the printer 102, recorder 108, and power supply unit 110 are mounted on a drawer 113 (see FIGURE 24) which slides on tracks (not shown) into a two-piece cover 114. Unit 2 contains a printer 104 and a power supply unit 112 also mounted on a drawer identical to Unit 1 drawer 113 which slides into a cover assembly 114. Manual control of the various operations of the set is maintained from the panels on the keyboard unit 106 of Unit 1.

The keyboard unit (see FIGURES 1, 2 and 25) consists of a cover case 116, a typing mechanism (see FIGURE 26), keyboard electronics, a mode selection panel 118, mode switches and relays K1–K9 (under the mode pushbuttons), a tape recorder monitor panel 120, a character counter 122, and a keyboard-locking mechanism 123 (see FIGURES 25, 26 and 35), the cover case 116 mounting against a seal strip 124 (see FIGURE 24) on a front wall panel 126 of the drawer 113. The mode panel subassembly 118 and a seal gasket 125 are secured to the keyboard cover case 116 by screws. Functionally, the keyboard unit also includes two tuning fork oscillators 128 which are mounted in the power supply unit 110 and provide accurate time bases for a 60- or 100-w.p.m. sequential transmission by the keyboard.

A depressed typing key 130 causes the keyboard unit to generate both a 5-bit, parallel signal in Baudot code and a 7-bit, start-stop, serial signal in Baudot code.

A depressed mode pushbutton 132 causes the keyboa to switch various input-output connections of the set desired operating modes and to light the applicable mo indicating lamp 134.

The REWIND pushbutton 136 on the record monit panel 120 causes the keyboard unit to signal the ta recorder 108 to rewind its magnetic tape.

In response to signals from the recorder 108 the ke board unit 106 indicates, by lighted ones of lamps 13 the position of the tape in the recorder.

As determined by the selected mode of operation, t keyboard unit 106, as part of Unit 1, is used (1) to ser coded messages through a 1200-cycle tone generator 1 (see FIGURE 6) directly to the outgoing line (SEN KEYBD mode), (2) to store a message in the magnet tape recorder 108 (STORE mode), and (3) to test t printers 102 and 104 (TEST 1 and TEST 2 modes).

The 32 typing keys are arranged in a mechanical ke board 400 (FIGURE 26) in three rows in teletypewrit order, although having typewriter spacing between key One to five glass-enclosed reed switch contacts 146 (s FIGURE 16) (to be later fully described) close ma netically in response to the depression of any key to pr vide a parallel electrical encoding of the correspondi character. A sixth reed switch 148 (universal bar switc closes for each key depression to supply a start signal the associated keyboard electronic circuits. The feel an electric typewriter keyboard is duplicated even thou there is no mechanical linkage between typing mechanis and printer. Two-character typing bursts that excee the line rate of 60 or 100 w.p.m. are permissible; t keyboard lock solenoid 123 and associated mechanis holding the second character in mechanical storage un the first character is transmitted electrically. A repe key 150 (see FIGURES 2 and 31) permits repeated tran mission of any character whose associated key 130 is he down at the same time.

The main function of the keyboard electronics (s logic diagram of FIGURE 16) is to convert parallel ele trical signals generated by the typing mechanism or b the recorder into the serial electrical signals required b the outgoing line. The keyboard electronics are co tained principally on two printed circuit boards 152 an 154 (see FIGURE 25) mounted in the rear wall unit 15 of the keyboard unit 106.

Seven mode pushbuttons 132 and seven associate lamps 134 (see FIGURE 2) make up the mode selectio panel 118 to the right of the typing keys. The pushbu tons allow the operator to select a mode of operatio for either Unit 1 or Unit 2. Momentary operation of pushbutton causes operation of an associated switch an electrical locking of one or more associated mode rela K1–K9 and also lights a corresponding lamp 134 (DS1 DS7) on the mode selection panel 118. With the pus buttons, the operator can place the set in the followin modes:

(1) IDLE (RECEIVED): In the idle mode, th motors of both printers are off; the RECEIVE lamp DS is on; and the set is available for local use, for receivin from another station, or for both, simultaneously. O eration of the RECEIVE pushbutton places the set in th idle mode and discontinues all other modes except th RECEIVE mode. To set up an incoming call to th station, associated telegraph terminal group equipme (not part of this invention) operates a supervisory rela in Unit 1 or Unit 2 to turn on the associated printer mot and thus place the set in the RECEIVE mode.

(2) STORE: The STORE mode connects the parall output of the keyboard unit 106 to the tape recorder 10 and the serial output of the same keyboard unit 106 t the printer 102. This allows the operator to store a me sage prior to sending it to the outgoing line and to mon tor the storing process. Operation of the STORE pus button places the set in the STORE mode and lights th STORE lamp DS4. After typing the message to reco on the magnetic tape, the operator presses the REWIND ushbutton 136 on the recorder monitor panel 120. This ction causes the tape recorder 108 to rewind and thus laces the message on the tape in a position to be read nd sent to the line.

(3) NO ADVANCE: The NO ADVANCE mode du-licates the STORE mode except that a blank area (used s a signal condition as will be fully described herein-fter) is not inserted on the magnetic tape just ahead of he recorded message. This mode is used after a STORE aode has been interrupted to allow receipt of an incom-ng message on the Unit 1 printer. A blank area cannot e permitted in a recorded message on the tape since the rea is used by the recorder 108 to recognize the end of message.

(4) SEND KEYBOARD: To set up a call to the utgoing line, the operator presses the SEND KEYBD ushbutton. This extends a D.C. supervisory ground rom the connecting equipment to a mode switching relay which operates from and locks to the supervisory ground). The RECEIVE lamp DS5 turns off and the END KEYBD lamp DS1 turns on. In the SEND KEYBD mode, it is possible to receive on Unit 1 printer 02 or on Unit 2 printer 104 or on both printers simul-aneously; the output of the keyboard does not appear on he Unit 1 printer 102 as it does during the STORE mode. All characters typed on the keyboard during this mode are ent to the outgoing line.

(5) SEND RECORD: To send from the recorder to he outgoing line during the SEND KEYBD mode, the operator presses the SEND RECORD pushbutton. This tarts the tape recorder 108 which will send one tape ecorded message and then stop automatically.

(6) TEST 1: The TEST 1 mode allows the operator o test the Unit 1 printer by typing directly into it.

(7) TEST 2: The TEST 2 mode allows the operator o test the Unit 2 printer by typing directly into it.

*The Unit 1 Printer* 102 prints standard communica-ions or weather symbols on page copy (see FIGURES 3 and 4).

As determined by the mode of operation, the Unit 1 printer 102 is used to receive messages from an incoming line 1 (RECEIVE mode), to monitor the recording proc-ess (STORE mode), and to test the keyboard (TEST 1 mode).

Functionally, the printer consists of a printing mecha-nism (see FIGURE 50), printer electronics (see logic dia-gram FIGURES 12A and 12B), two control panels mount-ed (see FIGURES 1 and 24) on the front panel 126 of the drawer 113, a bell mounted inside of the cover (not shown), and a time base selection switch (on the power supply unit, see FIGURE 8). The printer electronics are principally physically contained on a large printed circuit board (not shown) which is mounted to the underside of the drawer base plate 113 which also supports the print-ing mechanism, power supply 110, and recorder 108. Most of the hi-power transistors in the printer and record-er circuits, for convenience, are mounted in heat sinks (not shown) on the rear of the cover 114.

The printing mechanism will be more fully described hereinafter, but, briefly, employs a rotating drum com-posed of thirty-six double row type wheels, or a total of 72 rings of type, each ring having the 52 standard com-munication symbols (FIGURE 5). For weather symbols, the drum has 76 rings of type, each ring having the 52 weather symbols (FIGURE 5). A print hammer is moved from left to right in front of the drum under an escapement type spring-biased stepping mechanism and strikes the drum once per revolution for each character to be printed. The printing mechanism has a pulse clock mechanism which supplies a series of pulses to the printer electronics representative of drum rotational position. Since each pulse represents a new character in the print-ing position, the pulses furnish information which allows the printer electronics to energize the print hammer sole-noid as the desired character moves in front of the ham-mer. Characters on each ring of type are placed in binary order according to the Baudot code for the char-acter (see FIGURE 14). Thus, each character is as-signed a position in a 32-count, binary progression so that the printer electronics can compare an incoming character against the series of pulses that indicate the physical position of the drum characters.

The main functions of the printer electronics are as follows: (1) Register in parallel to form the five serial in-formation bits of an incoming character. (2) Determine whether the five bits represent either a printing or a machine function character. (3) Determine what the machine function is. (4) Shift the five bits into a sec-ond set of registers to make room for the following character while the first character is being printed or while the represented machine function is being per-formed. (5) Shift the five bits into a third set of regis-ters to make room for two characters during an auto-matic carriage return period. (6) Control ribbon lift-ing so that the ribbon will be raised before the print solenoid is energized. (7) Under control of character-position pulses from the printing mechanism, determine when the character corresponding to the registered char-acter is about to pass the print hammer. (8) Control energizing of the print solenoid. (9) Control operation of the spacing mechanism after the character is printed. (10) Control operation of the carriage return and line feed mechanisms.

*The Unit 1 Power Supply* 110 (see FIGURES 7 and 8) converts 115-volt, 400-cycle, single-phase power into the D.C. voltages required by Unit 1. The output volt-ages are regulated to provide negative 33 volts for the driving transistor collectors and the associated solenoids that perform such machine functions as keyboard lock-ing, printer spacing, and recorder tape advance; nega-tive 20 volts for the one-shot and amplifier collectors that precede the driving transistors of the printer and recorder; negative 12 volts for the collectors of all other transistors; and positive 5 volts for the biasing of most transistors. Unregulated 28 volts also is provided for the switching relays, keyboard lamps, and printer copy lamps.

Power supply components such as the input trans-former 160, filter capacitors C–1, C–2, C–3 and C–4, and resistors are mounted as a subcomponent 110 on the Unit 1 drawer behind the printer mechanism. Other components such as the power transistors and reference diodes which present heat dissipation problems as has been described are located on heat sinks (not shown) mounted on the outside rear of the printer cover.

The power supply chassis 162 on the printer drawer is a common connection point where cables from the ex-ternal connectors and external power supply components, from the printer electronics, all plug into connectors which are wired together. The two keyboard tuning fork frequency standards also are mounted in the power supply.

The Recorder Package 108 (see FIGURE 37) con-sists of four printed circuit boards, a magnetic tape sup-ply reel and associated take-up reel, a sprocket-drive mechanism, and a rewind mechanism. The sprocket-drive mechanism steps the tape forward in 1-character steps during record and playback. The rewind mech-anism contains a powerful driving spring (termed a negator spring), which is wound up by the sprocket-drive mechanism during recording and playback. Dur-ing rewind, the negator spring force is released to re-wind the tape. The recorder stores information in digital serial form on magnetic tape.

In Unit 1, the tape recorder stores a message as it is typed on the keyboard unit 106. After a complete message is stored, the tape recorder 108 is used to send the message to the outgoing line at the line rate of 60 or 100 w.p.m. as determined by a switch on power supply unit 110. Between the recording and sending of a message, the tape must be rewound.

Components required to perform the recording and reproducing functions are contained in one compact package 108 located behind the printing mechanism 102 in Unit 1. *When sending to the outgoing line, the recorder uses the parallel-to-serial converter, tone generator, and tone keyer that are part of the keyboard electronics.*

Two tracks are recorded on 16-millimeter magnetic tape (see FIGURE 49). One track contains clocking (synchronizing) pulses and the other track contains the information pulses. For a given character, eight clocking pulses and one to five information pulses are recorded. Up to 3600 characters can be stored. Rewind of this exemplary 3600-character tape recorder, takes less than 10 seconds.

*Unit 2 printer.*—The Unit 2 printer 104 provides another means of receiving when the Unit 1 printer 102 is busy, and is identical to the Unit 1 printer.

*Unit 2 power supply.*—The Unit 2 power supply 112 is identical to the Unit 1 power supply 110 except that tuning fork oscillators are not provided in Unit 2. Further, a dummy plug is provided with the Unit 2 power supply 112 to replace the connector that terminates the cable from the keyboard 106 in the Unit 1 power supply 110. The dummy plug will provide connections that loop through the mode panel in Unit 1.

OVER-ALL FUNCTIONAL DESCRIPTION

Figure 6:
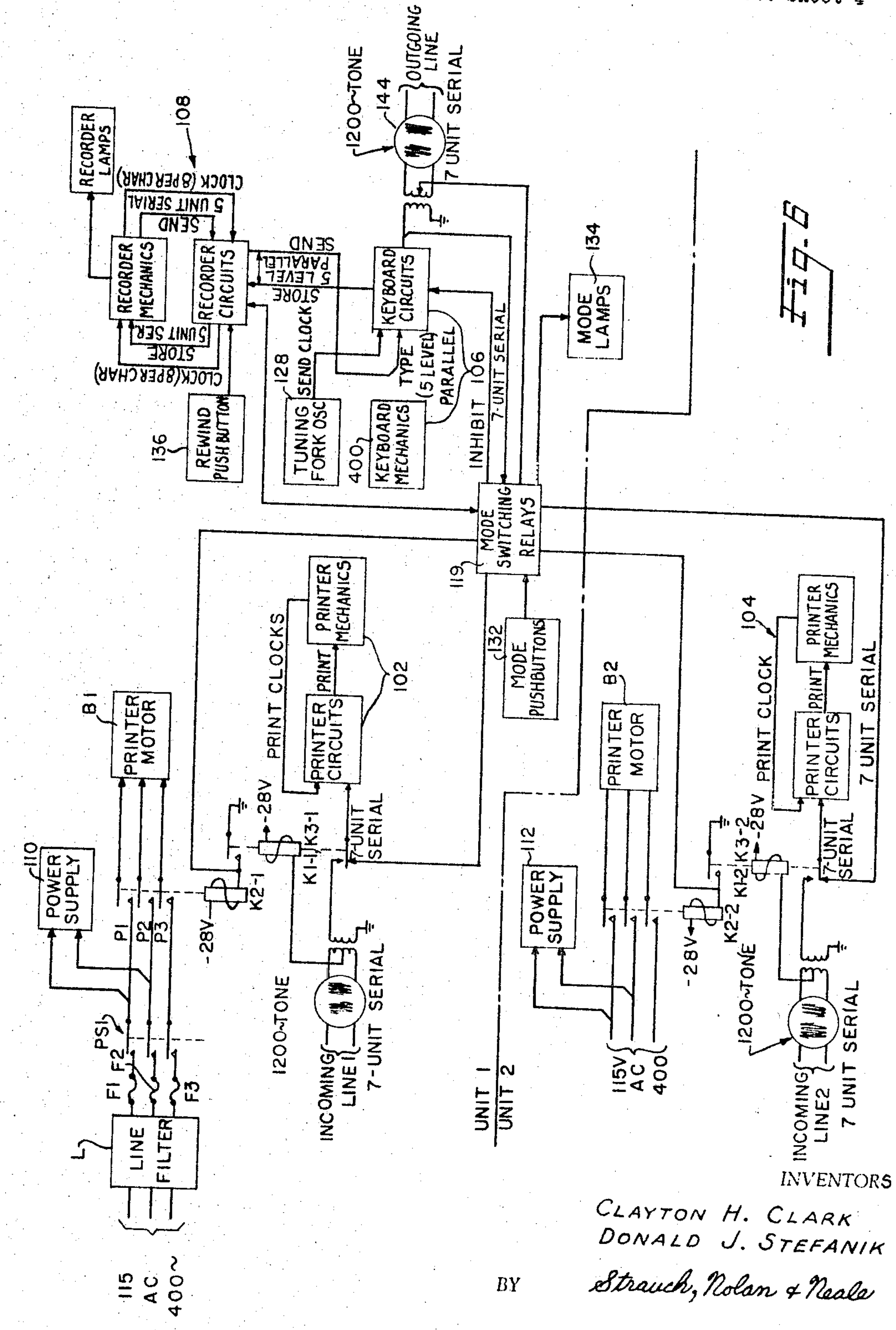
FIGURE 6 is a block diagram illustrating the oper ing functions of the complete teletypewriter set depict in FIGURE 1.
Figure 9A:
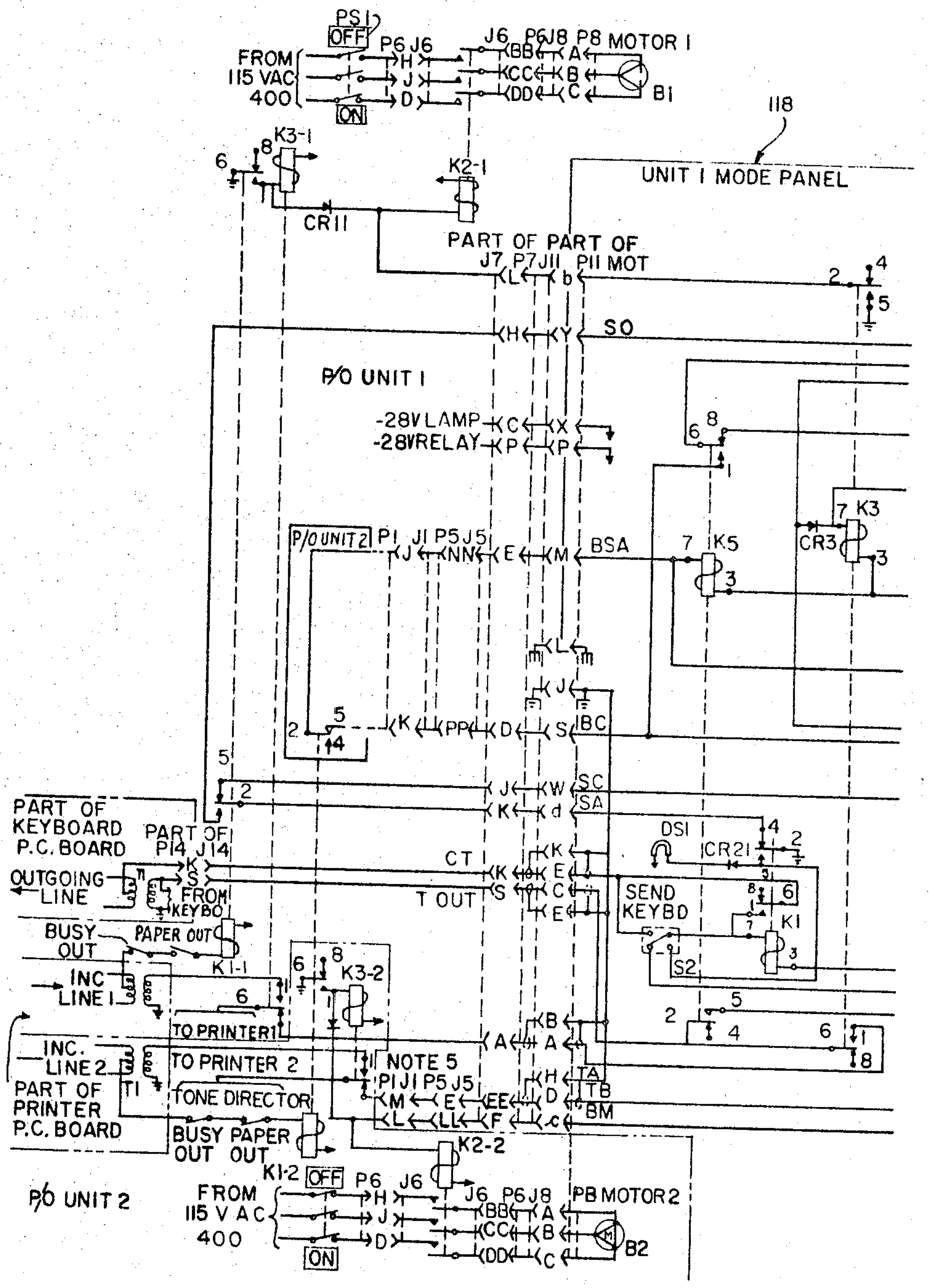
FIGURE 9 is shown on two sheets as FIGURES 9 and 9B and is a schematic illustrating the circuitry of t mode control panel on the keyboard unit and, for conve ience, some components of correlated subassemblies in t teletypewriter set.
Figure 9B:
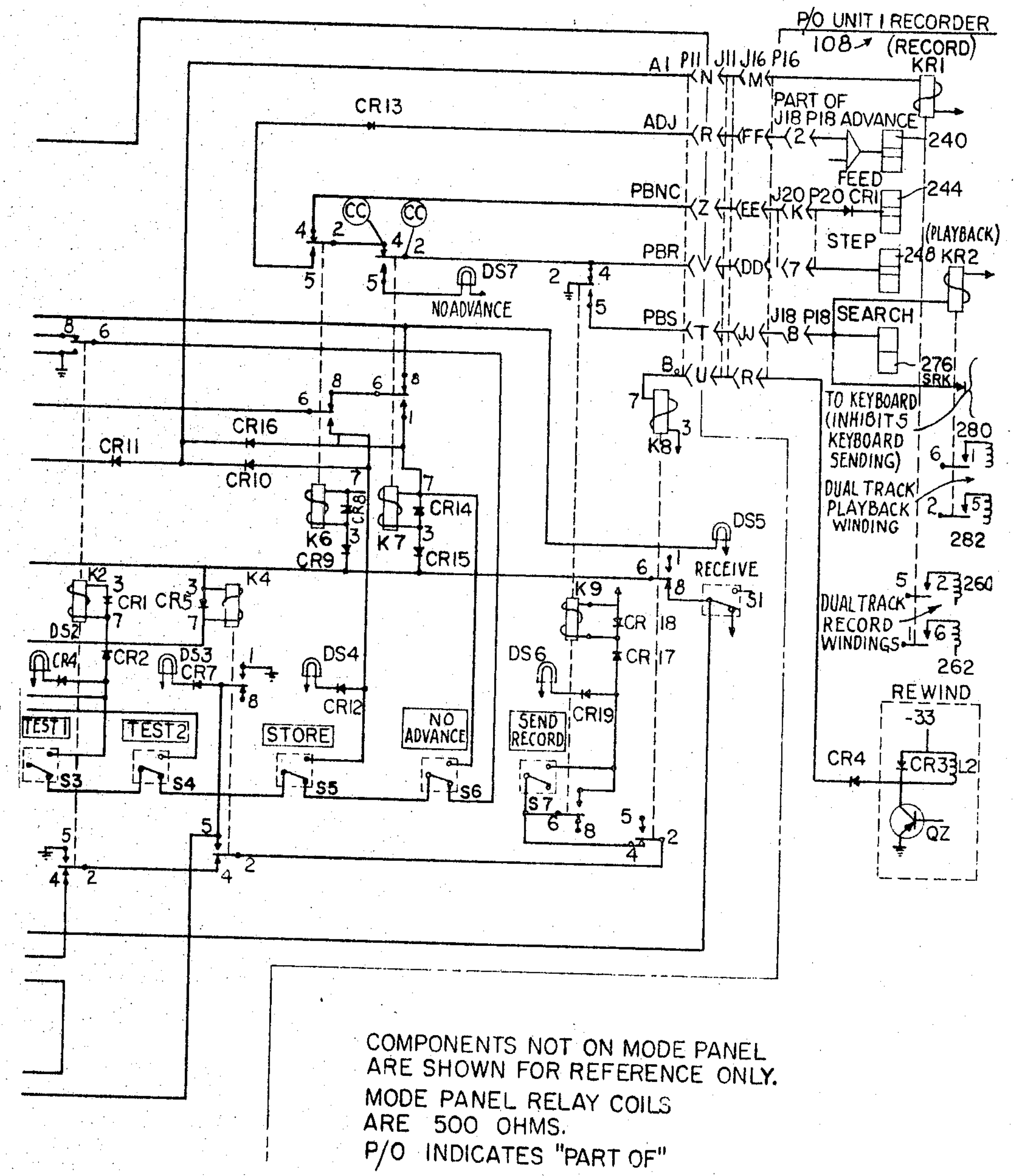

FIGURE 6 shows the various functional sections and associated external signaling lines of the exemplary teletypewriter set, FIGURE 7 shows the power supply circuit and FIGURES 9A and 9B viewed as a single figure show the mode panel control circuits.

As a general rule, final control of both incoming and outgoing transmission to and from the exemplary set will originate from associated telegraph terminal group equipment (not shown).

INCOMING MESSAGES: Referring primarily to FIGURES 9A and 9B, to seize Unit 1 and turn on the printer motor B1, associated terminal group equipment (not shown) provides ground potential to incoming line 1 (lower left corner of FIGURE 9A) on a simplex basis. Relays K1–1 and K3–1 operate over this supervisory path, in turn operating relay K2–1 to turn on the printer motor B1. To seize Unit 2 and turn on its printer motor B2, the associated equipment provides ground potential to incoming line 2. Relays K1–2 and K3–2 operate over this supervisory path, operating relay K2–2 to turn on driving motor B–2.

OUTGOING MESSAGES: Since outgoing transmission depends on the availability of remote switching equipment (not shown) the associated equipment (not shown) will of course determine when a call can be originated. To request use of the outgoing line, the local operator depresses the KEYBD SEND push button to operate switch S–2 to connect a mode relay K1 to the outgoing line. If the associated equipment is available, ground potential is applied to the outgoing line on a simplex basis, completing a circuit for the mode panel relay K1. Relay K1 locks to the supervisory ground signaling through its relay terminals 1 and 6 and lights the SEND KEYBD lamp DS–1 through relay terminals 2 and 5 to signal the operator that sending may start.

MESSAGE PREPARATION CONTROL: Control of the Unit 1 recorder 108 while storing a message is maintained from the Unit 1 keyboard 106 through mode push buttons REWIND, STORE, and NO ADVANCE.

REWIND: The REWIND pushbutton 136 (recorder control panel 120) triggers the Unit 1 recorder circuitry directly; that is, it does not provide control through the mode panel relays. However, during rewind, the recorder circuit operates a mode panel relay K8 to discontinue the STORE mode, as will be described later. Discontinuing the STORE mode during rewind avoids loss of stored characters.

STORE: The STORE mode pushbutton, through switch S5, lights the STORE lamp DS4 and energizes relays K6 and K3 which (a) prepare the circuits of the recording head windings through recorder relay KR1, (b) keep the STORE lamp DS4 lighted, (c) lock under control of contacts 2 and 5 of the RECEIVE mode relay K1–1 so that the associated equipment can interrupt the STORE mode, and (d) as described under a following section entitled Recorder Logic, trigger the advance controller of the recorder circuitry through contacts 2 and 5 of relay K–6 to advance a small amount of tape over the recording head. This blank portion of tape will act as an end-of-message signal for the first of two messages stored successively. Further, the operated mode panel relays K6 and K3 (a) start the Unit 1 printer motor B1, and (b) connect the output of the keyboard through contacts 1 and 6 of relay K3 and contacts 6 and 8 of supervisory relay K3–1 to the input of the Unit 1 printer 102 so that the printer will monitor what is being stored.

NO ADVANCE: The NO ADVANCE mode pushbutton, through switch S6, lights the NO ADVANCE lamp DS7 and energizes mode panel relays K7 and K3 which (a) prepare the circuits of the recording head windings, (b) keep the NO ADVANCE lamp DS7 lighted, and (c) lock under control of the RECEIVE mode relay K1–1 so that the associated equipment can interrupt the NO ADVANCE mode (which is an auxiliary STORE condition). Note that the advance control of the recorder is by-passed in this mode and no blank tape is inserted ahead of the stored message. Further, the operated mode panel relays K7 and K3 (a) through contacts 2 and 5 of relay K3, start the Unit 1 printer motor B1, and (b) through contacts 1 and 6 of relay K3, connect the output of the keyboard 106 to the input of the Unit 1 printer 102 so that the printer 102 will monitor what is being stored in recorder 108.

SENDING CONTROL: Control of the keyboard 106 and recorder 108 during sending to the outgoing line is maintained from the mode panel pushbuttons 132 as soon as an outgoing line is made available by the associated equipment.

KEYBOARD: The keyboard 106 is always connected to the outgoing line. As soon as the SEND KEYBD lamp DS1 lights when the SEND KEYBD pushbutton switch S2 is operated, associated equipment is available to extend the call to the desired station and the operator may start typing.

RECORDER: When the called station is reached (as indicated by acknowledgement characters being printed by the Unit 1 printer 102), the recorder 108 is started by operation of the SEND RECORD pushbutton. This pushbutton operates switch S7 to energize mode panel relay K9 which (a) through its contacts 2 and 5 prepares the circuits of the recorder playback head windings 280 and 282, (b) lights the lamp DS6 beside the SEND RECORD pushbutton, (c) locks under control of the supervisory ground returned over the outgoing line from the associated equipment and through contacts 1 and 6 of SEND KEYBD Relay K1, (d) triggers a searching operation by the recorder 108 by a ground through contacts 2 and 5 of relay K9, and (e) blocks the keyboard electrically through the same contacts 2 and 5 of relay K9 and associated keyboard circuitry so that the keys cannot supply a character even if operated by mistake. In searching, the recorder 108 advances the magnetic tape over the head but does not send to the outgoing line until a character is found on the tape.

INCOMING SIGNALING: The mark signal on either incoming line is a continuous 1200-cycle tone. The tone is removed to indicate a space signal. A tone detector included in the printer circuits responds to the 1200-

'cle tone to keep a transistor on for mark and to turn off for space.

SERIAL-TO-PARALLEL CONVERSION: An incom- g character consists of seven bits, each bit a space or a ark (see FIGURE 5). The first bit or start pulse readies e printer circuits to register each of the next five bits ' code elements separately. Once the five code ele- ents are registered, the printer circuits determine what e character is and cause the corresponding character to : printed or the corresponding machine function to be :rformed. The stop pulse is not used by the exemplary inter circuits which will be hereinafter described.

OUTGOING SIGNALING: A 1200-cycle, free-run- ng multi-vibrator supplies a mark tone on the outgoing ıe with the spacing pulses provided by turning off the ulti-vibrator for a time controlled by a tuning fork cillator frequency standard. The frequency standard 'ives a 3-stage counter, the output of which turns the ultivibrator on and off in a series of marks and spaces :termined by the Baudot code of the desired character. haracters are supplied either by depressing a keyboard ping key 130 or by causing the recorder 108 to move character stored on magnetic tape past the recorder :ad playback windings 280 and 282.

MODE CIRCUIT OPERATION

FIGURES 6A and 6B show the mode panel and its sociated circuits in schematic form. The following eory explanation shows how the relays of the mode ınel switch the various internal and external connec- ›ns of the teletypewriter set under control of both the sociated equipment (not shown) and the local operator.

IDLE CONDITION: With no incoming or outgoing affic, all mode panel relays K1 through K9 are released, ıd the two supervisory relays K1–1 and K1–2 for inter 102 are released. Motor B2 control relays K2–1 ıd K2–2 are also released and the printer driving otors B1 and B2 are off. Further, incoming line relays 3–1 and K3–2 are released. The RECEIVE lamp DS5 lighted during the idle condition through the following rcuit: negative 28 volts through lamp DS5, contacts 8 ıd 6 of relay K7, contacts 8 and 6 of relay K6, con- cts 8 and 6 of relay K5, contacts 8 and 6 of relay K2, ›rmally closed contacts of the NO ADVANCE, TORE, TEST 2 and TEST 1 switches, pin W of P11– .1, pin J of P7–J7, contacts 5 and 2 of relay K1–1, pin of J7–P7, pin *d* of J11–P11, contacts 4 and 2 of relay 1, to ground.

RECEIVE CONDITION: The associated equipment ·ovides ground potential to incoming line 1 or 2 to gnal the corresponding Unit 1 or Unit 2 printer to re- ive. This simplex ground signaling operates relay 1–1 or K1–2. Hence, if Unit 1 is to receive, line 1 is ounded and the following events occur. Battery-con- ›cted relay K1–1 operates, and switches the operating rcuit for RECEIVE lamp DS5 through contacts 2 and so that now only relay K1 controls the RECEIVE mp. The RECEIVE lamp remains on as a signal that message will be sent to the set. Relay K1–1 energizes lays K2–1 and K3–1 from ground through its contacts and 1. Diode CR11, in the operating path of relay 3–1, will allow current to flow from contacts 6 and 1 ' relay K1–1 to the coil of relay K2–1, but will block ırrent flow in the opposite direction when relay K2–1 operated by mode panel relay K3. Relay K2–1 then rns on the printer motor of Unit 1. Relay K3–1 then ›nnects the incoming signal line to the printer elec- onics through its contacts 6 and 1, and disconnects the :yboard output circuit from the printer electronics. uring the STORE mode (as will be explained herein- ter) relay K3–1 is released to disconnect the incoming gnal line from the printer while the keyboard is send- g. The mark tone on the incoming line would other- ise prevent the printer from monitoring what is being :nt by the keyboard. At the end of the message, the associated equipment removes ground potential from incoming line 1. Relays K1–1, K2–1, and K3–1 release, the printer motor B1 of Unit 1 turns off, and the RECEIVE lamp DS5 remains lighted.

If Unit 2 is to receive, line 2 is grounded and the following events occur. Relay K1–2 operates and operates relays K2–2 and K3–2 through contacts 6 and 1. Further, relay K1–2 opens a possible circuit through contacts 2 and 5 to relay K5 to release relay K5 during the TEST 2 mode. This feature allows the associated equipment to stop the TEST 2 mode at any time. Similarly, relay K1–1 opens a possible circuit through contacts 2 and 5 to relay K2 to stop the TEST 1 mode at any time. Relay K2–2 turns on the printer motor B2 of Unit 2. Relay K3–2 connects incoming line 2 through contacts 8 and 6 to the printer electronics of Unit 2. With only Unit 2 receiving, the RECEIVE lamp DS5 remains lighted but under control of mode relays K1, K2, K5, K6, and K7. This feature emphasizes the receive-only nature of Unit 2 (since the RECEIVE lamp indicates that Unit 2 is receiving only when another mode, STORE, for example, is not occurring at the same time). At the end of a message to Unit 2, relays K2–1, K2–2, and K3–3 release, the printer motor B2 of Unit 2 turns off, and the RECEIVE lamp DS5 remains lighted.

STORE: To store a message in the recorder before sending to the outgoing line, the operator depresses and holds the REWIND pushbutton until the green start-of-tape lamp lights momentarily. Operation of the STORE pushbutton now completes a circuit for relay K6 as follows: negative 28 volts through RECEIVE switch S1, contacts 8 and 6 of relay K8, blocking diode CR9, coil of relay K6, operated contacts of STORE switch S5, non-operated contacts of switches S4 and S3, pin W of P11–J11, pin J of P7–J7, contacts 5 and 2 of relay K1–1, pin K of J7–P7, pin *d* of J11–P11, contacts 4 and 2 of relay K1, to ground. Relay K6 operates and turns off the RECEIVE lamp DS5 through contacts 8 and 6; locks itself to the same operating ground that was used by the RECEIVE lamp through contacts 6 and 1; and extends ground to the recorder to trigger the advance one-shot through contacts 2 and 5. The STORE lamp DS4 lights from the same circuit that holds relay K6 operated. The recorder advances the tape a set amount to assure that any variation in the commutator contacts that light the start-of-tape lamp will not prevent recording from starting on a usable portion of the tape.

The same circuit that operates relay K6 also operates relay K3 as follows, starting from ground already traced to terminal 7 of relay K6: diode CR10, diode CR11, coil of relay K3, contacts 6 and 8 of relay K8, normally-closed contacts of the RECEIVE switch S1, to negative 28 volts. Operated, relay K3 at contacts 1 and 6 completes a circuit from the keyboard output to the printer 102 input as follows: keyboard connectors P14–J14 pin S, connectors J7–P7 pin S, mode panel connectors J11–P11 Pin C, contacts 6 and 1 of relay K3, connectors P11–J11 pin A, connectors P7–J7 pin A, contacts 8 and 6 of relay K3–1, to the printer 102 electronics. This path allows the information being stored in the recorder to appear also on the printer 102 of Unit 1. Mode panel relay K3 operates power supply relay K2–1 through contacts 5 and 2 which supplies power to the motor B1 of printer 102. The same operating circuit used for relay K6 also operates the magnetic tape recorder relay KR1 via diode CR10. Recorder relay KR1 prepares circuits to the record head windings 260 and 262.

To interrupt the STORE mode for an incoming message, the associated equipment places ground potential on incoming line 1. Relay K1–1 operates; lights the RECEIVE lamp DS5 through contacts 2 and 4; releases relays K6 and K3 through contacts 2 and 5; turns off the STORE lamp DS4; and releases recorder relay KR1. Relay K1–1 holds relay K2–1 operated through contacts 6 and 1 to keep the motor running, and operates relay K3–1 to connect incoming line 1 to the printer tone detector.

NO ADVANCE: To continue storing a message in the recorder after an interruption to allow an incoming message to be received, the operator depresses the NO ADVANCE pushbutton. Operated, the NO ADVANCE switch S6 completes a circuit to relay K7 from the same ground that the STORE switch S5 extended to relay K6, as has been explained hereinbefore. Relay K7 operates, lights the NO ADVANCE lamp DS7 through contacts 2 and 5, turns off the RECEIVE lamp DS5 through contacts 8 and 6, and at contacts 6 and 1 locks to the original operating ground from relay K1 contacts 4 and 2. Note that the advance one-shot 240 in the recorder electronics is not triggered as occurred in the previously described STORE mode. Relay K3 operates as in the STORE mode to turn on the Unit 1 printer motor B1 and to connect the keyboard output to the printer 102.

REWIND AFTER STORE OR NO ADVANCE: After a message is stored, the operator depresses the REWIND pushbutton. Mode panel relay K8 operates through recorder transistor Q2 which is turned on by the operated pushbotton switch. Relay K8 at contacts 8 and 6 releases relay K6 (STORE mode) or K7 (NO ADVANCE mode), and also releases relay K3. When rewind is completed, recorder transistor Q2 (see portion of recorder electronics, lower right of FIGURE 9B) is turned off and relay K8 releases.

SEND KEYBD: Before sending to the outgoing line, the operator depresses the SEND KEYBD pushbutton. If the associated equipment is ready to assign a link to this station, ground potential is placed on the outgoing line. Switch S2 extends this ground to relay K1. Relay K1 locks to the ground on the outgoing line through contacts 7 and 6, lights the SEND KEYBD lamp DS1 through contacts 2 and 5, and turns off the RECEIVE lamp DS5 through contacts 2 and 4. With the SEND KEYBD lamp DS1 on, the operator types the called station's call letters and then depresses the RECEIVE pushbutton. Relay K1 releases because the operated RECEIVE switch S1 opens its circuit. Relay K1 disconnects negative 28 volts from the outgoing line through contacts 7 and 6 as a signal that the call letters have been sent. When the connection is established to the called station, a go-ahead signal is sent by the associated equipment to the printer of Unit 1. The operator now depresses the SEND KEYBD pushbutton again and types the message or starts the recorder. The SEND KEYBD switch S2 extends ground potential to relay K1. Relay K1 operates, locks to the outgoing line as before, and lights the SEND KEYBD lamp DS1.

SEND RECORD: After receiving a go-ahead signal, in the manner above described, the operator depresses the SEND KEYBD pushbutton to seize the outgoing line. If the recorder is to send the message, the operator next depresses the SEND RECORD pushbutton. Switch S7 extends ground from relay K1 contacts 2 and 5 to relay K9 and to the SEND RECORD lamp DS6. Operated, relay K9 locks through contacts 1 and 6, and triggers the recorder search register 276 through contacts 2 and 5 to allow the tape to be searched for the first character of the message. Relay K9 also operates recorder relay KR2 through contacts 2 and 5 to provide circuits for the recorder head playback windings 280, 282. Further, relay K9 provides an inhibit level to the keyboard through contacts 2 and 5 to prevent keyboard sending even though a key is depressed by mistake. When the recorder reaches the end of the stored message, the blank tape that follows the message will stop the tape movement. The operator on noting the end of the message on the printer 102 of Unit 1, or on noting that the sound of recorder operation has ceased, can depress the REWIND OR RECEIVE pushbutton.

If the REWIND pushbutton is depressed, relay K8 operates through the circuit previously described, and releases relay K9 and turns off the SEND RECORD lamp DS6.

If the RECEIVE pushbutton is depressed instead of the REWIND pushbutton, relay K1 releases, releasing relay K9 through contacts 6 and 7, and turning off the SEND KEYBD lamp DS1 through contacts 2 and 5.

TEST 1: To test the printer of Unit 1, the operator depresses the TEST 1 pushbutton. Operated, TEST 1 switch S3 turns on the TEST 1 lamp DS2 and operates relays K2 and K3. Relay K2 prepares a circuit for SEND RECORD relay K9 through contacts 2 and 5, and locks under control of power supply relay K1–1 through contacts 1 and 6. Relay K3 turns on the printer motor B1 of Unit 1 and connects the output of the keyboard to the input of the printer of Unit 1, as has been described above. The operator can now type into the printer 102 of Unit 1, or by depressing the STORE pushbutton can type into the recorder 108 and the printer 102 simultaneously, or by depressing the SEND RECORD pushbutton, can start the recorder 108 sending to the printer 102.

The TEST 1 mode is discontinued by depressing the RECEIVE pushbutton. Operated, switch S1 releases relays K2, K3, and K6 if operated. Also, the associated equipment can discontinue the TEST 1 mode, if a message is coming in, by grounding incoming line 1. Relay K1–1 operates and releases relays K2 and K3 through contacts 2 and 5.

TEST 2: To test the printer of Unit 2, the operator depresses the TEST 2 pushbutton. Operated, TEST 2 switch S4 turns on the TEST 2 lamp DS3 and operates relays K4 and K5. Relay K4 energizes the circuit to TEST 2 lamp DS3 through contacts 1 and 6 and operates power supply relay K2–2 to start the printer motor B2 of Unit 2, and prepares a circuit for SEND RECORD relay K9 through contacts 2 and 5. Relay K5 connects the output of the keyboard to the printer of Unit 2 through contacts 2 and 5, and locks relays K4 and K5 through contacts 1 and 6 under control of the Unit 1 power supply relay K1–1. The remainder of test and discontinuance of TEST 2 mode is similar to that described for the TEST 1 mode.

KEYBOARD, PRINTER AND RECORDER BLOCK DIAGRAM FUNCTIONAL DESCRIPTION

Figure 10:
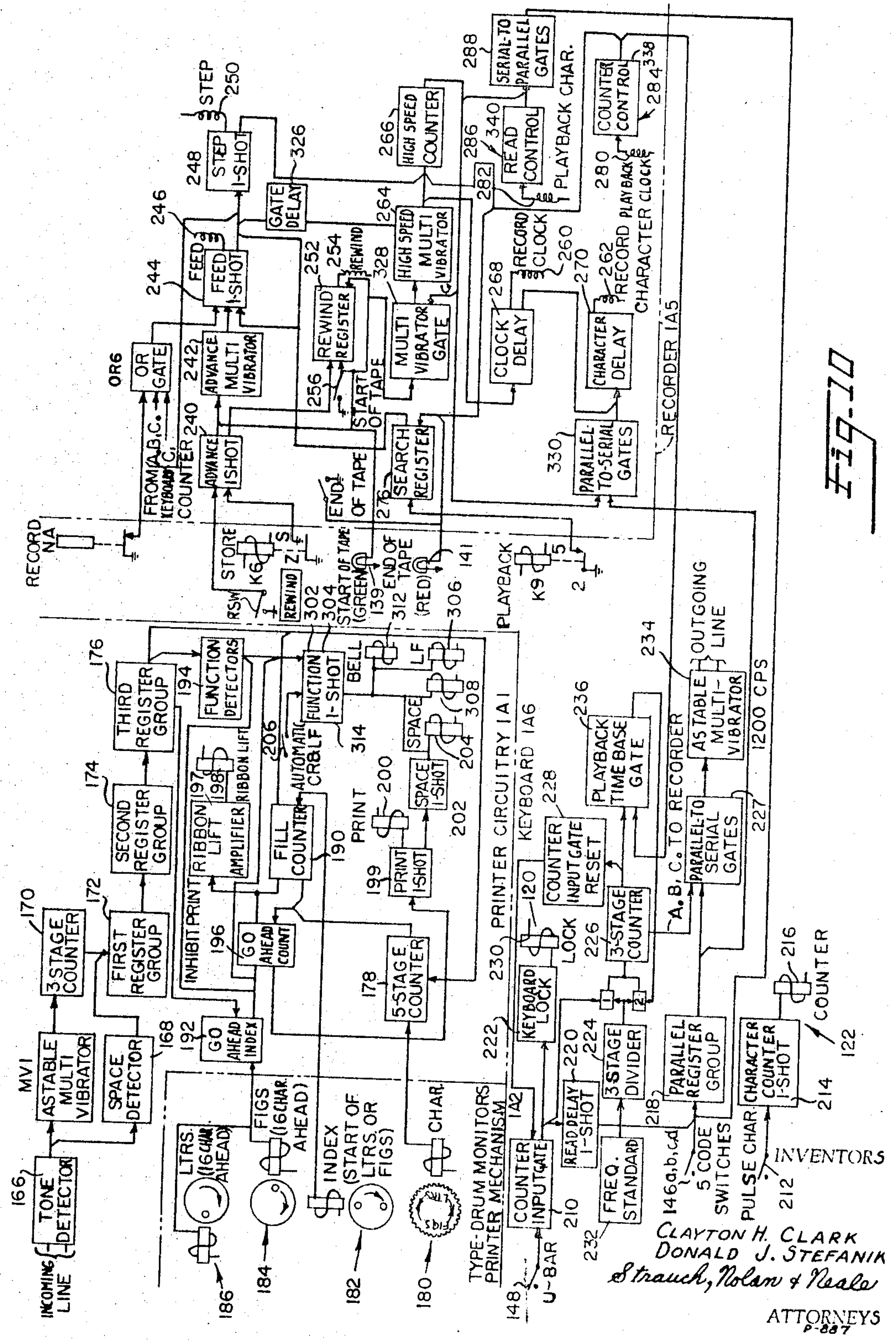
FIGURE 10 is a block diagram more detailed th FIGURE 6, illustrating general electrical, electronic a mechanical components utilized in Unit 1 which includ a keyboard, a printer and a recorder together with power supply (not shown in this figure)

FIGURES 10A and 10B viewed as a single diagram shows the functional sections of Unit 1, with the circuits of major elements represented by blocks. The immediate following description is divided into three parts: first, the general circuit functioning of the printer 102; second, the general circuit functioning of the keyboard unit 106; third, the general circuit functioning of the tape recorder 108. Following this description, a more detailed description of each major component, printer, keyboard and tape recorder, will be given with reference to logic diagrams.

PRINTER CIRCUIT FUNCTIONING: The block diagram description below expands on the general description of the printer presented hereinbefore.

*Tone detector*.—The tone detector 166 is sensitive to the 1200-cycle mark tone normally on the incoming line. When the tone is removed to indicate the start pulse of a character, the tone detector 166 provides a D.C. transition that (a) triggers a space detector 168 and (b) starts an astable (free-running) multivibrator MVI. When tone is returned to the line, the tone detector 166 provides another D.C. transition in the opposite direction from the first transition.

*Multivibrator MVI*.—When the start pulse of a character starts the multivibrator MVI, it continues to free-run for the duration of the incoming character. The multivibrator MVI steps a 3-stage counter 170 at a fixed rate such that the counter 170 will change its output once for each of the five sequential code elements of the incoming character. Two different free-running rates are available: one for 60 words a minute and one for 100 words a minute (see switch, FIGURE 8).

*Space detector.*—As long as the 1200-cycle tone is held off the incoming line, the space detector 168 provides a D.C. output level that will allow the 3-stage counter 170 to set successive stages of a first register group 172. The printer electronics will register each of the five code elements that is a space.

3-*Stage counter* 170.—The space code elements of an incoming character are gated into the first register 172 by the 3-stage counter 170. The counter is stepped by multivibrator MVI at a rate equal to the code element rate of the incoming line.

*First register group* 172.—As the five code elements of an incoming character are received sequentially, the 3-stage counter 170 gates each successive code element into the first register group 172 for temporary storage. The first register group consists of four flip-flops, one for each of the first four code elements. The fifth code element is gated into a second register group 174 directly since by the time it is received, the preceding group of code bits will have resulted in its character being printed or will have been shifted into a third register group 176.

*Second and third register groups.*—The second register group 174 provides 5-bit, parallel storage for one incoming character while the following character is being received sequentially and stored in parallel form in the first register group 172. To allow three characters to pile up during the time period necessitated by the machine function of automatic carriage return, the third register group 176 is provided to allow the second register group 174 to be cleared even though its stored character has not yet been printed.

*Character-position indicators.*—The printer electronics is supplied with character-position pulses by four type-drum rotational position monitors 180, 182, 184 and 186. These pulses indicate (a) when a character on the continuously rotating type drum is in the printing position, and (b) what the character is. For each revolution of the printer type drum, the following pulses are provided:

(1) 64 character pulses are provided, one pulse for each new character (32 letters positions followed by 32 figures positions) passing the print hammer. These pulses step a 5-stage counter 178.

(2) One letters pulse is provided, 16 characters before the first letters character passes the print hammer; one figures pulse is provided, 16 characters before the first figures character passes the print hammer. These pulses start the ribbon lifting function and also gate the registered character in register 176 into appropriate stages of the 5-stage counter 178 under control of a fill-counter register 190.

(3) Two index pulses are provided, one occurring as the first letters character starts to pass the print hammer, and the other occurring as the first figures character starts to pass the print hammer. Depending on whether a letter or a figure is to be printed, either one pulse or the other resets the fill-counter register 190 as a signal that printing may occur thereafter when the 5-stage counter 178 finishes its countdown. The number of counter steps required to finish countdown depends on the character stored in the third register group 176 since the character indication was used to preset the 5-stage counter 178 initially.

*Go-ahead index* 192.—This is a flip-flop register, reset when a character is first registered in the third register group 176. The next following letters or figures pulse from monitors 184 or 186 can then set the flip-flop register 192, producing an output pulse that starts ribbon lifting and pre-sets the 5-stage counter 178 to a number count representative of the registered character. If a machine function (space, bell, etc.) is registered in the third register 176, the function detectors 194 inhibit the output of the go-ahead index 192 from triggering ribbon lift or printing.

*Go-ahead count* 196.—This is a flip-flop register which is set when the go-ahead index register 192 is set and a machine function has not been detected. It triggers a ribbon lift amplifier 197 to energize a ribbon lift solenoid 198 and sets the fill-counter register 190. The ribbon will be raised in front of the print hammer by the time 16 characters have passed the print hammer. The next following index pulse from monitor 182 resets the fill-counter register 190. Finally, when the 5-stage counter 178 finishes its countdown, the go-ahead count register 196 is reset, opening the ribbon lift circuit and closing a circuit to a print one-shot 199 to energize a print hammer solenoid 200.

FILL COUNTER 190 is also a flip-flop register, set when the go-ahead count register 196 is set. It gates the registered character from the third register group 176 into the 5-stage counter 178. The next following index pulse from pulse monitor 182 resets the fill-counter register 190. Reset, it provides a level that will allow an output pulse from the 5-stage counter 178 to reset the go-ahead count register 196 and thereby initiate printing through the print one-shot 199.

5-STAGE COUNTER 178 compares the registered character with the type drum characters passing the print hammer. Gating the registered character into the counter 178 presets it anywhere from 0 to 31 counts (see FIGURE 14), depending on the Baudot code for the character. Sixteen counts before the ribbon has been lifted to the printing position, countdown is started by pulses from the type-drum monitor 180. Therefore, countdown will be completed for 16 different characters before printing can be permitted to occur. For each of these characters, an additional 32 counts are required before the desired character actually passes the print hammer.

*One-shots.*—Mechanical operations such as printing, spacing, carriage return, etc., are initiated by solenoids which are energized by one-shots. A one-shot provides an output for only as long a time as required to trigger the mechanical operation.

*Ribbon lift.*—Ribbon lift is initiated through amplifiers rather than one-shots since the amount of time the ribbon is kept in its raised position will vary, depending upon the drum position of the character to be printed.

*Print and space.*—Printing and spacing are both controlled by the print one-shot 199, printing from one side of the print one-shot flip-flop and spacing through a space one-shot 202 and a space solenoid 204 pulse from the opposite side of the print one-shot flip-flop 199. This assures that spacing will not start until printing is completed.

*Automatic carriage return and line feed.*—If an incoming message lacks a carriage return at the end of any line, the printer mechanism, through a switch 206, operated by the print hammer carriage reaching end-of-line position as will be hereinafter described, guards against overprinting by automatically returning the carriage and accomplishing a line feeding operation. The switch contacts of switch 206 close to initiate this action when the carriage is stepped from position 71 to 72. If the character for position 72 is not a carriage return, the carriage return and line-feed one-shots 302 and 304 are triggered as soon as the character is printed.

KEYBOARD UNIT CIRCUIT FUNCTIONING: The block diagram description below expands on the general description of the keyboard as has been presented hereinbefore. The mechanical keyboard structure will be fully described in a later section.

*Typing keys.*—A depressed typing key 130 or space bar 460 triggers the following operations:

(1) Contacts of a U-bar reed switch 148 close and set a counter input gate register 210.

(2) Contacts of a pulse-per-character switch 212 close and trigger a character counter one-shot 214 energizing a counter stepping solenoid 216. The pulse-per-character switch 212 closes each time a character key button is depressed to cause the receiving printer 102 to either print and space or just to space. When closed, the switch 212 triggers the character counter one-shot 214 to energize the counter solenoid 216 long enough to advance the character counter 122 one index step.

(3) The contacts of one to five reed code switches **146*a*–146*e* close, depending on the Baudot code of the typed character. The ground levels provided by these switches 146 set a parallel register group 218 after a 7 to 10 millisecond time delay. This delay is provided by a read delay one-shot 220 and guarantees that the reed contact code switches 146** will stop vibrating *before* the indicated character is gated into the parallel register group 218.

COUNTER INPUT GATE 210 is set by each typed character. In being set, the register 210 (a) triggers the read delay one-shot 220, (b) sets a keyboard lock register 222, and provides a level that will allow an output pulse from a 3-stage divider 224 to step a 3-stage counter 226. After countdown is completed by the counter 226, it resets the counter input gate 210 via a flip-flop register 228 called a "counter input gate reset."

KEYBOARD LOCK MECHANISM 123: The code bails of the keyboard, as will be described, as will be described hereinafter, are locked momentarily each time a depressed typing key moves them to encode the corresponding character. The keyboard lock register 222, set by the counter input gate 210, operates a lock solenoid 230 to perform a mechanical locking operation by means of a lock plate (see FIGURE 35) to be later described. When two characters are typed in rapid succession, such that the line rate is exceeded, the first character is transmitted and the second character will be held locked in mechanical storage in the keyboard 106 until the first character is completely transmitted electrically. In addition to effecting mechanical storage, the lock mechanism 123, by preventing movement of the code bails, also prevents depression of any other typing key.

When the recorder 108 is sending and at other times when it is necessary to prevent use of the keyboard, inhibition of the keyboard is not accomplished by the lock mechanism 123. Rather, input from the U-bar reed switch 148 to the counter input gate 210 is inhibited electrically as will be hereinafter more fully described.

READ DELAY ONE-SHOT 220 is triggered by the counter input gate 210. After the 7- to 10-millisecond delay designed into the circuit, the one-shot 220 gates the output of the code switches 146 into the parallel register group 218.

FREQUENCY STANDARD 232: Two are used, one for 60 w.p.m. and one for 100 w.p.m., and whichever standard is used, a tuning fork oscillator located in the power supply unit 110 provides pulses continuously at a rate that does not vary more than ±.01 percent. The output frequency of the selected frequency standard 232 is divided down by the 3-stage divider 224 so that every eighth pulse from the standard steps the 3-stage counter 226. A character stored in the parallel register group 218 by a depressed keyboard key, or alternatively by the tape recorder 108, is gated sequentially into a 1200-cycle astable multivibrator 234 by the 3-stage counter 226. This free-running multivibrator 234 supplies the 1200-cycle tone used for signaling on the outgoing line and is turned on and off by the 3-stage counter 226 via a set of parallel-to-serial gates 227.

When sending is initiated by a depressed typing key, the counter 226 is started by the counter input gate 210. At the end of countdown, the counter 226 resets the counter input gate 210 via the counter input gate reset register 228.

When sending is initiated by the magnetic tape recorder 108, the counter 226 is started by a playback time base gate 236. At the start of countdown, the counter 226 signals the recorder (via $A_0B_1C_0$) to move the magnetic tape one character step.

RECORDER CIRCUIT FUNCTIONING: The block diagram description below expands on the general description of the recorder presented hereinbefore. The recorder mechanical construction will be described hereinafter in a later section.

REWIND: Depression of the REWIND pushbutton 136 on the recorder control panel 120 (see FIGURE 1), closes REWIND switch RSW and results in (a) automatic feeding and stepping of the tape forward three steps to provide a blank stopping area after the recorded message, (b) disengagement of the feeding and stepping mechanisms and driving the tape backwards until it is completely rewound, and (c) automatic feeding and stepping of the tape forward slightly to reach a reliable portion of the tape where storing can start. The REWIND switch RSW on the keyboard triggers an advance one-shot 240 which provides a positive output level for a sufficient time to cover three feed and step operations of the recorder. The positive level starts an advance multivibrator 242 which cycles three times before being shut off. The three output pulses trigger a feed one-shot 244 three times. Each time the feed one-shot is triggered, it energizes a recorder feed solenoid 246 for about 25 ms., sufficient time to feed the tape once in the forward direction toward the recorder head as will be hereinafter described.

When the feed one-shot 244 flops back into its normal state, it provides a positive pulse that triggers a step one-shot 248. The step one-shot energizes a step solenoid 250 for about 4 ms., sufficient time to permit an indexed stepping pull of the tape over the recorder head.

After the tape is fed and stepped three times, the advance one-shot 240 flips back into its normal state, providing a positive pulse to reset a rewind register 252. A transistor in the rewind register turns on and energizes a rewind solenoid 254 which disengages the feed and step mechanisms and allows a negator spring (to be hereinafter described) previously wound up by the feed mechanism to drive the tape back onto its supply spool. When the tape is completely rewound, a commutator (see FIGURE 47) on the negator mechanism closes a pair of contacts constituting a start-of-tape switch 256. These closed contacts 256 set the rewind register 252 to deenergize rewind solenoid 254 and stop the rewind operation, light the green start-of-tape lamp 141 on the keyboard panel, and turn on the advance multivibrator 242 again. Feeding and stepping start again under control of the advance multivibrator 242 and continue for three or four steps until the commutator opens the start-of-tape contacts 256. The operator on hearing the rewind and subsequent step operations finish, can now store a new message or send a previously stored message.

STORE: Depressing the STORE mode pushbutton closes its switch S5 (see FIGURE 9B) and energizes relays K3 and K6 which provides an automatic advance feeding and stepping of the magnetic tape for three steps. Depression of any typing key on the keyboard next starts the keyboard sending circuitry including the keyboard 3-stage counter 226. A key initiated character stored in the parallel register group 218 is gated onto the recorder tape as follows: As the 3-stage keyboard counter 226 begins to step under control of the frequency standard 232, it triggers a recorder tape feed one-shot 244 via previously described counter output leads $A_0B_1C_0$. This starts the feeding and stepping actions that will move the tape across the record windings 260 and 262 and thus allow clocking and information bits to be digitally recorded in two serial tracks on the tape. The feed one-shot 244, after causing the feeding action, triggers the step one-shot 248 and starts a high-speed multivibrator 264. Pulses from this free-running multivibrator now step a high-speed recorder counter 266 and trigger a clock delay 268.

While the tape moves across the record head cores of windings 260 and 262, the clock delay 268 energizes the record head clock winding 260 eight times, thereby recording eight clock or synchronizing pulses in serial order on one track of the tape (see FIGURE 49). After energizing the record head clock winding 260 by the first pulse of the eight serial pulses, the clock delay 268 triggers a character delay 270 which energizes the record head character winding 262, if a space has been registered as the first code element of the registered character. The high-speed counter 266 gates this first bit out of the keyboard electronics into the recorder electronics and allows triggering of the character delay 270 only if the bit is a space. The next four clock delay output pulses also trigger the character delay 270 if code elements 2, 3, 4, and 5 are spaces. The last three clock pulses placed on the tape are not used. The first five clock pulses will be used during playback to trigger the stored character information from the tape back into the keyboard for sending to the line.

SEND RECORD: Depression of the SEND RECORD mode pushbutton closes its switch S–7 (see FIGURE 9B) and, when in the SEND KEYBD or TEST 1 mode, energizes relay K9 and starts a search of the tape for the first recorded character. During searching, tape feed is controlled by the advance multivibrator 242 which is allowed to run by the search register 276. Tape stepping is controlled by the feed one-shot 244. When the first recorded clock pulse causes a current to flow in the recorder head playback clock winding 280, a counter control 284 is triggered and starts the following operations:

For the first detected clock pulse, the counter control 284 (1) steps the high-speed recorder counter 266 once, (2) resets the search register 276 to switch control of automatic feeding and stepping operations from the advance multivibrator 242 to the 3-stage counter 226 in the keyboard unit electronics, and (3) sets the playback time base gate 236 in the keyboard unit to allow the 3-stage counter 226 there to start. The recorder high-speed counter 266 is much faster than the 3-stage counter 226 in the keyboard unit. Therefore, the five bits of the recorded character read by the recorder head playback character winding 282 trigger a read control 286 to coordinate with the high speed counter 266 and pass only the recorded signal bits into recorder serial to parallel gates 288 and back into the keyboard electronics through the keyboard unit parallel register group 218, while the 3-stage counter 226 is only gating a start pulse onto the outgoing line. Once a character from the recorder is registered in the keyboard electronics, the recorder tape feeding operation can be started in preparation for the next character to be read. The same $A_0B_1C_0$ levels used to feed the tape during a recording operation are also used during the playback operation. Stepping is triggered near the end of the slow keyboard count by the $C_1$ level of the 3-stage counter 226.

So long as characters continue to appear on the tape, the feeding and stepping operations will continue. Lack of a character, and therefore of a clock pulse, prevents further feeding.

BASIC CIRCUITS AND LOGIC SYMBOLS

FIGURE 11 shows the basic circuits and corresponding logic symbols used in the teletypewriter set logic diagrams of FIGURES 12, 16 and 18. This section includes a description of each basic circuit and the corresponding logic symbol, and the immediately following sections explain the switching logic of the printer, keyboard, and recorder as shown on related logic and timing diagrams.

Positive-going transitions are used to transfer information from one transistor stage to another. Logic 1 is defined as zero or ground potential; logic 0 is defined as negative or minus 12 volts potential. Therefore, a positive-going transition is a rapid change from logic 0 to logic 1. This change is available at the collector of a transistor as it is driven from the off state to saturation.

In the transistorized circuitry of this invention, a positive transistion (that is, positive pulse) will turn off a transistor to set or reset a register or to trigger a one-shot.

The logic symbols shown on FIGURE 11 provide both a logic and a block diagram representation of the circuit shown at the left of the symbol. Input and output leads are designated A, T, Q, etc., on both the circuit and logic symbol to allow exact interpretation. The following points must be understood: (1) If a stage inverts the input signal, the output lead leaves the symbol in a vertical direction as shown in FIGURE 11, blocks A, B and H. (2) The basic logic symbol for flip-flop stages shows the set state. The upper square of the symbol is always marked 1; the input lead is the setting input; the output lead is the collector of the transistor that is turned on and that, therefore, goes to logic 1 as the stage is set. Similarly, the lower square of the symbol is always marked 0; the input lead is the reset input; the output lead is the collector of the transistor that is turned off by the setting pulse and that, therefore, goes to logic 0 as the stage is set. (3) An inhibiting input is marked with a circle as shown in FIGURE 11, block E, lead I.

INVERTER: FIGURE 11, block A shows an inverter or amplifier. The same symbol enlarged with the letters HP (high power) is used on FIGURES 12, 16 and 18 for driver stages that energize solenoids. Transistor Q1 is normally on due to the forward bias −12 volts which is sufficient to override the reverse bias of the +5 volts. A logic 0 on lead A will not change the state of the circuit; therefore, the output on lead T is logic 1. A logic 1 on lead A will block the −12-volt forward bias and allow the +5-volt reverse bias to turn off transistor Q1. With transistor Q1 turned off, a logic 0 is present on output lead T.

PEDESTAL GATE: FIGURE 11, block B shows a pedestal gate, so named because a positive level on input lead A raises the voltage swing used to trigger via input lead B to the point where it can turn off a transistor. Pedestal gates are used extensively since they are so flexible. For example, a triggering pulse can be blocked by having a negative level rather than a positive level on the A input lead. Further, information available as a level can be stored on the gate, to be used at a later time when the triggering pulse is supplied. The diode in the output of a pedestal gate blocks the negative pulse that is inherent in the differentiating action of the circuit. Pedestal gates that are primarily differentiating networks have the A input resistor always at ground potential and are so shown on the printer, keyboard, and recorder logic diagrams.

DELAY: FIGURE 11, block C shows the circuit and associated logic symbol used to provide a short delay. Longer delays are provided by one-shots as described below for block L. Transistor Q1 is biased on by the −12 volts present at its base through resistor R1. A positive pulse on lead A turns off transistor Q1. Transistor Q1 remains off until capacitor C1 discharges through resistor R1. The length of the delay is determined by the value of resistor R1 and capacitor C1.

SINGLE DIODE GATE: FIGURE 11, block D shows a diode gate that has only one input. The function of the gate is to pass only positive pulses and to block negative pulses.

OR GATE: The truth table in FIGURE 11, block F shows that the output of an OR gate is logic 1 (positive) when any one input is logic 1. With all of the inputs at logic 0 (negative), the output is also at logic 0. A change of any one input to logic 1 provides a positive triggering pulse. FIGURE 12 shows OR gates used as machine function detectors (OR gates OR2, OR5, OR11, OR12, OR13, and OR14). These gates provide a logic 0 level that allows a triggering pulse to set a corresponding one-shot.

NOR GATE: FIGURE 11 block G shows a NOR (not OR) gate that is the same as an OR gate except that the output of the OR portion is fed through a transistor to invert the output.

OR GATE WITH INHIBITOR: FIGURE 11, block E shows an OR gate with an inhibiting input. With logic 1 applied by the inhibitor, it is impossible to produce an output transition from 0 to 1 since the output is always at 1.

AND GATE: The truth table in FIGURE 11, block J shows that the output of an AND gate is logic 1 only when all inputs are logic 1. FIGURE 12 shows five AND gates (AND 1, AND 2, AND 3, AND 4, and AND 5) connected to the output of a 3-stage counter. The desired output from each gate is a logic 1 level. The counter supplies this level first, after which a triggering pulse is supplied to the corresponding pedestal gate to, in effect, gate the level into a register.

NAND GATE: FIGURE 11, block H shows a NAND (not AND) gate that is the same as an AND gate except that the output of the AND portion is fed through a transistor to invert the output.

REGISTER: FIGURE 11, block K shows a flip-flop register that is used as a temporary storage component. When voltage is initially applied to the circuit, one of the transistors conducts first due to circuit value imbalance. Assuming transistor Q1 turns on, its collector approaches ground. The current from +5 volts through resistor R4, resistor R2, and the collector-emitter junction of Q1 places a level of approximately +2 volts at the base of transistor Q2, insuring its cut-off. A positive pulse applied to lead S is passed by diode CR1 and turns off transistor Q1. The collector of Q1 goes to −12 volts which is present through the cross-coupling resistor R2 to the base of transistor Q2, causing transistor Q2 to turn on. When transistor Q2 turns on, its collector approaches ground. The current from +5 volts through resistor R3, resistor R5, and collector-emitter junction of transistor Q2 places a level of approximately +2 volts at the base of transistor Q1, reverse biasing it. A positive pulse at point R will pass through diode CR2 and turn off transistor Q2. This will flip the circuit back to its original condition. Alternate pulses at point S and point R will flip the circuit back and forth.

ONE-SHOT: FIGURE 11, block L shows a one-shot that is used as an accurate timing device. When voltage is initially applied to the circuit, transistor Q1 is on due to the forward bias provided through resistor R4, and transistor Q2 is off due to the reverse bias provided through resistor R5. With transistor Q1 on, capacitor C1 charges from −20 volts to ground through resistor R6, resistor R3, and the base-emitter junction of transistor Q1. When capacitor C1 is fully charged, it has no effect on the state of the circuit as long as transistor Q1 is on. When a positive pulse comes in at point A it is passed by diode CR1 and turns off transistor Q1 provided the pulse has enough amplitude to override the −0.35-volt level present at the base.

When transistor Q1 goes off, its collector goes to approximately −19 volts. This potential is coupled to the base of transistor Q2 through the cross-coupling resistor R2, causing transistor Q2 to come on. Lead $\overline{Q1}$ goes to the base of a solenoid driver transistor. Transistor Q2 conducts through the base-emitter junction of the driver transistor to ground. With transistor Q2 on, the negative potential at its collector is switched common to its emitter and is present at the base of the solenoid driver transistor, causing it to go on. When transistor Q2 comes on, its collector approaches ground, thus referencing the charge on capacitor C1 to ground. The positive side of capacitor C1 is now +20 volts with respect to ground. Capacitor C1 now attempts to discharge and recharge to −20 volts through resistor R4 from the emitter-base junction of transistor Q2 and the emitter-base junction of the solenoid driver transistor. When the capacitor passes through zero potential and begins to accumulate a negative charge, it turns on transistor Q1.

When transistor Q1 conducts, its collector approaches ground, allowing the +5-volt bias through resistor R5 to turn off transistor Q2. The time involved for capacitor C1 to discharge to zero volts and to accumulate enough negative charge to turn on transistor Q1 is determined by the value of resistor R1 and the value of C1. This R–C time determines the duration of the output pulse on lead Q1.

COUNTER OR DIVIDER: FIGURE 11, block M shows a counter stage. It is also a divider stage when used to divide down the output of the keyboard frequency standard. When voltage is initially applied to this circuit, one of the transistors will conduct due to circuit value imbalance. Assuming transistor Q1 conducts, its collector is at −0.15 volts with respect to ground. This potential is present through resistor R2 at the anode of diode CR1. Since transistor Q2 is off, −10.5 volts is present at its collector and this potential is present through resistor R8 and at the anode of diode CR2.

When a positive pulse comes in at point S, it passes through capacitor C1 and capacitor C2. Since diode CR2 has a large negative potential at its anode, it blocks the pulse. Diode CR1 passes the positive pulse, provided the pulse is large enough to override the −0.15 volt present at the anode. In order to turn off transistor Q1, the pulse must also be of sufficient amplitude to override the −0.35-volt potential at the base of transistor Q1. When transistor Q1 turns off, its collector goes to approximately −10.5 volts due to the 1.5-volt drop across resistor R1. This 1.5-volt drop is due to the small current from −12 volts through resistor R1, resistor R3, and resistor R5 to +5 volts. The base of transistor Q2 is now at approximately −5.6 volts and therefore turns on. With transistor Q2 on, its collector is at −0.15 volt and the collector of transistor Q1 is at −10.5 volts. This minus voltage is present through resistor R2 and is at the anode of diode CR1. The −0.15 volt at the collector of transistor Q2 is present through resistor R8 and is at the anode of diode CR2.

The next positive pulse at point S will be blocked by diode CR1 and passed by diode CR2. Transistor Q2 now goes off and transistor Q1 comes on. Successive positive pulses at point S will trigger transistor Q1 and transistor Q2 alternately.

FREE-RUNNING MULTIVIBRATOR: FIGURE 11, block N shows an astable or free-running multivibrator that is used as a timing standard when extreme accuracy is not required. When the supply voltage is present and provided point A is at ground potential, the multivibrator will start to cycle. Component value tolerances are such that there will be an imbalance, enough such that one transistor will conduct first. Assuming transistor Q1 conducts first, capacitor C2 will charge through resistor R4 and the base-emitter junction of the transistor Q1. Capacitor C2 charges to the potential at the base of transistor Q1 which is approximately −0.35 volt with respect to ground. Since capacitor C1 has discharged any potential it may have accumulated, the negative potential through resistor R2 turns on transistor Q2. With transistor Q2 on, capacitor C1 charges through resistor R1 and the base-emitter junction of transistor Q2. Capacitor C2 is now discharging through resistor R3 and transistor Q2. Capacitor C1 charges to the potential at the base of transistor Q2 which is approximately −0.35 volt with respect to ground, allowing the negative potential through resistor R3 to turn on transistor Q1. This cycle repeats itself as long as voltage is applied and A is at ground potential. If ground potential is removed from A, transistor Q1 will be off and transistor Q2 will conduct until point A is returned to ground, allowing the cycle to continue.

EMITTER FOLLOWER: FIGURE 11, block P shows an emitter follower circuit. Transistor Q1 is normally off due to the +5 volts reverse bias on its base. A logic 0 level applied to input lead A turns transistor Q1 on in series with a driving transistor in the following stage. (See the ribbon lift driver circuit on FIGURE 12.) Since the emitter of transistor Q1 is now close to ground potential through the following stage, the output on lead T is actually negative-going (from +5 volts to 0 volts). Therefore, the circuit is an emitter follower in that a negative input produces a negative output.

PRINTER LOGIC

The logic diagram representing the operational functioning of the various electronic circuits of the printer is presented as FIGURES 12A and 12B which should be viewed as a single figure as this portion of the description proceeds.

TONE AND NO TONE DETECTION: The purpose of the tone detector 166 (not per se a part of applicant's invention) is to detect the presence or absence of 1200-cycle tone on the incoming line. An incoming character consists of a series of seven equal time periods of no tone or tone. Normally the tone detector is part of the associated station equipment.

When the printer is to receive from a signal line, power supply relay K3–1 is operated and, through its contacts 6 and 1, connects the secondary winding of the line transformer T1 to the tone detector. Transformer T1 amplifies the tone normally present on the incoming line. The amplified tone is rectified by a diode and places a positive charge on a capacitor in the input circuit of transistor Q5. The positive charge keeps transistor Q5 off. The negative output level of transistor Q5 keeps transistor Q6 on. The positive output level of transistor Q6 keeps transistor Q2 in the space detector 168 normally off.

A change from continuous tone to no tone on the incoming line indicates a start pulse. The capacitor in the input circuit of the tone detector transistor Q5 discharges, turning on transistor Q5. Transistor Q6 turns off and provides a negative transistion into capacitor C105 to turn on NAND gate 1. NAND gate 1 inputs, marked $A_1B_0C_0$, are positive because this is the normal or zero position of the printer's 3-stage counter 170, so the NAND 1 gate is opened to start multivibrator MV1. The negative transition from transistor Q6 in tone detector 166 also turns on transistor Q2 in space detector 168 which provides a positive level at pedestal gate P7.

A change from no tone to tone on the incoming line results in tone detector transistor Q6 turning on again. The resultant positive transistion turns off space detector transistor Q2 but has no effect on NAND gate 1; at least one of the other inputs of NAND 1 will be negative until the 3-stage counter 170, which was started by multivibrator MV1, returns to zero.

GATING CODE ELEMENTS 1–4 INTO FIRST REGISTER: Detection of the character start pulse opens gate NAND 1, as just described, which supplies a positive level to free-running multivibrator MV1. This level allows MV1 to run as long as the level is present. When not running, MV1 has transistor Q26 on and Q25 off. The input level turns on transistor Q25, causing its base to go from negative 12 volts to about negative 0.35 volt. This positive transition feeds through one of the cross-coupling capacitors to the collector of transistor Q26, causing a momentary positive spike that shows as the initial output of the time base multi on the FIGURE 13 timing chart.

The initial positive spike from MV1 steps the 3-stage counter 170 once, turning stage A transistors Q28 off and Q27 on. Initially, the counter 170 resets in the $A_1B_0C_0$ condition, that is, stage A transistor Q28 on, stage B transistor Q46 on, and stage transistor Q63 on. It now changes to $A_0B_0C_0$ and remains so for half a cycle of MV1 which is designed to equal half the time of the start pulse. As transistor Q26 in MV1 turns off due to transistor Q25 turning on, the collector level of transistor Q26 goes negative until reversal occurs due to the cross coupling from the collector of transistor Q25 to the base of transistor Q26. Transistor Q26 then turns on again, causing its collector to go positive and step the 3-stage counter once again, this time from $A_0B_0C_0$ to $A_1B_1C_1$.

A full cycle of MV1 now occurs before transistor Q26 again goes positive to step the counter a third time, from $A_1B_1C_1$ to $A_0B_1C_1$. The gate AND 1 to stage 1 of the first register 172, opens as its input $A_0$ goes from negative to positive and provides a positive output level to pedestal gate P8. Similarly, each succeeding step of the 3-stage counter 170 causes a different successive AND gate in first register 172 to open (AND 2, AND 3, AND 4, and AND 5) and the preceding AND gate to close. Since the counter 170 steps each time MV1 cycles, and since MV1 is designed to cycle at the bit rate of the incoming line, a new AND gate will open in the middle of each code element. This delay in sampling each code element allows for phase errors in starting MV1 and for frequency errors in MV1.

For each code element that is a space, the space detector transistor Q2 provides a positive level to pedestal gate P7. Each positive output pulse from MV1 that finds P7 at a positive level, is raised enough by P7 to turn off transistor Q3. A capacitor in the input of transistor Q3 keeps Q3 off long enough to assure that the 3-stage counter 170 will have stepped before transistor Q3 again turns on. In turning on, Q3 produces a positive transition that will set whichever stage of the first register 172 has been gated open by the counter 170.

Each of code elements 1, 2, 3, and 4 that is a space causes the corresponding stage of the first register 172 to be set. The fifth code element, if a space, can be gated directly through pedestal gates P–12 and P–65 into the fifth stage 2–5 of second register 174 which will be reset and therefore available before the fifth code element is detected. Thus a fifth stage on the first register 170 can be eliminated.

TRANSFERRING A CHARACTER INTO THE SECOND REGISTER: It is safe to reset the second register 174 as soon as the fifth code element of the incoming character has been detected. This is true because of a time relationship to how long it takes to print a character after it is shifted from the first register 172 into the second register 174. One indication that the fifth code element has been received is available on the 3-stage counter leads $A_0B_0C_1$. Note that all three go negative during receipt of the fourth code element. This sets up an OR condition such that as soon as any one goes positive, a positive pulse is available to reset the second register 174. Gate OR1 is the resultant circuit. An identical result is available from first register gate AND 5 when a positive output pulse is available when two inputs are positive and the third one goes positive.

The positive transition from gate OR1 resets the second register stages 2–1 through 2–5 via pedestal gates P52, P53, P54, P55, and P56. It also triggers a 1.2-millisecond (ms.) delay 290 via capacitor-input transistor Q60. Note that the slight delay introduced by transistor Q3 (between the space detector 168 and first register 170) is enough to assure that stage 2–5 of the second register 174 will be reset *before* it is set by the output pulse of Q3. After 1.2 ms., the positive transition from delay 290 resets the four stages 1–1 through 1–4 of the first register 172. Those stages of the first register 172 which are set to register spaces now emit positive pulses from their 0 side, thereby setting the corresponding stages of the second register 174. In this manner the coded character is transferred from the first to the second register.

The positive transition from the 1.2 ms. delay 290 also sets a flip-flop register 292 called 2ND. This 2ND register 292 in the set condition indicates that a character is stored in the second register 174, information that is vital during automatic carriage return as discussed more fully hereinafter.

Further, the positive transition from 1.2 ms. delay 290 through a branch output to pedestal gate P1, steps the counter 170 from the $A_0B_1C_0$ condition to the $A_1B_0C_0$ condition to perform the eighth step and thereby get the counter 170 back to zero. A few milliseconds later the stop pulse of the incoming character is detected, thus causing the fourth input to the time base gate NAND 1 to go positive, closing it and thereby turning off multivibrator MV1.

TRANSFERRING A CHARACTER INTO THE THIRD REGISTER 176: As soon as the second register 174 is set, gate NOR1 (upper righthand corner of FIGURE 12B) resets the third register 176 and triggers the 840$\mu$ sec. delay circuit provided by MV2 transistor Q81. Gate NOR1 provides a positive-going output transition when one input is negative and the second input goes negative. Except in automatic carriage return conditions, the input to gate NOR1, from the register 294 called 3RD, is always negative by the time a new character is ready to be stored in the third register group 176. When gate NOR1 turns on, the positive output pulse (a) resets the third register group via pedestal gates P47 through P51, and (b) turns off the MV2 delay transistor Q81. A capacitor in the input to transistor Q81 keeps transistor Q81 off long enough to allow resetting of the third register 176. When transistor Q81 turns back on, the output pulse triggers gates P13 through P17 to gate the elements of the code character from the second register 174 into the third register 176.

The positive-going transition from MV2 transistor Q81 that sets the third register 176 also resets the 2ND and 3RD registers 292 and 294. Gate NOR1 is closed (turned off) by whichever of the two registers, 292 and 294 flips first to produce a positive level on its 0 side.

SETTING THE GO-AHEAD INDEX: The positive-going transition from MV2 transistor Q81 that sets the third register 176, through a branch circuit also sets the go-ahead index register 192 (see lefthand center of FIGURE 12). With the register 192 set, the mechanically-generated induction index pulses from type-drum monitor heads 186 or 184 can now be used to reset the go-ahead index register 192 and thereby trigger the next operation. The pulses from monitor heads 186 and 184 are always available whether or not a character has been received into the registers 172, 174 and 176.

LETTERS AND FIGURES SELECTION: In any signaling system that uses the Baudot code, two of the possible 32 codes are used to shift the receiving device respectively from letters to figures and from figures to letters. In the present set 100 a case register 296 (lower left of FIGURE 12) keeps track of the last shift character code received. Before any incoming character is printed, the case register 296 is checked to determine whether the received code represents a letter or a figure.

The condition of the case register 296 (transistors Q73 and Q74) allows one or the other of diodes CR155 or CR156 to respectively pass either a letters clock pulse from drum monitor 186 or a figures clock pulse from monitor 184 (see FIGURES 14, 52 and 53). Return to FIGURE 12. If a letters shift character was the last shift character received, the case register 296 is in the logic 1 state, diode CR154 is back biased to block figures clock pulses from monitor 184, and diode CR155 is forward biased to pass letters clock pulses from monitor 186.

FIGURE 14 shows that the letters A, B, C, etc., are placed on one-half of the type drum in binary order, and that the digits 1, 2, 3, etc., the punctuation marks and other symbols are placed in binary order on the second half of the wheel. Considering FIGURES 12 and 14, the letters clock pulse is supplied to amplifier transistor Q90 sixteen (16) characters or 90° before the first letter (E) on the type drum passes in front of the print hammer. Similarly, the figures clock pulse is supplied to its amplifier transistor Q88 sixteen (16) characters or 90° before the first figure (3) on the type drum passes in fro of the print hammer.

Triggering from these LTRS or FIGS monitor puls instead of 16 counts later from the index pulse allows desired time period for completely lifting the printir ribbon into the printing position.

Whichever monitor pulse (LTRS or FIGS) is allowe by case register 296 to pass through diode CR154 c CR155 resets the go-ahead index register 192 to sta ribbon lifting and to fill the 5-stage counter 178 with th character waiting in the third register 176.

When either the letters shift character or the figure shift character code is received, the case OR gate OR has all inputs at logic 0, thereby providing a logic 0 leve output that provides a forward bias for diode CR11 When the go-ahead index register 192 is reset by a letter or figures clock pulse, as has been just described, a posi tive pulse from the 0 output of the go-ahead index registe 192 passes through diode CR115 to set or reset the cas register 296. If the stored character is the letters shi function, the positive level on lead $3_1$ allows pedesta gate P23 to pass the pulse from diode CR115 to the se side of the case register 296. But if the stored characte is the figures shift function, the positive level on lea $3_0$ allows pedestal gate P24 to pass the pulse from diod CR115 to the reset side of the case register 296.

The LTR and FIG pushbutton switches 298 and 30 are located on the front panel (FIGURE 1) and provide means for the case register 296 to be set and reset man ually. When depressed, the LTR pushbutton switch 29 sets the case register. The FIG pushbutton switch 30 resets the case register.

Advancing the count in the 5-stage counter 178: Whe a letter is to be printed, the pulse from letters cloc monitor head 186 resets the go-ahead index register 192 This causes a positive-going transition on the 0 outpu side of the go-ahead register 192. Gate P21 allows th positive transition to set the go-ahead count register 196

A positive level on the 1 output side of the go-ahea count register 196 turns off transistor Q75. The nega tive level on the collector of ribbon lift amplifier 19 transistor Q75 turns on emitter follower transistor Q76 High power driver transistor Q6 for the ribbon lift turn on from the negative-going transition at the emitter o transistor Q76. Collector current of the power transisto Q6 flows through the ribbon lift solenoid 198, energizing it and starting the ribbon lift operation.

The positive-going transition on the 1 output side o the go-ahead count register 196 also sets the fill-counte register 190 through pedestal gate P71. The positive-going transition on the 1 side of the fill-counter registe sets a count into the printer 5-stage counter 178 through pedestal gates P26 through P30.

The first four stages (A through D) of the 5-stage counter 178 are connected to the logic 1 or space side of the corresponding stages of the third register 176. The fifth stage E of the 5-stage counter 178 is connected to the logic 0 or mark side of the fifth stage of the third register 176. Reversing the wiring thusly for the fifth bit from the third register changes the count that would otherwise be set into the counter 178 and thereby compensates for the fact that the counter 178 is started 16 counts before the printer is ready for letters or figures to be printed. The exact count that is set into the counter 178 for any given character is the sum of the position values (that is, 1, 2, 4, 8, and 16) assigned to the counter stages A, B, C, D and E that receive logic 1 from the third register 176. For example, the letter E in Baudot is 10000 (see FIGURE 14). The second, third, fourth, and fifth bits are spaces and therefore cause the second, third, and fourth stages B, C and D of the counter 178 to be set. The wiring reversal prevents the fifth stage E from being set. This represents a count of 2 plus 4 plus 8, or 14 counts. With the counter already advanced 14 counts when countdown starts, the next 16 counts produced by the pulse-per-character clock monitor head 180 advance the counter to position 30 or two counts short of the end of count. Printing occurs at the end of countdown which in the case of an E is two counts after the ready index pulse from monitor head 182 occurs.

COUNTDOWN FINISH BEFORE INDEX PULSE: Printing is triggered by pedestal gate P41 (center of FIGURE 12) from a level set by the index pulse clock 182 and from a pulse supplied by the 5-stage counter 178 at the end of countdown. If countdown in counter 178 ends before the index pulse from head 182 resets the fill-counter register 190, the end-of-countdown pulse cannot open gate P41, and printing is delayed for an additional 32 counts during which time an index pulse from monitor head 182 will have been received. Printing must, of course, not occur before the first 16 counts because the letters half of the drum will not yet be in the printing position.

Countdown of the 5-stage printer counter 178 will start over if printing cannot occur at the end of the first countdown due to lack of an index pulse to the fill-counter 190. Since the printer counter 178 has five stages, it will take 32 additional counts to count down completely to again pulse and this time open the gate P41.

PRINTING: A 1.1 ms. print one-shot 199 is used to control the print solenoid 200 since it is necessary that the hammer strike the ribbon for only a limited period. When the index pulse from head 182 occurs before finish of countdown, it resets the fill-counter register 190 to arm a gate P41. The next completed countdown will trigger the gate P41 to reset the go-ahead count register 196. The resultant positive-going transition on the 0 side of the register triggers the printing one-shot 199 (Q39, Q40). The resultant negative level on the 1 side of the go-ahead count register 196 closes gate P25 to the 5-stage counter 178 to stop the counter, and turns on ribbon lift amplifier transistor Q75 to start de-energizing the ribbon-lift solenoid 198. The printing one-shot 199, while activated, energizes the print solenoid 200. A potentiometer placed in the one-shot circuit will permit the on-time of the one-shot 199 to be varied to vary the hue or blackness of the printed character.

SPACING: When the printing one-shot 199 turns on, it triggers a 9 ms. spacing one-shot 202 in addition to energizing the print solenoid 200. By the time the spacing solenoid 204 becomes energized, the printing operation is completed. Therefore, after any character is printed, the print hammer carriage is moved one space to the right in preparation for the next character. See detailed description hereinafter under "PRINTER MECHANISM" for an explanation of how the spacing mechanism operates.

PRINTING AFTER AUTOMATIC CARRIAGE RETURN: As the print hammer carriage moves from position 71 to 72 (for communications printers) an automatic carriage return and line feed switch 206 closes, providing a positive input level for a pedestal gate P78. The next printing character received will be printed in carriage position 72, and the 9 ms. space one-shot 202 will be triggered. In position 72, the carriage is against a mechanical stop and therefore cannot be moved further to the right, so for circuit simplicity, the space one-shot 202 is permitted to trigger anway. After the 9 ms. of the delay (see FIGURE 15), both the carriage return and line feed one-shots 302 and 304, respectively, are triggered to initiate simultaneous carriage return and line feed operation. Line feed accompanies carriage return automatically only when *automatic* carriage return is necessary. If the distant operator sends a normal carriage return signal but does not follow it with a line feed signal, the next line will overprint. This feature allows the operator to cross out a line.

With CR–LF switch 206 closed, the triggering pulse through gate P78 sets the line feed one-shot 304 (transistors Q58, Q59) which in turn through power transistor Q2 energizes a line feed solenoid 306. This feeds the record page one line, as will be hereinafter described.

The ACR triggering pulse through gate P78 also sets the carriage return one-shot 302 (transistors Q41, Q42) which in turn, through power transistor Q3, energizes a carriage return solenoid 308. While the CR one-shot 302 is on, the negative level on the 0 side blocks gate P20 to the go-ahead index 192 to prevent printing.

CHARACTER STORAGE DURING AUTOMATIC CARRIAGE RETURN: If the sending station continues to transmit while the print hammer carriage is being returned to the left margin, additional characters must be stored by the printer. The amount of storage depends on the highest line speed (10.7 characters per second) and the time required to return the carriage (115 milliseconds). One register is sufficient in addition to the two registers required normally.

FIGURE 15 timing chart shows automatic carriage return occurring during a sequence of E's and V's. The letters E and V are farthest apart on the print wheel and therefore provide the worst-case example.

When printing is not delayed because of automatic carriage return, the third register 176 is filled immediately after the second register 174 is filled. When the third register 176 cannot be cleared as soon as a character is registered in the second register 174, the negative level on the 0 side of the carriage return one-shot 302 blocks gate P20 and prevents leters or figures clock pulses from resetting the go-ahead index register 192. In FIGURE 15, the third register is shown being cleared immediately before automatic carriage return, and is shown holding a character during and after automatic carriage return. Note that the first and second registers keep functioning in the usual way since they must follow the incoming line regardless of what the printer is doing.

The first letters clock pulse that occurs *after* automatic carriage return has been completed, resets the go-ahead index register 192. The resultant positive-going transition on the 0 side of the go-ahead index register 192 starts the printing cycle and, after a 0.5 ms. delay in transistor Q43, sets the 3RD register 294 (see top right corner of FIGURE 12). This delay allows time to set the 5-stage counter 178 with the new character before resetting the third register 176. Since in this example a character (V) is waiting in the second register 174, the 2ND register 292 is also set, and gate NOR1 opens to trigger 840μsec. delay multivibrator MV2 (transistor Q81) and to reset the third register. After the 840μsec. delay introduced by transistor Q81, the third register 176 is set with the character (V) stored in the second register 174.

In the example shown in FIGURE 15, the printer catches up on the fifth character (E) after the last character printed in the upper line. An indication of "catching up" is that the third register can be set as soon as the second register receives a new character.

MACHINE FUNCTION CHARACTERS. DETECTING MACHINE FUNCTIONS: Characters that do not require printing are detected individually by OR gates OR2 (case shift), OR5 (bell), OR11 (blank), OR12 (space), OR13 (carriage return), and OR14 (line feed). Any one of these machine functions causes print strobe gate NAND 2 to inhibit the printing cycle at pedestal gate P21 to the go-ahead count register 196. For circuit simplicity, the machine function cycle is started by a letters or figures index pulse in the same way that the printing cycle is started.

FIGURES SHIFT AND LETTERS DOWN SHIFT: The codes for figures shift and letters shift differ only in the third code bit (see FIGURES 5 and 14). A single case shift gate (OR2) is used to predetect either code as far as code elements one, two, four, and five are concerned. The output of gate OR2 connects to inhibit-print gate NAND 3, and also to the case register 296 via gates P23 and P24. The figures shift function *sets* the case register 296, while the letters shift function *resets* the case register 296. One input to bell detector gate OR5 is the 1 side of the case register to prevent the letter S from looking like a bell function. The index pulse that sets or resets the case register 296 is the letters pulse when a figures shift function is detected, and is the figures pulse when a letters shift function is detected.

BELL: The code for bell (upper case S) is detected by gate OR5. Its output provides a forward bias for diode CR128 to permit the index pulse from go-ahead index register 192 to trigger the 14 ms. bell one-shot 310 and thereby energize bell solenoid 312 to cause a bell to be rung momentarily. The output of bell detector gate OR5 also connects to inhibit gate NAND 2 to inhibit printing at pedestal gate P21.

BLANK: The code for blank (00000) is detected by gate OR11. Its output connects to print inhibit gate NAND 2 to inhibit printing at pedestal gate P21.

SPACE: The code for space (00100) is detected by gate OR12. Its output connects to print inhibit gate NAND 2 to inhibit printing at pedestal gate P21 and also provides forward bias on diode CR29 to permit the go-ahead index pulse to trigger the auxiliary space 19 ms. delay one-shot 314 (transistors Q21, Q22). A 19 ms. delay is required after gate P43 to insure completion of the space-after-printing operation before the space solenoid 204 is again required to operate from the space function. The worst case would be a space following a V, since V is the last letter on the letters half of the type drum. After the delay, the auxiliary space one-shot 314 is triggered through pedestal gate P73.

CARRIAGE RETURN: The code for carriage return (01000) is detected by gate OR13. Its output connects to print inhibit gate NAND 2 to inhibit printing at pedestal gate P21 and also provides forward bias on a diode CR57 to permit the index pulse to trigger the 115 ms. carriage return one-shot 302 and thereby cause the carriage to be returned to the lefthand margin. A carriage return manual switch 316 on panel 126 pulses a pedestal gate P75 to trigger the carriage return one-shot 302 and cause immediate carriage return.

LINE FEED: The code for line feed (00010) is detected by gate OR14. Its output connects to print inhibit gate NAND 2 to inhibit printing at pedestal gate P21. The output of line feed detector gate OR14 also provides forward bias on a diode CR87 to permit the index pulse to trigger the line feed one-shot 304 and thereby cause the paper to be fed to the next line. A manual line feed switch button 318 on drawer front panel 126 permits pulsing of line feed one-shot 304 to manually line feed.

KEYBOARD LOGIC

*Characters typed at line speed or less*

READ DELAY: Refer now to logic diagram FIGURE 16 (FIGURES 16A and 16B) and timing chart FIGURE 17. For each character typed, the universal bail (U-bar switch 148) contacts provide a negative read pulse which turns on a transistor Q1. A positive-going output pulse from transistor Q1 sets the counter input gate register 210 through a pedestal gate P2. A positive-going transition on the logic 1 output of the counter input-gate register 210 sets the read delay register 220 (transistors Q9, Q10) through pedestal gate P6. After 7 ms., the read delay one-shot 220 provides a positive output pulse which gates the typed character into the five stages of the keyboard parallel register group 218. This delay insures that any vibration in the reed switch contacts will die down before the ground potentials provided through the reed code switches 146*a* through 146*e* are used to permutatively set the desired registers in register group 218.

KEYBOARD LOCK: The same positive-going transition which triggers the read delay one-shot 220 also sets the keyboard lock register 222 through a pedest gate P3. A positive output from this lock register 2 turns off transistor Q6 which in turn allows a keyboa lock high power driver transistor Q1 to turn on and enc gize the keyboard locking solenoid 230.

COUNTER START: With the counter input gate 2 in the set condition, the positive output level on the side conditions a pedestal gate P10 (see center of FI( URE 16) to pass positive output pulses from the constar ly running frequency divider 224. The pulses step tl low-speed 3-stage keyboard counter 226 to allow it gate the registered character from register 218 onto tl outgoing line. FIGURE 19 depicts a situation where tl counter 226 is not started until after the 7-ms. delay fro read delay one-shot 220, but it is just as probable th the counter 226 will be started before the delay enc This would not present a problem since the start pul sent to the outgoing line is always the same, does not d pend on which character has been typed, and requir 13.3-ms. which assures the 7-ms. delay will be complet before the code bits from register 218 are permitted transfer to the low speed counter 226.

SENDING A CHARACTER: Under control of tl selected one of the tuning fork frequency standards 23 the frequency divider 224 steps the keyboard low-spe counter 226 at the bit speed of the outgoing line. In tl reset condition, the first stage A of counter 226 is in tl 0 condition. Therefore, a negative level is available leads $A_1$, $B_0$, and $C_0$. Negative levels are used to pr pare the parallel to serial OR gates 227 (OR11 throu OR16) to gate the registered character from regist 218 onto the line.

Spaces rather than marks are registered in the parall register group 218. When a typing key is depresse one of the code bail switches 146*a* through 146*e* closes f each space in the Baudot code of the character. The re delay one-shot 220, after its 7-ms. delay, gates the spa indications of the code bail switches into the five stag of the parallel register group 218. Therefore, each spa in the character code is represented by a set stage. Sin parallel to serial OR gates 227, OR11 through OR1 require all but one negative input to provide a positiv going output transition, the logic 0 output sides of tl five parallel register stages are wired to the OR gates 22 For example, if the first code element is a space, regist 218 stage A (transistors Q1, Q2) is set to the 1 conditio and the 0 output lead provides a negative input to ga OR12. Similarly, if the second code element is a mar the register 218 stage B (transistors Q3, Q4) remains the 0 condition, and the 0 output lead provides a positi input to gate OR13.

As the first pulse from the frequency divider 224 ste the keyboard low-speed counter 226 once, the fi counter stage A changes to the 1 condition. This pr vides a positive-going transition on the 1 output le which causes the second counter stage B to change the 0 condition. Negative outputs are now available counter leads $A_0$, $B_1$, and $C_0$, allowing parallel to seri start gate OR11 to supply a negative level input to ga NAND 1. Any one negative input to gate NAND causes it to provide a positive level output which tur off transistor Q21. The 1200-cycle, free-running mul vibrator 234 is kept running by ground potential suppli by the collector of transistor Q21. With transistor Q turned off by gate NAND 1, the multivibrator stops ar 1200-cycles per second tone is no longer placed on tl outgoing line. Lack of tone represents the start sign and continues until the counter is stepped a second tim The tone generator 234 (Q21 and MV), per se, is n part of this invention.

As the second pulse from the frequency divider 2 steps the counter 226 once, the first counter stage changes back to the 0 condition, the second counter sta B remains in the 0 condition, and the third counter sta C remains in the 1 condition. Negative outputs are no available on counter leads $A_1$, $B_1$, and $C_0$, allowing parallel to serial gate OR12 to supply a negative level input to gate NAND 1 if the first code element registered is a space. A negative input to gate NAND 1 allows it to provide a positive level output to keep transistor Q21 off and the 1200-cycle multivibrator tone generator 234 in the off condition. If the registered code element is a mark, parallel to serial gate OR12 provides a positive output as do all the other parallel to serial input gates OR11, and OR13 through OR16. All positive inputs to gate NAND 1 cause it to provide a negative output which turns on the tone generator transistor Q21. With transistor Q21 on, the 1200-cycle multivibrator tone generator 234 turns on and supplies the required 1200-cycle marking tone to the outgoing line.

Succeeding pulses from the frequency divider 224 continue to step the low-speed counter 226 so that parallel to serial gates OR13, OR14, OR15, and OR16 successively have negative inputs from the counter. Each of these OR gates 227, which has a negative input from the corresponding stage of the parallel keyboard register group 218, provides a negative input to gate NAND 1, allowing the 1200-cycle multivibrator MV to turn off (no tone) and thus indicate a space on the line.

After the last code element is gated onto the line, the counter 226 is stepped again to the $A_1B_1C_1$ condition at the beginning of the stop pulse of the outgoing character. The positive-going transition on output lead $C_1$ resets the first stage A of the counter 226 through gates P37 and P34. This extra step returns the counter 226 to the reset condition, ready for another character. The positive pulse on lead $C_1$ also triggers the counter input gate reset (1-ms.) delay one-shot 228. Further, the positive pulse on lead $C_1$ resets the playback time base gate 236 (upper right hand corner of FIGURE 16).

As the reset delay 228 is first triggered, the positive-going transition on the logic 1 output lead resets the counter input gate register 210 (upper left hand corner of FIGURE 16) via gate P8. As the reset delay 228 returns to its normal condition, it resets the parallel register group 218 via gates P16 through P20.

Referring back to the read delay one-shot 220 which gates the typed character into the parallel register group 218, its positive output pulse resets the keyboard lock register 222 to allow another character to be typed on the keyboard. The positive level on the 0 output lead from keyboard lock register 222 prepares gate P8 for the subsequent trigger pulse from the reset delay (1-ms.) one-shot 228. The negative level on the keyboard lock register output 1 block gate P9 so that the pulse from reset delay 228 will not trigger the 7-ms. read delay 220.

*Character bursts typed faster than line speed*

To accommodate two-character high speed typing habit bursts, the keyboard lock mechanism 123 locks and maintains the code bails (by mechanism to be hereinafter described) set up by the second typed character locked until the preceding character is gated onto the outgoing line. This is accomplished electronically as follows.

When a character is typed before the preceding character is sent, the closed U-bar reed switch contacts 148 will have set the keyboard lock register 222 through gate P3. The counter input gate register 210 is already in the set condition and therefore provides a positive level to gate P3. Nothing more happens until the pulse from reset delay 228 triggers the 7-ms. read delay 220 through gate P9. Note that gate P8 now *will not* pass the reset delay pulse since the keyboard lock register 222 is in the set condition and thereby provides a negative blocking level to the gate P8.

As soon as the first character is gated onto the outgoing line, the 1-ms. reset delay 228 triggers the 7-ms. read delay one-shot 220. One (1) ms. after the 7-ms. read delay 220 is triggered, the reset delay 228 returns to its normal condition and in so doing resets the parallel register group 218 via gates P16 through P20. When the 7-ms. read delay 220 returns to its normal condition, it sets the parallel register group 218 via encoding switch gates P11 through P15, and resets the keyboard lock register 222 through gate P5, turning off the driver transistor Q1 and deenergizing lock solenoid 230.

REPEAT CHARACTERS: As long as the REPEAT key (to be described) on the keyboard and any typing key are held down simultaneously, the typed character is sent repeatedly as follows:

The depressed typing key causes the U-bar contacts 148 to close and turn on transistor Q1. Ground potential through transistor Q1 now sets the counter input gate register 210 and marks the contacts of REPEAT switch 320.

The closed REPEAT key switch 320 extends this ground potential from transistor Q1 to the level input of gate P10 through diode CR1 to allow the frequency divider 224 to run the low-speed counter 226 continuously. Also, the REPEAT key switch closes the ground potential to the level input of gate P9 to allow the reset delay 228 to trigger the read delay 7-ms. one-shot 220 after every countdown of the counter 226. Initially, the read delay one-shot 220 is triggered through gate P6 as the REPEAT key switch 320 is first operated.

After each 7-ms. read delay, the positive output pulse from the delay one-shot 220 gates the typed character into the parallel register group 218 via encoder switch gates P11 through P15. Both the counter input gate register 210 and the keyboard lock register 222 cycle once and then remain in the reset condition because no further positive pulses are vailable to set the counter input gate 210.

INHIBITING KEYBOARD TYPING: The recorder 108 during the SEND RECORD mode (as will be described under the following section on Recorder Logic) inhibits the normal effects of typing by closing a ground potential to lead SRK (see upper left of FIGURE 16) and through diode CR10 to prevent U-bar transistor Q1 from turning on so long as the inhibit signal prevails. Similarly, the recorder end-of-tape contacts will close a ground potential to lead EOTS (also upper left of FIGURE 16) and through diode CR9, keeping U-bar transistor Q1 off when the end-of-recorder-tape has been reached.

CHARACTER COUNTER: Each time the read delay one-shot 220 returns to the normal condition, through a diode CR12 and gate P7, it triggers the character counter 14-ms. delay one-shot 214 to turn on high power driver transistor Q2 and energize the counter solenoid 216 to cause the character counter 122 to advance one position. If the typed character is a non-printing, non-spacing one, a non-print character pulse switch 212 is closed to back bias the diode CR13 and thus prevent the read delay one-shot 220 from triggering the character counter one-shot 214. As explained in a later section, the character counter 122 indicates a maximum of 76 characters (necessary for a weather type of keyboard). Depression of the carriage return CAR RET key 316 (see FIGURE 1) triggers a mechanical release mechanism which returns the counter 122 to zero.

RECORDER SENDING: During the SEND RECORD mode, the low-speed 3-stage keyboard counter 226 is used to gate characters onto the outgoing line as the recorded character codes play back from the magnetic tape. The keyboard counter 226 is started by the recorder closing a ground potential to the IRST lead (upper right of FIGURE 16 and lower right of FIGURE 18) through gate P35 to trigger the playback time base gate register 236. The resultant positive output level, on the logic 1 lead, conditions a gate P27 to allow pulses from the keyboard frequency divider 224 to step the low-speed 3-stage counter 226. At the end of the 3-stage counter 226 countdown, ground potential on counter 226 output lead $C_1$ resets the playback time base gate register 236 through a pedestal gate P36. The mode panel electronics circuitry provides ground potential on keyboard input lead RWS only during the SEND RECORD mode. This ground potential will condition gate P35 to allow pulses received from the recorder on lead IRST to set the playback time base gate register 236.

MAGNETIC TAPE RECORDER LOGIC

Description of the recorder logic will refer primarily to FIGURE 18 (FIGURES 18A and 18B), secondarily to the recorder operational timing charts of FIGURES 19–23 and when necessary will refer to the inter-related keyboard electronics shown in the keyboard logic diagram of FIGURE 16.

REWIND: Depression of the REWIND pushbutton 136 on the recorder monitor panel (FIGURE 1) closes a switch 137 to lead RWS and triggers an advance delay one-shot 322 through gate OR1. The delay introduced by the one-shot 322 has no purpose during rewind, but it is helpful in preventing tape advance caused by switching surges from the mode panel over lead ADJ from STORE relay K–6. At the end of the 6-ms. delay the one-shot 322 triggers the advance one-shot 240 through a gate P24. It is reasonable to assume that the operator will depress the REWIND pushbutton for at least 166-ms. which will cover the required on-time of the two one-shots 322 and 240 (see rewind timing chart FIGURE 23). Pedestal gate P1, conditioned by the depressed REWIND pushbutton 136, will then allow a pulse from the 0 side of the advance one-shot 240 to reset the rewind register 252 as described in the following five paragraphs.

As soon as the advance one-shot 240 is triggered, it starts three mechanical, recorder tape, feed and step operations. The positive level on the logic 1 output lead allows the advance multivibrator 242 to free-run for 166-ms. and thereby to supply three triggering pulses to the feed one-shot 244 through gate P2.

Each time the feed one-shot 244 is triggered, it turns on a high-power recorder driver transistor Q3 to energize the feed solenoid 246. This causes the sprocket drive mechanism (to be described in the following section on recorder mechanics) to feed the tape one unit *towards* the record head, as will be described hereinafter.

Each time the tape feed one-shot 244 returns to the normal condition, it triggers the record stabilizer, 7-ms. delay, one-shot 324 through gate P4. The delay introduced by this stabilizer one-shot 324 guarantees that the mechanical feeding mechanism will have completed its function and come to rest before the stepping solenoid 250 is energized. At the end of the 7-ms. delay, the stabilizer one-shot 324 triggers the step one-shot 248 through gate P39. The step one-shot 248 turns on a high-power recorder driver transistor Q1 to energize the step solenoid 250, which causes the sprocket drive (see section on recorder mechanism) to step the tape one unit *over* the recorder head.

When the advance one-shot 240 returns to its normal condition after the three feed and step tape advance operations, it resets the rewind register 252 through gate P1. The reset pulse turns off transistor Q6 in the rewind register. Transistor Q5 is in series with transistor Q6 and therefore turns off also. The collector of transistor Q5 goes negative and allows high-power transistor Q2 to turn on and energize the rewind solenoid 254 which disengages the tape feed and step mechanisms and allows a negator spring, previously placed in power storage condition by the feed mechanism, to drive the tape back onto its supply spool.

When the tape is completely rewound, start-of-tape contacts 256 on the commutator (see FIGURE 47) are bridged and provide a ground potential level to (a) start the advance multivibrator 242 through diodes CR22, CR24, and CR4; (b) prepare a gate P8 so that the advance multivibrator 242 can set the rewind register 252 at the end of the first multivibrator cycle; and (c) light the green start-of-tape lamp 139 on the keyboard panel (see FIGURE 1).

The advance multivibrator 242 will cause feeding and stepping to start again under control of the feed and step one-shots 244 and 248 and to continue until the start-of-tape contacts 256 open again as the negator commutator starts forward rotation under tape feed stepping action, a period that lasts long enough to allow at least three feed and three step operations at the beginning part of the tape. When the start-of-tape contacts 256 open, the advance multivibrator 242 turns off, stopping the feeding and stepping operations. The recorder will now be readied for the operational STORE or SEND RECORD modes.

STORE (logic diagram FIGURE 18 and record timing charts FIGURES 19 and 20): When the STORE pushbutton (see FIGURE 3) is depressed, switch S5 closes, mode panel STORE relay K6 operates, which closes its relay contacts 2 and 5 and triggers the advance delay one-shot 322 through gate OR1. After 6-ms., this one-shot 322 triggers the advance one-shot 240 through gate P24. Ground potential from the STORE pushbutton switch S5 also operates recorder relay KR1 (see upper left of FIGURE 18B) which closes its relay contacts 2, 5 and 1, 6 and connects the record windings 260 and 262 of the record head to the record clock and character transistors Q10 and Q15. Current now flows through the two record windings 260 and 262 in preparation for recording.

The advance one-shot 240 now causes three feed and step operations in the same manner as discussed previously under the REWIND operational mode.

Depression of any keyboard key stores a character code in the keyboard register group 218 (see FIGURE 16) and starts the keyboard low-speed counter 226 (see FIGURE 16). As the keyboard low-speed counter 226 is first stepped from the reset condition to the start condition, it provides three negative inputs to the recorder on leads $A_0B_1C_0$ (see left side of FIGURE 18). Recorder gate OR6 has all its inputs negative and therefore cannot provide a triggering pulse to pedestal gate P36. As the keyboard counter 226 is stepped a second time, a positive pulse appears on lead $A_0$ and opens the recorder gate OR6. The positive output pulse from gate OR6 now triggers the tape feed one-shot 244 through the pedestal gate P36.

Magnetic tape feeding and stepping now starts and is under control of the low-speed counter 226 in the keyboard, the feed one-shot 244 triggering the step one-shot 248 through the 7-ms. delay stabilizer one-shot 324, as discussed above under the REWIND operation subsection.

When the feed one-shot 244 returns to normal and triggers the step one-shot 248, it also starts the high-speed multivibrator 264 as follows:

(1) A positive-going transition on the logic 0 output lead of the feed one-shot 244 triggers a multivibrator gate delay one-shot 326 through a pedestal gate P9. After an 11-ms. gate delay, which allows the tape step mechanism time to start moving the tape over the record head (see timing chart of FIGURE 19), the gate delay one-shot 326 returns to normal. The resulting positive-going transition sets the multivibrator gate register 328 through a pedestal gate P28. (2) In the set condition, the multibrator gate register 328 provides ground potential to the high-speed multivibrator 264 to allow it to free-run and step the high-speed counter 266. When the high speed counter 266 finishes its countdown, it resets the multivibrator gate register 328 through a gate P38. In the reset condition, the multivibrator gate register 328 turns off the high-speed multivibrator 264 by removing ground potential from it.

The positive-going transitions from the high-speed multivibrator 264, in addition to stepping the high-speed unter 266, also trigger the delay clock one-shot 268 :ough a pedestal gate P37. A positive-going transition the logic 1 output of the delay clock one-shot 268 :ns off record clock transistors Q9 and Q11. Transistor ), in turning off, turns on record clock transistor Q10 d current flow through the record clock winding 260 instantly reversed. When the delay clock one-shot 8 returns to normal, transistor Q11 turns on and Q10 :ns off, again reversing the current through the record ›ck winding 260.

The magnetic tape has an oxide coating of a mag- tizable material on it. When the tape is put into the ıgnetic field created by the current through the winding 0, the oxide particles will orientate themselves in ac- rdance with that field. When the current, and therefore ɔ field is reversed, the oxide particles will arrange them- lves in just the reverse orientation. This is the prin- ɔle employed to record information on the tape as it ›pped over the record head. Previous recorded mes- ges need not be erased by a special erase head as erasure accomplished by rearrangement of the oxide particles recording the new message.

Referring to FIGURES 19 and 20 (timing line for UTPUT OF 2 KC. MV.), eight digital clock pulses or ts are recorded serially on one track of the tape by the cord clock winding 260 during one step (0.1") of tape ovement over the head. These pulses are later used ıring the SEND RECORD mode to gate character in- ›rmation off of the tape and into the keyboard register 'oup 218.

Each time the delay clock one-shot 268 returns to nor- al, it can trigger the delay character one-shot 270 rough pedestal gate P19. However, triggering of the :lay character one-shot 270 is permitted only if the igh-speed counter 266 gates a space bit from the key- ɔard register 218 through the recorder parallel to serial ıtes 330 (OR11 through OR15). Leads D1 through 5 at the center bottom of FIGURE 18 (from respec- ve keyboard register output leads D1 through D5, FIG- RE 16) provide a negative level for a keyboard regis- :red space, and a positive level for a keyboard regis- :red mark. Recorder gates OR11 through OR15 suc- ›ssively provide negative inputs to recorder serial gate [AND1 for each registered space bit. Any negative ıput to recorder serial gate NAND1 turns it on to pro- ide a positive output that will allow the pedestal gate 19 to pass triggering pulses from delay clock 268 to ıe delay character one-shot 270.

Each time the delay character one-shot 270 is triggered, turns off record character transistors Q14 and Q16. 'ransistor Q14, in turning off, turns on transistor Q15. 'his reverses the current direction through the record haracter head winding 262. When the delay character ne-shot 270 returns to normal, it turns on record char- cter transistors Q14 and Q16. Transistor Q16 turns off 'ansistor Q15 to again reverse the current direction in ıe record character head winding 262.

For each recorded character (0.1" of tape), the tape ; conditioned with eight magnetized clock bits 332 on ne of its tracks (see FIGURE 49 and also third from ottom line on timing charts, FIGURES 19 and 20) and ne to five magnetized information bits 334 on the sec- nd track (see bottom line on timing charts, FIGURES 9 and 20). Each information bit 334 is preceded lightly by the corresponding clock bit 332 due to the elay of the delay clock one-shot 268. The last three lock bits are recorded on the tape but have no purpose ı this exemplary apparatus.

SEND RECORD (logic diagram FIGURE 18 and ming charts, FIGURES 21 and 22): After storing a ıessage in the recorder, the operator depresses the RE- VIND pushbutton 136 to position the message tape for ɛnding to the outgoing line. Depression of the SEND :EYBOARD and SEND RECORD pushbuttons (see 'IGURE 3), through their associated switches S2 and S7 (see FIGURES 9A and 9B) causes operation of mode panel SEND RECORD relay K9. Through its contacts 2 and 5, relay K9 closes ground potential to lead PBS to start the playback operation.

Ground potential on the lead PBS triggers a switch-noise inhibitor one-shot 336 (upper part of FIGURE 18B) which supplies a 7-ms. delay before allowing the search register 276 (upper center of FIGURE 18A) to be set. This time delay insures that noise generated by the relay contacts and picked up by the playback windings 280 and 282 will have stopped before the search operation is started. The playback clock counter-driver one-shot 338 (right center of FIGURE 18B) and the playback read one-shot 340 cannot be triggered by this switch-contact noise because the switch-noise inhibitor one-shot 336 clamps the output of the two one-shots through diodes CR11 and CR12, which prevents the inadvertent triggering.

The ground potential from relay K9 contacts 2 and 5 on lead PBS also operates the recorder playback relay KR2 which, through its contacts 1, 6 and 2, 5 connects the playback clock head winding 280 and playback character head winding 282 to playback circuit transistors Q10 and Q13, respectively. The ground potential on lead PBS also conditions an inhibit inductive spikes one-shot 342 so that it can be triggered by the tape step one-shot 248 through line TSS, capacitor C12 and line RC1.

After its 5-ms. delay, to allow relay-contact noise to stop, the switch-noise inhibitor one-shot 336 resets, and in so doing sets the search register 276 through pedestal gate P23. The positive output level on the logic 1 output lead of the search register 276 starts the advance multivibrator 242 through diodes CR21 and CR4. The positive level also conditions search pedestal gate P3 to allow positive transitions from the advance multivibrator 242 to trigger the tape feed one-shot 244, and conditions the search pedestal gate P5 to allow positive transitions from the tape feed one-shot 244 to trigger the tape step one-shot 248. Feeding and stepping af the magnetic tape starts and continues until a magnetized clock pulse on the tape is detected by playback clock winding 280.

Each time the tape step one-shot 248 is triggered, it triggers the inhibit inductive spikes one-shot 342. As shown in the timing chart of FIGURE 21, the 5-ms. "on-time" overlaps the time the tape step solenoid 250 is being energized and de-energized and is therefore creating a magnetic field that can cause inductive spikes into transistor Q10 in the counter driver control 284 and transistor Q13 in read control 286. While it is on, the inhibit inductive spikes one-shot 342 places a negative potential on the emitters of control transistors Q12 and Q15. This prevents the transistors from being turned on by the inductive spikes.

The actual 0.1" step movement of the tape over the head is occurring after the step solenoid 250 is de-energized and therefore after the inhibit inductive spikes one-shot 342 returns to normal. When a magnetized clock bit 332 on the tape (see FIGURE 22) induces a current pulse in the playback clock head winding 280, the "always-on" playback clock amplifier transistors Q10 and Q11 will amplify the clock pulse enough so that its negative-going half cycle at the collector of transistor Q11 can turn on the counter switching control transistor Q12.

Counter control transistor Q12 supplies a positive pulse to trigger the counter driver one-shot 338 through pedestal gate P29. A positive-going transition on the logic 1 output of counter driver one-shot 338 is extended over lead IRST to the keyboard (see FIGURE 16) to set the playback time base gate register 236. Lead IRST is pulsed once for each magnetized clock pulse on the tape, but only the first pulse is useful to the keyboard. Once the playback time base gate register 236 in the keyboard electronics is set, it will remain set until reset by the keyboard low-speed counter 226 (FIGURE 16) at the end of its countdown.

The first positive pulse from the counter driver one-shot also resets the search register 276 through pedestal gate P22. With the search register 276 turned off, control of tape feeding and stepping now comes from the keyboard electronic circuitry. Feeding is triggered over leads $A_0B_1C_0$ from the keyboard to record gate OR6 and through pedestal gate P36 to the tape feed one-shot 244, as the keyboard low-speed counter 226 is stepped from the start pulse condition to the first code bit condition. Stepping is triggered by a pulse over lead C1, from the low-speed counter 226 through recorder pedestal gate P6 to the tape step one-shot 248, as soon as the fifth bit of the character is gated by the keyboard electronic circuitry onto the outgoing line.

Each of the eight tape recorded clock bits provides a playback clock pulse 332 and triggers the counter drive one-shot 338 which in turn steps the high-speed counter 226 through gate P26. As the high speed counter 266 steps, it gates the recorded character into the keyboard register group 218 via lines E1 through E5 by successively preparing the recorder serial-to-parallel gates OR16 through OR20.

When a character bit on the tape causes a current pulse 334 in the playback character head winding 282, "always-on" playback character amplifier transistors Q13 and Q14 amplify the pulse enough so that its negative-going half cycle at the collectors of transistor Q14 can turn on the read control switching transistor Q15.

Read character pulse control transistor Q15 supplies a positive pulse that triggers the playback read one-shot 340 through gate P30. A positive-going transition on the logic output of playback read one-shot 340 opens whichever of the record serial-to-parallel gates OR16 through OR20 has three negative inputs from the high-speed counter 266. Each gate OR16 through OR20 that passes the positive pulse from the playback read one-shot 340 supplies a positive setting pulse to the register group 218 in the keyboad via lines E1 through E5.

As previously described in this section and as shown on FIGURE 21, the high-speed counter 266 in the recorder is much faster than the low-speed counter 226 in the keyboard. Therefore, the five bits 334 of the recorded character are gated into the keyboard register 218 while the keyboad low-speed counter 226 is still gating a start pulse onto the outgoing line.

As long as characters continue to appear on the tape, the tape feeding and stepping operations will continue under control of the keyboard low-speed counter 226. Lack of a tape recorded character will mean that no further character is gated into the keyboard register and tape feeding and stepping, which is now under control of the keyboard electronics, will cease and the sending operation is stopped.

KEYBOARD UNIT MECHANICS

Keyboard unit 106 may be seen in FIGURE 1 secured to the front panel 126 of the unit 1 drawer 113. The interior of the rear wall 156 (see FIGURE 25) of keyboard unit 106 provides a convenient mounting means for various components of the keyboard electronics such as the two, stacked printed circuit boards 152 and 154, the two high-power driver transistors Q1 and Q2 for the counter solenoid 216 and the keyboard lock solenoid 230 (see FIGURE 16), and various junction plugs and sockets such as P11, J11; P12, J12; P13, J13; and J16 providing electrical interconnection between the keyboard and the various units in a set.

Keyboard unit rear wall 156 is placed flat against the vertical portion of unit 1 front panel 126 and against the seal strip 124 (FIGURE 4) and secured to that front panel by means of bolts and nuts. The main keyboard cover section 116 is secured to a base plate by screws and has a rear opening which enables the cover 116 to snugly fit over flanges on the rear wall 156, being hinged at its bottom corners to the bottom corners of the rear wall flanges and secured in assembly to its rear wall 156 by means of screws 117 (seen in FIGURE 1) which fit into threaded spacing bosses 158 seen in FIGURE 25. The main keyboard unit cover 116 mounts the mode selection panel 118 as a unit, the components of the recorder monitor panel 120, the character counter 122 and the mechanical keyboard structure 400. FIGURE 25 shows each of the keyboard unit components in assembled position as seen from the rear opening of keyboard cover 116. The mode panel unit 118 is secured to the keyboard unit cover 116 by screws so the indicator lights 134 and mode pushbuttons 132 (see FIGURE 1) are disposed on the exterior top right-hand side of the keyboard unit 106. Although the mode control panel structure is not specifically illustrated, each of the pushbuttons 132 seen in FIGURE 1 is disposed above its corresponding mode (S1 through S7) switch as described in connection with FIGURES 9A and 9B, and physically located immediately under the switches (S1–S7) are the nine mode relays K1 through K9, which are small sealed relays mounted in compact and adjacent alignment.

The character counter 122 is mounted on the left-hand side of the keyboard front cover 116 by screws so its indicator drum face is visible to the operator. The character counter 122 is a drum type counter with indices placed on the periphery of the drum, the drum 512 being rotatable past a pointer unit seen through the character counter window 127. The drum 512 is positively stepped by a solenoid 216, through a pawl and ratchet, against the bias force of an internal coil spring and is subsequently released by mechanical action from the keyboard, as will be described in more detail hereinafter.

PRIMARY KEYBOARD STRUCTURE

The keyboard 400 includes the mechanical components to convert the mechanical shift of a depressed key or the space bar to a permutation of one or more switch contact closures. Each switch is a small glass encapsulated, magnetically controlled, reed switch. In the illustrated unit, which has three rows of keys, depression of any key excepting the REPEAT key will generate, within the keyboard unit electronics, both a five-unit parallel and a seven-unit serial Baudot code signal. Thus, the keyboard unit can generate both serial and parallel output codes, as has been described with respect to the keyboard unit logic diagram FIGURE 16. Each depressed key 130 results in a control condition for five of the glass enclosed reed switches to provide a permutated arrangement of open or closed switches. A sixth glass enclosed reed switch 148 is provided and operates upon depression of any of the keys, being designated as the universal bar switch. Also, depression of the repeat key 150 closes a microswitch 320 permitting repeated sending of the character corresponding to any simultaneously depressed key 130 as has been explained in connection with the foregoing description of the keyboard logic diagram. A seventh glass enclosed, magnetically controlled reed switch 212 is closed upon depression of any key representing a non-printing and non-space function for character counter inhibiting.

Referring primarily to FIGURE 26, the mechanical keyboard structure includes right-hand and left-hand bearing plate assemblies 402 and 404, each of which has fastened to it by screws, an auxiliary code bail bearing plate 406 and 408. Plates 402 and 404 are mounted vertically upright and parallel at respective ends of a bottom plate 410 which has an elongate slot 412 passing along the middle and situated between the end plates 402 and 404.

Mounted between the end plates 402 and 404, disposed vertically above the bottom plate and in spaced apart relationship, are a plurality of key plates 414 (32 in the exemplary disclosure), which for convenience ıay be termed key levers. The basic outline of all key ıates 414 is the same and, when initially fabricated, can ɜ made with seven key cap tangs 416 projecting from ıe top edge. Referring to FIGURE 27, all key plates ·hich carry key caps 130 to be located in the rear row f a three row keyboard use a tang such as 416*a* in osition B; the plates for the middle row use a tang such ; 416*b* in position D; and the plates for the front row se a tang such as 416*c* in position F. The remaining x tangs on each basic key plate are removed. Note ıat the plates with tangs in positions B and F are lentical but reversed.

The key plates 414, seen in FIGURE 26, are grouped ı threes leaving a space between each group sufficient ›r a fourth plate. If additional key plates are used in ıe open spaces, a four row keyboard can be assembled, ı which case, key cap tang positions A, C, E and G shown in phantom line) would be used. Also the late legs would have to be longer and additional code ails will be used.

Returning to FIGURE 27, each key plate 414 has ıree depending legs 417, 418 and 419. The side edges f legs 417 and 419 are vertical and straight, with legs 17 and 419 guided for vertical movement in slots in de combs 420 and 421 which are secured by screws at ach end to tabs on the end plates 402 and 404. The enter leg of each key plate 414 terminates in a down-'ardly extended guide and spring contact lug 420 which rojects through the elongate slot 412 in bottom plate 10. A leaf spring plate 423 with multiple lateral fingers 24, at least one extending under an associated single ey plate lug 420 and flexed to bias the associated key › its upward normal position is fastened to the under ide of bottom plate 410. The bottom guide lugs 420 of ll key plates are guided by a comb 422 fastened on the nderside of bottom plate 410 to underlap the elongate lot 412.

A key lever stop rod 430, with a rubber bumper strip 31, cemented in a groove along the top surface of rod 30, extends between and is rigidly fastened to each end late 402 and 404. Stop rod 430 passes through a wide ertical slot 432 in the center of each key plate 414 and he upper non-operated position of each key plate, under he bias force of its associated spring leaf finger 424, is etermined by abutment of the bottom edge of key plate lot 432 against the stop rod 430. The depressed op-rated limit position of each key plate 414 is determined ›y abutment of the top edge of slot 432 on the stop rod ubber bumper strip 431. In FIGURE 27 the key plate vith tang 416*a* (which, for example, could be the letter ₹ key plate) has been depressed and is against the rubber ›umper strip 431. The key plates with tangs 416*b* and 16*c* immediately behind the first key plate 414 are not lepressed. The hole beneath the slot 432 is merely a ightening hole. Clearly shown in FIGURES 33 and 34, ›ut described relative to FIGURE 27, the inside edges ›f the key plate outer legs 417 and 419 are similarly ıotched to provide three overhanging shoulders on each eg and both sides of the middle leg 418 are similarly ıotched to provide three overhanging shoulders on each ide edge. The shoulders on leg 419 are identified as 'space" shoulders 433*s*, 434*s* and 435*s*, the shoulders on he side of center leg 418 which faces the right leg 419 ıre identified as "mark" shoulders 433*m*, 434*m* and 435*m*, he shoulders on the other side of the center leg 418 are dentified as "space" shoulders 436*s*, 437*s* and 438*s*, and he shoulders on leg 417 are identified as "mark" shoul-lers 436*m* and 437*m* and "Universal" shoulder 438*u*. ∖s will be shortly described, a universal bail (or U-bar) 140 is journalled between auxiliary end plates 406 and 108 at a level passing between the notches forming shoulders 438*s* and 438*u*, and only the shoulder 438*u*, s used for the U-bar, shoulder 438*s* being superfluous in his instance.

Besides the U-bar 440, five code bails 441, 442, 443, 444 and 445, which correspond respectively to the code bits 1–5 of a five-unit Baudot code, extend between and are pivotally journalled in the auxiliary end plates 406 and 408. The journalled ends of each code bail 441–445 and the U-bar bail 440 are formed as round stub shafts 446 projecting through the auxiliary journal plates 406 and 408, and on one of the stub shafts 446 of each bail is secured a small permanent magnet 447 (see FIGURES 26, 28 and 29). Because all magnets and reed switches are similar, only one will be described. The magnets and reed switches are located adjacent end plates 402 and 404, the magnets which are adjacent end plate 402 being se-cured on bails 441, 443 and 445 and those adjacent the end plate 404 being secured on bails 442, 444 and 440 for convenience in spacing and overall arrangement. The reed switches have been previously designated in the keyboard logic diagram as code switches 146*a*, 146*b*, 146*c*, 146*d* and 146*e*, U-bar switch 148 and a non-count switch 212. All are actuated by a shift in magnetic lines of force of associated magnets 447, as will be described.

The glass encapsulated reed switches are mounted in one or the other of two dielectric switch assembly plates 450 or 452 spaced from and secured on the outer side of respective end plates 402 and 404 by spacers 453 and nuts and bolts. Seen in FIGURE 28, the glass switch capsules are located in grooves in the dielectric plates 450 and 452, the switch leads extending at 90° through the dielectric plates providing accurate location of each switch relative to its actuating magnet. The switch leads are secured to terminal lugs 454 to which the necessary wiring harness can be connected.

Turning to FIGURES 28 and 29 a glass encapsulated reed switch 146 is shown in the approximately correct relative relationship to the magnet 447. An idea of the size of the capsule may be determined by using 1" as the distance between the bent parallel terminal leads which pass through the dielectric assembly plate 452. Such reed switches per se are commercially available. The reed contacts strips 455 and 456 are made of iron, gold plated at the contact area and sprung very slightly out of contact.

The small rod magnets 447 are held rigidly in grooves 457, by triangle swages 458, in a non-ferrous ferrule 459 which is fastened on a stub shaft end 446 of one of the code-bails or U-bail. A slight rocking rotation of the ferrule 459 by pivoting the attached bail toward a "mark" position will change the flux path of the magnet to strengthen the flux passing through the reed switch contacts, moving the contacts to a closed or "mark" condition. Pivoting of a bail in the other direction to a space position, and thus changing the rotary position of the associated magnet will cause the associated reed switch contacts to open. The movement of the reeds is minute, the voltage through the switches is low and cur-rent is very low, hence the switch life far exceeds the life expectancy of the equipment.

Returning now to FIGURE 27, if a key 130 for a specific character or machine function is depressed it is necessary that the key plate depression be transferred to a mechanically coded condition of the code bails 441, 442, 443, 444 and 445. This is accomplished by dis-crete notching of one side or the other of the code bails depending upon whether the associated reed switch is to be closed or opened by that key depression representing either a mark or space bit in the code being used. For example, if the character of the depressed key is "R" (S–M–S–M–S), as is used for the condition represented in FIGURE 27, the bails must be notched as follows: code bails 441, 443 and 445 are notched at a location where they respectively extend below the key plate mark shoulders 443*m*, 435*m* and 437*m*, however the exact opposite side of each of bails 441, 443 and 445 is solid (not notched) so all three bails will be engaged by space shoulders 433*s*, 435*s* and 437*s* and pivoted to a space position (contacts open); code bails 442 and 444 are notched at a location where they respectively extend below the key plate space shoulders 434*s* and 436*s*, however the exact opposite side of each of bails 442 and 444 is solid (not notched) so each of these bails will be engaged by their associated mark shoulders 434*m* and 436*m* and pivoted to a mark position (contacts closed). All code bails are permutatively notched to be pivoted either to mark or space position in accord with the code representing the depressed key.

One entire side of the U-bail 440, the side facing key plate shoulder 438*s* is removed, excepting for a spring tab 462, and the other side of the U-bail is solid passing under all key plate shoulders 438*u* excepting for a notch located under the "Repeat" key plate shoulder 438*u* for reasons which should be clearly apparent. Thus depression of any key 130 or space bar 460 (not repeat key 150) will set the five code bails 441–445 to the desired switch coding positions and will pivot the U-bail 440 to a position which closes U-switch 148.

By adjusting the fixed position of the magnet holding ferrules 459 on the various bails the code switches 146*a*–146*e* will be actuated before the U-switch 148 is closed, assuring all code switches of "dry" operation, i.e., they are opened and closed in open circuits.

None of the code bails 441–445 are spring loaded, they have only two positions "mark" and "space" and stay in their last position until deliberately pivoted to the other position (as distinguished from known prior art pivoted type permutation code bails which are conventionally spring biased to a neutral position and use a mechanical interlock to prevent two-key burst operation).

Since the code bail 440 is operated once for each depressed coding key, it is spring biased to the non-operated position by a coil tension spring 461 which is anchored between a tab 462 on the end of the code bail 440 and an anchor pin fixed in the end plate 402.

At the lower rear of the keyboard is a non-count shaft 464 pivotally journalled in ears 465 of auxiliary end plates 406 and 408. This shaft 464 carries a magnet 447 and is used to actuate the non-count reed switch 212 in a similar manner as previously described for the other reed switches. Inasmuch as several of the keys are for code characters representing machine functions and no character spacing is desired for operations as a result of such key depressions, it is arranged that depression of any such key will engage a non-count shaft tab 466 (see FIGURES 27 and 30) secured by a screw to the shaft 464 adjacent the requisite key plate 414. The leading toe 467 of a non-count tab 466 projects under an outside shoulder 468 on rear leg 417 of the desired key plate 414 and when the key plate is depressed, the shoulder 468 will engage the associated tab 466 and pivotally rock the non-count shaft 464 so its magnet 447 will close the non-count switch 212, providing a signal used to prevent typed character counting and which can be used to prevent printing in a printer. In the exemplary embodiment, such tabs 466 are provided for FIGS, LTRS. LF (line feed) and CR (carriage return).

A similar shaft 470 for counter reset is pivotally journalled in front ears 471 on auxiliary end plates 406 and 408 and includes one tab 473 disposed under an outside shoulder 474 on the front leg 419 of the CR key plate 414. Counter reset shaft 470 is spring loaded to its non-operated position by coil spring 475 and has one projected end 476 which extends to adjacent the character counter 122. Rigidly fastened to the end of reset shaft 470 by a set screw is a reset lever 476 with two fingers 477 and 478. When pivotally shifted by depression of the CR key plate the lever 476 will reset the character counter 122, as will be described hereinafter.

Seen in FIGURES 27 and 31, the repeat micro-switc 320 is mounted on the front comb 420, by screws, adjacer the repeat key plate 414*r*. A flat operator plate 480 wit a depending bent lug 481 is riveted along the upper edg at the side of the repeat key plate 414*r* and projects fo ward over the actuating button of the repeat switch 32 so that depression of the repeat key 150 and its plate 414 will close the repeat switch 320.

The "Repeat" key plate 414*r* does not operate the cod bails 441–445 or the U-bar code bail 440 but only close the snap action "Repeat" micro-switch 320 which permi repeating of any other typed character by keeping the de sired key 130 or space for 460 depressed.

A "space" bar 460 (see FIGURES 3 and 26) operate a "space" plate 484 through linkage best shown in FIG URES 32–34. The space plate 484 is located at the fa righthand side of the key plates 414 and is basically sim ilar in shape to the aforedescribed key plates 414 but a tangs have been removed from its upper edge. Instea a headed stud 485 is riveted to the side at the front uppe corner of the space plate 484 and receives a forwardl projected forked end 486 of a lever 487 the other end o which is secured to a spacing, pivot shaft 488 which i pivotally journalled between the upper rear corners of en plates 402 and 404. Lever 487 is rigidly fastened, as b spinning, to a collar 489 which in turn is adjustably fa tened by set screws to shaft 488, rocking of which wi pivot the lever 487 and depress the space plate 484. Tw similar shaped operating levers 490 and 491 with secure collars 492 and 493 are adjustably fastened in spaced apa relationship on the rockable space shaft 488 and exten forward between two sets of adjacent key plates 414, e.g between the "C" and "R" key plates and between the "M and "I" key plates, to a position in front of all key plate where each lever terminates in an upwardly extended tan respectively, 494*a* and 494*b* similar in shape to the ke plate tangs 416. The space bar 460 is pressed on the tw space lever tangs 494*a* and 494*b* in a conventional manne so that depression of the space bar 460 will rock the pivo shaft 488 and through lever 487 depress the space plat 484 to operate desired code bails 441–445 and the U-ba 440, as hereinbefore described for the key plates 414.

Inasmuch as the disclosed embodiment is weathe proofed, a flexible rubber diaphragm 495, bonded to metal frame 496 (see FIGURE 26), is secured by screw to the keyboard cover 116 over the keyboard mechanisn and has pierced slots to pass over each of the space ba tangs 494*a* and 494*b* and all key plate tangs 416. Befor installing the diaphragm cover 495 a small metal washe 496 (see FIGURE 33) is placed on each tang and afte installing the diaphragm cover 495, a thick soft rubbe washer 497 is placed on each tang to provide a seal be tween the space bar 460 and all key caps 130 and 150, th slotted tang and the upper surface of diaphragm cove 495. There is sufficient excess material in the thin dia phragm 495 so as to offer no interference to the ope ational depression of the keys.

If weatherproofing is not necessary, the washers 496 an 497 and the diaphragm 495 can be replaced by a thin shee of pierced material (not shown) secured to the keyboar unit cover 116.

The level of all keys above the key plates 414 is th same and the inclined aspect, apparent in FIGURE 1, i derived by mounting the keyboard mechanism 400 in a inclined position inside the keyboard unit cover 116 t match the inclination of the cover upper surface.

Referring now to FIGURES 26 and 35, the keyboar locking mechanism 123 will be described. As a key 13 or space bar 460 on the keyboard 400 is depressed, th keyboard electronics momentarily energizes locking sole noid 230 for 5 to 8 ms. When energized, the lockin solenoid plunger 425 moves a bell crank lever 426 to shi a keyboard locking plate 427 rearwardly to lock the fiv code bails 441–445 and thus momentarily prevent move ment of the key plates. For normal single key depressio he 5 to 8 ms. time has no effect on operation because the ode bails are unlocked within the period while the key is till depressed; however, for two key burst speeds the sec-ınd code bail selection will be held in locked position ıntil the second coded positions of the reed switches have ɪeen accepted and registered in the keyboard electronics or transmission.

Locking solenoid 230, as shown in FIGURE 35 is nounted on an ear 428 of the keyboard end plate 404 with :s plunger 425 extending downwardly. In the end of the olenoid plunger 425 is a cross pin 429 which engages a orked arm 498 of the bell crank lever 426 which is piv-ɔted on a pin mounted in end plate 404. The other arm 99 of the bellcrank 426 extends upwardly on the inside ıf end plate 404 and interlocks with a notch 500 in the ɔwer edge of the lock plate 427. Thus, upward move-nent of plunger 425, when solenoid 230 is energized, will esult in the interlocked bellcrank arm 499 shifting the ock plate 427 rearwardly.

Lock plate 427 has a rearwardly disposed flat upper ɪar which is slotted in three places to fit over and slide ore and aft in a straight path on the key stop rod 430, he space bar rock shaft 488 and a stud post 501 fixed to he upper front inside corner of end plate 404. Collars, ecured on the rock shaft 488 and stud post 501, slidably naintain the lock plate 427 and washers (not shown) ıgainst the end plate 404. A coiled tension spring 502 s anchored between the lock plate and the end plate to ɪias the lock plate to its forward non-locking position.

Two fingers 503 and 504 depend from the lock plate 127 in front of the two vertical groups of bails 440–445. Finger 503 has three wedge shaped lock lugs 505 project-ng toward respective code bails 441, 442 and 443 and inger 504 has two wedge shaped lock lugs 506 extending oward code bails 445 and 444. There is no lock lug for he U-bail 440. All code bails 441–444 have a solid inger which projects toward and is aligned with an asso-:iated lock lug 505 or 506. When the bails are in "space" ɪosition (bails 441, 443 and 445), a rearwardly sliding ɪperative movement of the lock plate 427 will cause an ıssociated lock lug 505 or 506 to overlay and hold the ɪails against movement out of the "space" position. Also f the code bails are in "mark" position (bails 442 and 144) the associated lock lugs 505 and 506 will slide under he bail projections and lock such bails in "mark" position. n an unlocked condition of the lock plate 427 the locking ugs 505 and 506 are positioned at rest forward of and do ıot interfere with the pivotal movement of the code bails.

CHARACTER COUNTER: The character counter 122 (see FIGURES 1, 3, 25 and 26) consists of a counter olenoid assembly 216, bell crank 510, drive pawl 511, lrum indicator wheel assembly 512, counter reset lever 176, detent pawl 513, and detent pawl latch 514, all nounted in a support bracket 515. The keyboard elec-ronics will function to advance the counter wheel one ɪosition each time a printing or spacing key is depressed, ınd accomplishes this action by energizing the counter olenoid 216. In being energized the counter solenoid 216 moves its plunger 516 to engage and pivot the bell :rank 510. Bell crank 510 carries a spring biased, ɪivotally mounted pawl 511 and when pivoted will drive ɪawl 511 clockwise into the counter ratchet 517 of the lrum indicator wheel assembly. A counter scale (see FIGURE 3) on the indicator wheel drum periphery ad-vances only one index position, inasmuch as an angle ug 518 on bracket plate 515 in the path of the pawl 511 will limit the pawl stroke to one tooth advancement ɪf the counter ratchet 517. Either before of when the :ounter indicator reaches the index number 72, for a :ommunication keyboard or 76 for a weather keyboard, he CAR RET key may be depressed by the operator. The CAR RET key plate 414 engages tab plate 471 (FIG-URE 27) fastened to counted reset shaft 470. Reset ever 476 on one end of reset shaft 470 has a short finger 478 which abuts and disengages the ratchet detent pawl 513 to allow a coiled storage spring inside the indicator wheel assembly 512 to drive the counter back to the zero position. When the detent pawl 513 is shifted to dis-engaged position by reset lever 476, a notched foot 519 on the detent pawl rides over and latches on a lug 520 of spring biased detent pawl latch 514. When the counter wheel drum spins back to zero position, a stud 521 in the drum body abuts an upwardly projected lever finger 522 on detent latch 514 and shifts the latch clockwise to release the detent pawl 513 and permit it to return to its operative position.

MAGNETIC TAPE RECORDER UNIT MECHANICS

The recorder unit 108 is an extremely rugged and com-pact, magnetic tape, combination recorder and reader. Actual dimensions of an exemplary production unit ap-proximate 5" x 5" x 4". Its power, insofar as tape move-ment is concerned, is derived wholly from a self-contained feed solenoid, rewind power being derived from a negator spring which is wound by and stores energy derived from the feed solenoid during tape take-up movement. The tape is a semi-permanently installed, thin plastic strip coated with a film of magnetizable oxide. A suitable plastic for making the tape body is "Mylar."

The tape recorder, as has been hereinbefore described in the section devoted to the recorder electronic logic (see FIGURE 18), utilizes part of the keyboard elec-tronics during storing and playback transmission of mes-sages and hence, in the exemplary embodiment, is inter-related electrically, electronically and functionally with the keyboard unit 106. Nevertheless, it is to be under-stood that either the magnetic tape recorder or the key-board can be constructed as units, apart from the de-scribed inter-relationship between the two units, if a requi-site portion of the mode selection panel and keyboard electronics are included with either unit. Thus the re-corder, with appropriate logic, could take the place of (1) a tape perforator and (2) a tape reader-transmitter. As will be described for the exemplary embodiment, the tape supply is only sufficient for a single normal message (3600 characters), however the recorder could be struc-turally enlarged to mount larger tape spools and the tape drive power mechanism could be modified to drive and rewind the larger take-up and supply, as by an electric rotary motor or a stronger feed solenoid for take-up and a motor drive for rewind.

With reference to FIGURES 37 and 39, the recorder unit 108 has a basic support structure constructed of a base plate 530 apertured to be bolted in assembled posi-tion on the Unit 1 drawer (in the position indicated in FIGURE 2), a vertical front mounting plate 532 and a vertical mid-mounting plate 534 both of which are suit-ably, rigidly secured to the base plate and to each other. An auxiliary, rear mounting plate 536 is secured by bolts to and spaced from the rear of the mid-plate 534. Four printed circuit board sockets 537 *a*, *b*, *c* and *d* are suit-ably fastened by screws to the base plate 530. Printed circuit boards 538 *a*, *b*, *c* and *d* (see FIGURE 37) plug into appropriate ones of the sockets 537*a*–537*d*, are clamped to the vertical mounting plates and contain the major portion of the recorder electronics. Three re-corder driver transistors Q1, Q2 and Q3 are seen in FIGURE 39 mounted on the rear surface of the auxiliary bracket 536 which provides an adequate heat sink for the high power 2N458 transistors.

The mechanical tape driving and rewind mechanism will be described primarily with reference to FIGURE 38 and with secondary reference to FIGURES 37 and 39–44 for details. The front and rear perspectives afforded by FIGURES 37 and 39 provide an idea of the concise compact arrangement of the mechanism which is skeletonized and considerably expanded for clarity in FIGURE 38.

TAPE FEED AND STEP

FEEDING is the operation which feeds a discreet signal portion of the tape 540 (0.1") toward the recording head 542 in preparation for the stepping operation. The head 542 is mounted on the front side of front mounting plate 532 and includes two cores for combination 2-track, alternative recording and reading, one core carrying the record clock and playback clock windings 260 and 280, respectively (see FIGURES 10 and 18), and the other core carrying the record character and playback character windings 262 and 282, respectively (see FIGURES 10 and 18).

The tape 540 has feed sprocket perforations, is stored on a supply spool 541, threads around an idler roller 542 journalled on a fixed stud in the front plate, around a toothed feed sprocket wheel 543, thence around a stabilizer roller 544 and to and over the recorder head 542.

The tape is held against the feed sprocket wheel 543 by a tape guide foot 545 which is mounted on two releasable studs secured on front plate 532. Clips on the ends of both studs rigidly maintain the guide 545 in proper position. The upper stud 546 also serves as a pivot post for a spring biased vertically disposed stabilizer roller lever 547, the upper end of which carries the stabilizer roller 544. Note that the stabilizer spring 548 biases the stabilizer roller 544 against the tape to take-up the feed generated slack and any other incidental slack in the tape between the feed sprocket wheel 543 and the stepping sprocket wheel 549. As will be hereinafter described, the stabilizer roller effect is negated during REWIND.

The power to feed the tape 540 is obtained from the feed solenoid 246 which is mounted on the rear side of the front mounting plate 532. When feed solenoid 246 is energized (see also FIGURE 42), solenoid plunger 552 is pulled into the coil. Plunger 552 is pinned to a feed lever link 553 which in turn, is pinned to a feed lever 554 pivoted on the rear of the front plate. Lever 554 pivotally carries a spring biased driving pawl 555 and forces it into drive engagement with a feed ratchet wheel 556 and forces the ratchet wheel to rotate one tooth, the amount of feed rotation being limited by an adjustable feed pawl eccentric stop pin 557.

Ratchet wheel 556 is non-rotatably secured to the feed sprocket wheel shaft 558 and thus rotates the feed wheel 543 and causes the tape 540 to *feed* one space toward the recorder head 542. The feed solenoid 246 in deenergizing, allows spring 559 to pull the solenoid plunger 552, the feed lever link 553, and the feed lever 554 back to their normal positions. The normal position is with the feed lever 554 against a second adjustable eccentric stud 560.

A feed ratchet detent pawl 562 is pivotally mounted on a pin fixed in the front side of the mid plate 534 so the detent pawl is disposed substantially diametrically opposite the drive pawl 555. Detent pawl 562 is biased by a coil spring 563 with its tooth in such engagement with the feed ratchet 556 to prevent the feed shaft 558 from rotating backwards. Clearly seen in FIGURE 42, short levers 564 and 565, rigid with the feed drive pawl 555 and feed detent pawl 562, respectively, are directly toward the feed shaft 558 and constitute ratchet release fingers utilized to lift both of the pawls away from ratchet engagement during a REWIND operation, as will be hereinafter described. After the just described single tape feed step action of the feed sprocket 543 is completed, the stabilizer roller 544, under the bias of its spring 548 takes up the slack which was provided by the feed step and keeps the tape taut.

STEPPING is the operation which actually moves the tape 540 over the recording head 542 and thence toward the take up spool 566. A tape stepping action invariably occurs immediately following a feed action. The accurately indexed amount of slack which is placed in the ta 540 by the tape feed operation, is pulled over the recor ing head 542 by the take-up step sprocket wheel 54 over which the tape passes and feeds downwardly to tl take-up spool 566. Power to step rotate the steppi sprocket 549 is always constant, being derived from a cc spring 567 in an escapement controlled lost motion st drive mechanism 568 shown schematically in FIGUR 38 and in detail in FIGURES 43 and 44. A gear 5 secured to rotate with feed sprocket shaft 558, mesh with an idler gear 570, freely rotatable on a post fixed the rear side of front plate 532, the idler gear in turn dri ing a stepping input gear 571 which is freely rotatab mounted on the step sprocket shaft 572. Feed shaft ge 569 and stepping gear 571 have the same number of tee and hence, stepping gear 571 rotates in the same directic and through an accurately indexed angular increme equal to the indexed angular increment of drive which w imparted to the feed sprocket wheel 543 by the feed dri pawl 555.

Non-rotatably fixed to the stepping sprocket shaft 5 is a toothed escapement stepping ratchet 574. Tw spaced apart coaxial plates 575 and 576 (see FIGUR 43) are non-rotatably secured in facing, slightly space apart relationship to the stepping gear 571 and steppir ratchet 574, respectively. Gear plate 575 has three lu 577, 578 and 579 (see FIGURE 44) extending axially t ward the ratchet plate 576, designated as driving lug 57 stop lug 578 and, rewind stop lug 579. The two lu 578 and 579 straddle a stepping ratchet plate stop lug 58 with sufficient clearance to enable an indexed angular i crement of play between the gear 571 and ratchet 57 when the gear 571 is rotated one feed space. (Note: will be described the ratchet 574 *cannot rotate* while tl gear 571 is being driven through the gear train from th feed shaft 558.) The aforedescribed escapement co tension spring 567 is anchored between the gear plate dri ing lug 577 and the ratchet plate driven lug 580. Thu when the stepping gear 571 rotates one index space, i stop lug 578 rotates the one index space away from th ratchet stop lug 581 and stops, at the same time the ge driving lug 577 rotates one space, tensions the sprin 567 and stops. A one space stepping condition is th pre-set to occur, under a standard spring tension force, fc the stepping ratchet 574, its shaft 572 and the steppin sprocket 549 which is non-rotatably connected to sha 572.

Control of the stepping sprocket 549 is accomplishe by a pen type step solenoid 250 which is mounted betwee the front and mid mounting plates by a suitable brack secured to the upper portion of the mid mounting plat 534. The solenoid plunger 586 is forced out of the sol noid coil when it is energized, engaging a lever abutme 587 on a stepping ratchet pawl 588 to pivot the pawl 58 away from engagement with the toothed stepping ratch wheel. This release will permit the tensioned drive sprin 577 to rotate the ratchet wheel 574, its shaft 572 and th stepping sprocket 549 one space, where the ratchet plat stop lug 581 abuts the now stopped gear lug 578 to lim the stepping increment. The stepping pawl 588 is pivo ally mounted on a post 589 fixed in the mid mountin plate and is biased toward engagement with ratchet whe 574 by a coil tension spring 590. The solenoid 250 almost immediately deenergized, permitting the step pav to spring back and block the next ratchet tooth.

The tape stepping sprocket 549 thus pulls the indexe slack in the tape (0.1"), which was previously fed by th feed sprocket 543, over the recording head 542 at a con stant rate. As the tape 540 is stepped over the steppin sprocket 549 the slack is taken up on the take-up reel 56 which is driven through a friction coupling by mechanis now to be described, at a higher angular speed than th of the feed and stepping sprocket wheels to keep the tap taut between stepping sprocket wheel 549 and the take-u spool 566.

Both the supply spool 541 assembly and the take-up spool 566 assembly are identical and hence only one will be described in detail with reference to FIGURE 45. A spool shaft 592 is rotatably journalled in a threaded bushing sleeve 593 secured by a nut 594 through an aperture in the front mounting plate 532. The hub of tape spool 541 is slid over a short stub front end of shaft 592 and securely clamped to the shaft by a screw 595 and a washer which also secure a tape retaining pin, bent lock clip 596. The mylar tape 540 has a preformed end loop (not shown) which is retained to the spool 541 by a pin 597 disposed through an appropriate aperture and into a groove 599 in the outer periphery of the spool hub. Before pin 597 is inserted, the tape end loop is placed between the spool flanges and into the groove 599, so when pin 597 is inserted into the spool, it passes through the tape loop. Clip 596 will retain the pin 597 in its tape loop retaining position.

The other end 600 of spool shaft 592, which projects past the rear end of its bushing 593, is made with a reduced diameter, has a threaded end and carries a rotatably mounted spool gear 601, a felt friction disc 602, a pressure plate 603, a coil pressure spring 604, a spring retainer plate 605 and retaining nut 606. The pressure plate 603 has its hub axially slotted to coact with a pin 607 fixed transversely in shaft 592, so that pressure plate 603 may have some axial play but is non-rotatably secured to shaft 592. The spring 604 presses the pressure plate 603, felt disc 602 and gear 601 against the shaft shoulder 608 and constitutes a friction slip coupling between gear 601 and spool shaft 592. The compression of spring 604 may be pre-adjusted by nut 606 but need not be very great in the exemplary embodiment since the combined weight of the spools and the tape is quite light. Gear 601 on the supply spool 541 and gear 601' on the take-up spool 566 are identical and have a less number of teeth than the feed gear 569 and stepping gear 571. Therefore, since each derives its drive (when driven) by a direct gear train to the feed gear 569, each will tend to be driven a greater angular increment than the feed increment during each increment of feed shaft rotation, although as soon as the tape is taut the spool gear which is being driven will slip relative to the spool via the friction coupling.

During tape recording or playback the tape passes from the supply spool 541 to take-up spool 566 in a drive path connected through a shiftable idler gear 610 which meshes with feed shaft gear 569 and is carried by and rotatably journalled on a swinging shift lever assembly 611 which is pivotally carried by and depends from the feed shaft 558 between the front and mid mounting plates. Idler gear 610 always remains in mesh with feed shaft gear 569 and can be swung into mesh with either one of the spool gears 601 and 601' by a controlled pivotal shift of the depending support lever 611 which is rocked by mechanism to be later described. Normally, idler gear 610 is positioned to mesh with the take-up spool gear 601' in which position it is free from meshed engagement with the supply spool gear 601. The spacing of the two spool gears 601 and 601' is such that just before the teeth of idler gear 610 leaves engagement with one of the spool gears 601 or 601' they will start into engagement with the other gear. During the REWIND mode of recorder operation, the idler gear 610 is swung away from take-up spool gear 601' and into mesh with the supply spool gear.

Turning to FIGURE 46, it will be seen that stepping sprocket wheel 549 has a main body portion 614 with a hub to which is pinned a flat sprocket toothed disc 615. The disc is maintained in assembly by a rim ring 616, the center hub sleeve of the main spool body 614 being swaged or spun over to tightly clamp and retain the ring 616 and toothed disc 615 in place. The wheel hub 617 is in the form of an axial sleeve with a cross slot fitted over a transverse drive pin 618 in the stepping wheel shaft 572. Wheel 549 is thus non-rotatably connected to shaft 572 and is maintained on the shaft by a ring clip. The feed sprocket wheel 543 is constructed and secured to the feed shaft 558 in a manner similar to that just described for the stepping sprocket wheel 549.

Before proceeding to the mechanics by which the REWIND operation is accomplished, the description will now turn to the negator spring and commutator assembly.

THE NEGATOR AND COMMUTATOR assemblies 620 and 622 respectively are shown in skeleton arrangement in FIGURE 38, in detail layout cross-section in FIGURE 46 and in rear view perspective in FIGURE 39. The negator spring assembly 620 is mounted on the rear of mid mounting plate 534 and the commutator assembly 622 is mounted on the auxiliary mounting plate 536.

Each time the feed solenoid 246 is energized to rotate the feed ratchet 556, a small pinion gear 624 on the end of feed sprocket shaft 558 rotates a negator gear 625. This rotation unwinds a flat, crowned steel strip negator spring 626 from a negator spring supply spool 627 onto a spring output spool 628. This spring 626, wound up on spool 628, stores a bias force attempting to wind itself back on the supply spool 637 and thereby supplies a power source for the rewind operation. On the negator gear shaft 629 is mounted a pinion gear 630 which meshes with a large dielectric commutator gear 631.

Shown in FIGURE 46, the feed sprocket shaft 558 projects rearwardly through a bearing in mid mounting plate 534 and extends past the two negator spring spools 627 and 628, and has its terminal end cut to provide the integral small pinion 624. The small diameter negator spring supply spool 627 is freely rotatably mounted on bearings on a journal post 636 securely fastened to the mid plate 532 by nuts. One end of the crowned spring 626 is anchored to the supply spool and the spring is preset in a shape to coil itself around the small supply spool 627.

The large negator take-up spool 628 is non-rotatably and coaxially fastened to one side of the large negator gear 625 which in turn is non-rotatably secured to its shaft 629, as by a tight press fit. Negator gear shaft 629 is rotatably mounted in bearings retained in a retainer cup 638 which is fastened in an aperture in the mid mounting plate 534 and is disposed with its base directly rearwardly. The negator take-up spool 628 has a coaxial opening sufficiently large to freely fit over the bearing retainer cup 638 so that the two spools 627 and 628 are positioned in coplanar relationship, i.e., so that the negator spring 626 can be pulled off of the supply spool in a straight path and be rewound on the take-up spool to which its other end is anchored. The large negator gear 625 is mounted so as to be in continuous mesh with the feed sprocket shaft pinion 624, and as the feed shaft is rotated in incremental feed steps, the negator gear will slowly pull the crowned pre-coiled spring 626 off the small supply spool and wind it on the much larger diameter take-up spool 628. It is a tendency of such crowned pre-set springs that they tend to wind themselves back to their original pre-set coiled dimension, and therefore the spring exerts a bias force on the take-up spool to rotate in the reverse direction as the spring attempts to rewind itself on supply spool 627. This reverse direction of rotation is, of course, normally prevented because negator gear 625, the meshed pinion end of feed sprocket shaft 558 and the engaged feed sprocket pawl 555 and its detent pawl 562 prevent such reverse rotation, except during a rewind operation, as will be described hereinafter.

The negator driven pinion gear 630 on negator gear shaft 629 be separable or integral with the negator gear shaft, but in any event it is non-rotatably secured on the shaft 629, projects from the rear face of the negator gear 625 and provides a direct, but greatly stepped-down, drive from the feed sprocket shaft 558 to the dielectric commutator gear 631. In a sense this is also a direct drive connection from the stepping sprocket which differs from the feed sprocket only by the one lost motion spacing step in the feed direction and follows exactly in the rewind direction. Thus, the angular position of the commutator gear is a direct indication of the number of rotations of the feed and stepping sprocket wheels, and as such is used to determine (1) a start-of-tape position, (2) a 96% tape-out position and (3) an end-of-tape position.

The front face of the dielectric commutator gear 631 (see FIGURE 47) has four strips of copper 641, 642, 643 and 644 pressed onto it. When the gear 631 is mounted on auxiliary bracket 536, one of four contact plungers 645, 646, 647 and 648 rests against an associated one of these copper strips. Three of the copper commutator strips are called: the start-of-tape strip 641, 96% tape-out strip 642, and end-of-tape strip 643, while the fourth unbroken strip 644 is connected by a contact 648 to ground potential. When the commutator gear 631 has traveled 96% of one full turn, one of the contact plungers 647 shorts the 96% strip 643 to the ground strip 644, completing an electrical circuit and energizing the 96% amber lamp 140 on the keyboard unit (see FIGURES 1 and 3). At the end-of-tape position and at the start-of-tape position a similar shorting to ground by respective plungers 646 and 645 occurs for the other two commutator strips 642 and 641, respectively. When the gap moves away from the contact plunger, the circuits are broken and the respective lamps are de-energized.

Seen in FIGURE 46, the commutator assembly 622 (the gear 631 and contact plungers 645) are mounted on depending parallel walls of the rear auxiliary mounting plate 536. The dielectric gear 631 and a mechanical stop arm 650 fit over a sleeve hub 651 on the end of a stub shaft 652, the hub 651 being swaged or spun over to clamp and hold the stop arm and gear securely to the stub shaft 652. Stop arm 650 is disposed radially on the rear face of dielectric gear 631, extending to a terminal position close to the periphery gear where it ends in a forwardly bent stop finger 653 which passes through a slotted aperture 654 in gear 631 and projects a short distance from the front face of the dielectric gear. Stop finger 653 coacts in an abutment limiting relationship with a pin 655 fixed in and projecting from the rear face of negator gear 625 at the end-of-tape position and start-of-tape position, thereby providing a positive mechanical safety limit stop at both positions.

Commutator gear shaft 652 is rotatably fitted in coaligned holes in the spaced apart fore and aft walls of the auxiliary bracket 536, so the dielectric gear 631 is disposed to continually mesh with the negator shaft pinion 630 and is maintained in axial position by a collar 656 fasened by a set screw.

The spaced-apart auxiliary bracket walls are both pierced by an aligned set of four holes 658 and 659 which are made of sufficient size to permit coaxial positioning of the four contact plungers 645–648 with clearance, only one plunger 645 being shown in FIGURE 46. Overlying the holes 658 and suitably fastened to one wall of the auxiliary bracket plate 536, is one dielectric plate 660 with four plunger head guide holes 661 coaxially disposed relative to associated holes 658. Overlying the holes 659 and suitably fastened to the other wall of the auxiliary bracket 536 is a second dielectric plate 662 with four plunger shank guide holes 663, coaxially disposed relative to associated holes 659 and to the associated plunger head guide holes 661.

All four contact plungers are like the one plunger 645 seen in FIGURE 46, each plunger being made of highly conductive material, e.g., bronze or silver plated steel or copper, and having a contact bearing head 666 which is guided in one of the large guide holes 658 and a reduced diameter shank 668 which is guided in an associated small guide hole 663. Each plunger head 666 is spring biased against its appropriate commutator contact strip, which is strip 641 for plunger 645, by a coil compression spring 668 which is retained between dielectric plate 662 and a washer 669 placed over the plunger shank an against the shoulder of the plunger head 668. The appro priate electrical connections are made to the ends of th plunger shanks and tie the commutator into the recorde circuit indicated in detail FIGURE 48 (see also log diagram FIGURE 18).

REWIND: After a message has been recorded, it necessary to rewind the magnetic tape 540 before transmi ting to the outgoing line. Power to rewind the tape 54 is obtained from the negator spring 626. To initiat rewind of the tape 540, the rewind solenoid 254, whic is mounted on the rear face of front mounting plate 53 (see FIGURES 41 and 38) is energized, pulling i plunger 674 into the coil against the stress of a solenoi plunger spring. A U-shaped rewind bracket 675 with a arm pivotally attached to the end of solenoid plunge 674 rotates counterclockwise around its pivot mountin on the feed shaft 558 adjacent the feed ratchet 556 an feed shaft gear 569. This REWIND movement c bracket 675 moves two diametrically disposed bent lug 676 and 677 (one seen in FIGURE 41 and both show in FIGURE 42) into respective engagement with th aforedescribed feed pawl and feed detent pawl releas fingers 564 and 565 to pivot both of pawls 555 and 56 clockwise away from engagement with feed ratchet 55 against the bias force of their respective springs 55 and 563.

At the same time that it releases the feed shaft ratche 556, which frees the feed shaft 558 to rotate in its revers or rewind direction under the stored power in the negato spring 626, a third ear 678 on the rewind bracket 67 moves away from an abutment 679 on the idler shift gea lever 611. A connecting tension spring 680 from rewin bracket 675 to idler shift lever 611 pulls the idler shi lever 611 counterclockwise and moves the idler gear 61 out of engagement with the drive gear 601' of the take-u spool 566 and engages the idler gear with the supply spoo drive gear 601.

Attached to another ear 681 of the rewind solenoi bracket 675 is an upright link 682, the upper end o which carries a roller 683 projecting forward through vertical guide slot 684 in the front mounting plate 532 Turning now to FIGURE 40, and with continued ref erence to FIGURE 38, the upward shift of the link carrie roller 683 during the rewind shift of solenoid bracket 67 causes the roller to engage and lift a tape pressure arm 685. Pressure arm 685 is pivoted on a post 686 in th front mounting plate and has a soft tape pressure pa 687. A depending arm 688 on pressure arm 685 is biase by spring 548 in a direction which causes pad 687 to pres the magnetic tape 540 against the recording head 542 dur ing record and playback. When the roller 683 is raise upwardly, and the pressure arm 685 is thus raised t release the pressure of pad 687, a pin 689, which is abutte by the stabilizer roller lever under bias force of sprin 548, forces the stabilizer roller lever counterclockwise t release the stabilizer roller pressure on tape 540.

With the rewind solenoid bracket 675 rotated by ener gization of rewind solenoid 254, the negator spring 62 is now free to unwind from the spring output spool 62 back onto the negator supply spool 627. This actio causes negator spool gear 625 to drive the tape fee sprocket shaft 558 backwards which through the describe gear train drives both the feed sprocket 543 and steppin sprocket 549 backwards at the same rate of speed, pullin the tape 540 from the now disengaged, freely rotatabl take-up spool 566, around the stepping sprocket wheel over the recording head, past the feed sprocket and to th positively driven tape supply spool 541, the idler gea 610 now being enmeshed with the tape supply spool driv gear 601, and driven backwards by the feed shaft gear 569

When the tape is fully rewound, the previously de scribed stop arm finger 653 on the commutator gear 63 hits the stop pin 655 on the negator gear 625, affordin a mechanical stop of the rewind rotation. Also th start-of-tape strip 641 on the commutator gear is shorte y the contact plunger 645, which (see FIGURE 18B) ghts the green start of tape lamp 139, starts the advance ultivibrator 242 which sets the REWIND register 252 energizing the rewind solenoid 254 and, as has been reviously described, feeds and steps the magnetic tape 40 three or more times as necessary to rotate the commutator away from start position. When the tape has epped three times, the recorder is ready to play back e message or record a new message.

FIGURE 49 is a greatly enlarged segment of tape 540 lustrating how the pulses of a single character are stored ong with eight sync clock pulses in two track, digital rial form on the tape during the stepping movement.

PRINTER MECHANICS

FIGURE 50 will provide an over-all picture of the echanical components of the type drum page printer 102 ıd the positional relationships of the components to ıch other.

In general terms, the drum 704 includes, on its cyndrical periphery, a plurality of different lines of identiıl information symbols, 72 identical symbols (76 for weather drum) constituting one line extending along the ylindrical drum periphery parallel to the drum axis. he drum is continuously rotated by a printer motor B1 nd is directly connected with a drum position clock wheel 06 to enable determination of the passage of each distinct ne of type past a print station line by related printer lectronics which have been hereinbefore described relave to the printer logic diagram FIGURE 12. A print ammer carriage 708 can be spaced across in front of the rum surface, parallel to the drum axis, by an escapement pacing mechanism actuated by spacing solenoid 204 at e right hand side plate. The carriage 708 is returned y a carriage return mechanism 710, seen at the lefthand ide of FIGURE 50, which is activated by the carriage eturn solenoid 308. Power for carriage return is derived hrough a clutch device driven by the printer motor B1.

A sheet paper, strip record medium is supplied from a aper roll 712 mounted between the frame end plates, o the rear of drum 704, the paper feeding over suitable uide devices (not shown), under and up past the front f the drum, passing between the drum 704 and the print ammer carriage 708 and under two, side edge guide ingers 713, one being shown in FIGURE 51. The paper '12 then passes on out of a slot 714 (see FIGURE 1) n the Unit #1 cover formed behind a clear Lucite vindow 715. Paper feed is accomplished by two, olenoid stepped, pressure rolls under the drum which ress the paper against two feed wheels at the ends of he print drum.

An ink ribbon 716 passes across the drum face parallel to the drum between the print hammer and the paper o transfer the typed impression from the drum to the age during a print operation. The ink ribbon assemly feed and reverse mechanism is conventional and will e only briefly described hereinafter. However, the ink ibbon 716 in this printer is rigid to always pass in a traight stretch across the front of the drum 704 parallel o the character spacing path of the print hammer, and he entire straight front stretch of the ink ribbon is lifted o a position in front of the hammer just prior to a rinting action. Accordingly, the mechanism to accomlish ribbon lift is considered unique and will be hereafter described in detail.

As shown in FIGURE 50, the printer components are nounted on a support structure including a thick base late 718 having a slotted center bar 719 passing latrally from one side of the printer to the other and nder the path of travel of the print hammer carriage. Two vertical side plates 720 and 721 are rigidly secured o the base plate 718 and provide the mounting strucure for most of the printer components. The printer ase plate 719 is secured to threaded studs on the drawer 13 (see FIGURE 24) and the major portion of the transistorized printer electronics are mounted on a large printed circuit board secured on the underside of drawer 113.

DRUM ASSEMBLY

Referring now to FIGURE 51 (also FIGURES 54–56), the print drum 704 is preassembled in an inexpensive manner as compared with previously known drums for type drum printers which were engraved from solid materials. (Cost of the fabricated type wheel drum of the present invention is approximately 1/50 that of an engraved drum.) The drum 704 is fabricated from a plurality of double row type wheels 722, manufactured to very close tolerances, mounted, indexed and clamped on a drum shaft 723 in a manner now to be described.

As depicted in FIGURES 54–56, each type wheel 722 is made from a suitable high strength material capable of withstanding multiple print hammer blows and maintaining true circular shape under continual rotation. Steel, other presently known high strength metals and some plastics can be used. The wheel 722 has a central, disc-shaped, thin web 724 apertured with lightening holes 725, an indexing hole 726 and balance holes 727 and 728.

The rim 730 of each type wheel 722 provides a peripheral T-flange carrying two axially spaced apart rows of raised printing symbols, such as letters, numbers, punctuation, etc., each pair of side by side raised symbols being identical and disposed with their center lines extremely accurately equidistant from the web center plane and also accurately equidistant from the nearest adjacent edge of the rim 730, as shown by representative actual values on FIGURE 56. The edges of rim 730 are flat and are accurately disposed in parallel planes normal to the wheel axis. As clearly depicted in FIGURE 56, the true axial dimension of the rim T-flange 730 is 0.2000" which is the distance of space required for two standard teletypewriting symbols, and this dimension is held to an extremely close tolerance range of ±0.0005". This tolerance value is necessitated to prevent a build-up of a 72-character line, space error in an assembled drum. If the center line spacing of each of the two rows of characters is maintained within tolerances of ±0.003" the overall character space tolerance of each character relative to adjacent characters and of the entire line of characters will be well within the acceptable limits.

The five-unit Baudot code permits of thirty-two different code bit combinations and, using letters and figures shift functions, sixty-four characters can be realized. Accordingly, in the exemplary printer, sixty-four positions (see FIGURE 14) are provided around the periphery of each type wheel rim 730 and all characters are accurately located at specific angular positions. A layout portion of a wheel rim is seen in FIGURE 55.

To assure that all wheels 722 are assembled in proper indexed alignment with the adjacent wheel, an index slot 706 is made in the web 724 of each wheel, the slot center line being aligned with one and the same specific character on all wheels. The web center holes 731 of all webs are also accurately located and is dimensioned to provide a smooth guided coaxial fit on the drum shaft 723. By means of a suitable jig, the index slots 726 are aligned before and during torqueing of the drum assembly into clamped assembly, as will be now described.

Going back to FIGURE 51, an intermediate length 733 of drum shaft 723 is dimensioned to fit the center holes 731 of the type wheels 722. Both ends of the intermediate shaft section 733 are threaded as indicated at 734. A suitable number of wheels 722 (36 or 38) are placed on the shaft 723, indexed to align the same characters on all wheels and clamped together by two end clamping plates 735, adjacent spacers 736 and nuts 737, the latter being threaded and torqued very tightly on the threaded ends of the intermediate shaft section 733. (Note: with 38 wheels, the spacers 736 are omitted.) The center holes 738 of clamp plates 735 are the same size as the type wheel center holes 731 and also have a smooth coaxially locating fit on drum shaft intermediate portion 723. The outer periphery of each clamp plate 735 is provided with a right angled annular flange 737 which faces the stack of type-wheels and fits with a slight radial clearance within the external flange of the rim T-flange 730 of the adjacent type wheel 722, abutting the wheel web 724 in annular contact. This fit transfers an even annular clamping pressure to the outer periphery of each of the end type wheels of the assembled drum 704 and thus, the clamping pressure is evenly transferred through the flat abutting rim edges of all adjacent typewheels 722. This clamping pressure is all that is required to hold all typewheels in true indexed alignment. Both sets of clamping plates 735, spacers 736 and nuts 737 are locked together, after the clamping pressure is achieved, by a roll pin 740.

A left hand bearing retainer assembly 742, which carries a bearing 743 in a socket 744, is placed over the left hand reduced diameter end 745 of the drum shaft 723 with the inner race of the bearing 743 against a shoulder 746 formed between the shaft end 745 and the shaft intermediate section 733. A somewhat similar right hand bearing retainer assembly 747 and shaft bearing are placed over a right hand reduced end portion 776 of the drum shaft 723. Right hand bearing assembly 747, as clearly shown in FIGURE 52, includes an integral clock head mounting plate 748, which serves to rigidly mount the printer clock monitor heads 180, 182, 184 and 186, in the position diagrammatically illustrated in FIGURE 53.

Before the hubs 749 and 750 of respective bearing retainers 742 and 747 are clamped in sockets on respective printer frame end plates 720 and 721 by clamping blocks 751 and 752, left and right hand record medium feed wheels 753 and 754, with associated ring gears 755 and 756, are placed on external bushing sleeves 757 and 758 integral with the associated bearing retainers. The feed wheel gears 755, 756, are clamped to the respective feed wheels 753 and 754 by screws and split, annular ring clamping plates 759 which fit into and ride in grooves 760 in the bearing retainer body (see FIGURE 52) to axially maintain the feed wheels 753 and 754 in position adjacent each end of the drum 704.

A rubber O-ring 761 is stretched over the periphery of each feed wheel 753, 754 and fitted into half circle grooves 762 in the periphery of its feed wheel, and then cut or ground down almost even with the feed wheel periphery to serve as a friction band to engage and line feed the page record medium, by means to be hereinafter described. If desired, the O-ring 761 may be cemented in the groove 762 but it is not necessary. Note, the feed wheels are now rotatably mounted on the bearing retainers which will be clamped in adjacent printer frame end plates 720 and 721 and the drum 704 is rotatably mounted relative to the bearing retainers, completely independent of the record feed wheels 753 and 754.

DRUM DRIVE: Assembled in the frame, as seen in FIGURE 51, the left hand drum shaft end 745 projects beyond the bearing retainer 742 and a gear 770 is non-rotatably secured thereto by set screws 771. Shown in FIGURE 50, the printer motor B1 is mounted on the inside of frame plate 720 with its shaft 772 projected through the plate and carrying a drive gear 773. A gear tooth drive belt 774 meshes with motor gear 773, drum gear 770 and a carriage return clutch input gear 775 (see FIGURE 65) and when the printer motor B1 is energized, by power relay K2-1 (see FIGURE 9), the drum 704 will continually rotate.

The clock wheel 706 is non-rotatably secured to the right hand drum shaft end 776, and has peripheral reference notches 777 properly located relative to the angular positions of the print characters on the drum 704 and the letters and figures notch 778 located at the 180° division line between the separate groups of letters and figures on the drum 704 (see FIGURE 14). The two index notches 779 and 780 are located radially within the path of notch 778, 180° apart on the clock wheel (notch 779 running into notch 778) and the positioning of the monitor heads 180, 182, 184 and 186 will provide indexing signals 90°, sixteen (16) characters, ahead of the go-ahead letters or figures pulse to permit the requisite time lapse to operate the ribbon lift, as has been described hereinbefore.

The clock wheel 706 rotates with the print drum 704 and as it rotates, the moving notches vary the reluctance of bar type magnets located in the clock monitor head coils 180-186 inducing appropriate current pulses into associated transistor amplifiers, as described hereinbefore relative to the FIGURE 12 printer logic diagram.

*Ink ribbon lift*

The normal position of the front printing stretch of the ink ribbon 716 is below the printing line, in order not to obscure the line of printing. Accordingly, the ink ribbon must be raised and lowered to accomplish printing of each character.

Referring to FIGURES 58 and 59, the ribbon 716 is held in position by right and left ribbon lifter arms 782 and 784, and is raised and lowered through the action of ribbon lift solenoid 198 and the solenoid plunger spring 785. The ribbon lift solenoid, secured on the right side of plate 721 of the printer frame, when energized, pulls its plunger 786 down into the coil. A solenoid link 787 attached to plunger 786 and a lifter lever 787 rocks the right ribbon arm bracket 789 clockwise around its pivot axis, the pivot being provided by a long ribbon lift shaft 790 passing through and journalled in both of the printer side plates 720 and 721. Lift shaft 790, being non-rotatably secured to the right arm 789, rotates in its bearings, transferring the lifting action to the left side of the printer and a left ribbon arm bracket 791, which is clamped to the ribbon lift shaft and rocks conjointly with the right arm bracket 189. The ends of each ribbon lifter arm carry a ribbon guide roller 792 and a ribbon retainer 793. Both the right and left sides of the front stretch of the ink ribbon 716 are raised simultaneously through action of this mechanism.

Bumpers 794 and 795, mounted on brackets 796 and 797 secured to and projecting from the printer side plates 720 and 721, are provided to be engaged by the studs which journal the ribbon guide rollers 792 in the ends of the lift arms, and prevent an overthrow of the ink ribbon when it is lifted. The return of the ink ribbon 716 to its normal rest position is accomplished through the de-energizing of the ribbon lift solenoid 198 and the action of the solenoid plunger spring 785. The upward travel is effectively limited by the solenoid plunger 786 bottoming in the ribbon lift solenoid. The downward travel of the ink ribbon 716 is limited by abutment of the right ribbon lifter arm bracket 789 against an adjustable eccentric pin 798 on the side plate 721.

LINE FEED

Referring to FIGURES 51 and 57, the paper 712', is fed through the printer from a roll 712, one line at a time by the action of the line feed mechanism. The paper can be held in a given position or can be fed one line at a time by a line feed detent wheel 800 secured on the right hand end of a feed shaft 801 rotatably mounted in the frame plates 720 and 721, parallel to the drum axis and passing under the drum 704.

To keep the paper from feeding during printing, the detent wheel 800 is held by line feed detent 802. During line feed, the detent wheel 800 is turned one space by a line feed pawl 803. A line feed pawl bail 804, on which the line feed pawl is mounted, pivots about the line feed shaft 801. Moving the lower end of the line feed pawl bail 804 toward the rear of the printer causes the line feed pawl 803 to overcome the detent action of the line feed etent and the paper will be fed one space. The line ;ed pawl bail 804 is attached to feed solenoid plunger 05 and is actuated when line feed solenoid 306 is en-rgized, pulling the solenoid plunger 805 into the coil.

Mounted on the line feed shaft 802 are two paper feed /heel driving gears 806 and 807 (see FIGURE 51). Ro-ation of the shaft 802 and the two paper feed driving ears which mesh with the two paper feed driven ring ears 755 and 756 on the large paper feed wheels 753 nd 754, rotates the two paper feed wheels in a conjoint ne feed movement.

The paper 712' is held against the two paper feed wheels 53 and 754 by two pressure rollers 808 and 809. The wo pressure rollers 808 and 809 are mounted on flat prings 810 and 811 which are mounted to a pressure oller release shaft 812. Attached to the pressure roller elease shaft 812 is a pressure release lever 813. When ressure release lever 813 is moved to the rear of the rinter and secured by a latch plate 814, the pressure oller release shaft is rocked to move the pressure rollers 08 and 809 into spring biased engagement with the aper, holding the paper tight against the high friction ubber paper feed wheel bands 761, to enable controlled ine feeding of the paper. The pressure release lever 813 n a released position will allow the operator to insert aper into the printer.

INK RIBBON FEED

Referring to FIGURE 50, whenever motor B-1 is perating, the ink ribbon 716 is pulled continuously hrough the ribbon guides 793 on lift arms 782 and 784 to rovide uniformly printed impressions. Power to feed he ink ribbon is obtained from drive belt 774 rotating ribbon feed cam (not shown). A conventional ribbon eed pawl 815 moves up and down, rotating a ribbon haft driving ratchet 816. Rotating the ribbon shaft lriving ratchet will rotate the ribbon spool drive shaft 17. The ribbon spool drive shaft can be moved to the ight or left by conventional shifting mechanism, and only ne ribbon spool shaft drive clutch is engaged at a time. \s one ribbon spool 818 becomes empty, the drive auto-natically reverses to it from the other ribbon spool 819 nd vice versa.

PRINT HAMMER

Referring to FIGURES 60–62, selecting of the proper haracter is done electronically but the actual printing f the character is done mechanically with the print ham-mer mechanism on carriage 708.

Referring to FIGURE 62, the lower front face **825*a* of rint hammer block 825 is stepped forward a slight mount to provide a blocking abutment for a hammer rmature 820. The hammer 822 is preferrably steel but nay be made from other suitable material with similar veight and elastic rebound characteristics. Its shaft is nounted through the two holes in the print hammer block 25 with the armature impact end 822*a* projecting forward sufficient distance to extend approximately 0.015" be-ond the face of the blocking abutment 825*a*, being so imited by the ring clip 824*b* fixed in the hammer shaft roove 822*b***.

When the proper character is selected, print solenoid 00, carried on carriage 708, energizes, pulling the piv-tally mounted armature 820, against the bias of its pring, toward the solenoid core. The forward motion f the print armature 820 is stopped by its engagement vith the blocking abutment **825*a* on the hammer block 25, just after 0.015" it hits the end 822*a* of print hammer 22. The impact momentum of the print hammer 822 arries it forward, pressing the ribbon 716 and paper 712' gainst the proper raised rotating symbol on the drum to rint the character. The start of de-energizing of the rint occurs before the armature hits the abutment 825*a*, hus allowing the print armature 820 to rebound to its normal rest position against backstop plate 823. The print hammer 822 has an extremely rapid stroke with elastic rebound, after striking the drum, back to its nor-mal rest position, aided slightly by small coil spring 824, which is placed over the hammer shaft between the end members of the hammer block between the rear block face and the clip ring 824*b*. A felt oil ring 824*a*, spring 824 and clip 824*b* with the hammer 822 is assembled in a print hammer block 825, the block being secured in a recess in the carriage body 826 by the carriage bracket plate 821**.

Shown in FIGURES 60 and 61 a ribbon guide 861 is clamped on the rear of carriage 708 and supports the stretch of ink ribbon 716 at a position in front of the print hammer.

SPACE

Still referring to FIGURES 60 and 61 and also refer-ring to FIGURES 63 and 64, in order to prevent charac-ters from being printed on top of one another, carriage 708 must be moved one letter space to the right each time a character is printed or a space function is re-ceived. The upper portion of the carriage body 826 has a through bore which carries slide bushings and rides on a carriage rail 827. An eccentrically, adjustably mounted bottom carriage roller 828 rides between guide rails 829 and 830 which are fastened to the frame center bar 719. The carriage is driven by a conventional carriage drive spring in a spring drum 831 (see FIGURE 64) through the medium of a spacing belt 832. Drum 831 is mount-ed on the outside of the right hand printer frame plate 721.

The carriage 708 is spaced and held in place by the ac-tion of a space pawl unit 853, carried on the front of carriage body 826, in controlled, engaging cooperation with a ratchet toothed space rack 834. The space pawl 833 is actually an escapement mechanism operated by a space bail 835 secured on a pivotally mounted square shaft 836 journalled across the front of the printer in frame plates 720 and 721. The space bail 835 is actuated in a rocking movement for each space actuation by the space solenoid assembly 204 (see FIGURE 63).

Each time the space solenoid 204 is energized, its ar-mature 837 is pulled against the solenoid core. Move-ment of an attached forked adjusting arm 838 on arma-ture 837, through cooperation with a pin 839 in shaft 836, rotates the space bail 835 downwardly, forcing the right-hand lug portion 840 (see FIGURE 60) of the space pawl 833 out of engagement with a tooth on the space rack 834. Forcing the right portion 840 of the space pawl down out of engagement with the rack 834 exerts a spring tension force by space escapement spring 841 on the left portion 842 (see FIGURE 60) of the space pawl. When the right portion 840 of the space pawl is pulled out of engagement with a rack tooth it allows the car-riage drive spring drum 831 to move the print carriage 708 approximately one-half of a space toward the right. The spring tension placed on the left portion 842 of the space pawl, moves it up to engage a tooth of the space rack 834, stopping movement of the carriage at a one-half space position. Upon release of the space armature 837, by de-energizing, the space bail 835 is spring biased to return to its normal position, releasing the right lug portion 840 of the space pawl 833. Due to the shape of the space pawl, its left portion 842 is now forced out of engagement with a tooth of the space rack, allowing the carriage 708 to complete its full space move to the right. The right lug portion 840 now has moved up to engage a tooth on the space rack 834 stopping the car-riage 708 and completing the spacing cycle.

CARRIAGE RETURN

The major mechanical aspects of the carriage return mechanism are disclosed in FIGURES 66 and 67 with details seen in FIGURES 50, 65 and 68–72. The mech-anism to accomplish carriage return may be actuated in two ways: one, by receipt of a coded carriage return char-acter, and two, by actuation of an automatic carriage return switch 206, shown in FIGURE 50, secured to the front edge of the frame center bar 719. Switch 206 is operated after the carriage 708 has spaced to the right for printing of the 72nd (76th weather) character, at which position the carriage mounted, depending eccentric guide roller 828 is at the end of its track 829, 830 and has engaged and moved a dog leg switch lever 850 which depresses the actuator pin 851 of automatic carriage return switch 206. The switch lever 850 and its mounting bracket act as a positive stop for the carriage 708 and prevent further spacing movement on printers where the automatic carriage return feature is not used and has been intentionally disabled.

Upon receipt of a coded carriage return character signal by the printer electronics, or upon operation of the automatic carriage return switch 206, the printer electronics section, among other actions which have hereinbefore been described, energizes the carriage return solenoid 308 which, as shown in FIGURES 65 and 66, is mounted on an auxiliary bracket 852 secured to the left-hand printer frame plate 720. Energized, the solenoid 308 pulls its plunger 854 into the coil, and the plunger, through an adjustable link 856, pulls on one arm 858 of a carriage return pivot lever 860, rotating the return lever 860 (FIGURE 67) clockwise around its pivot post 862. The pivot post 862 is fixed in a carriage return bracket assembly 864, portions being shown in FIGURE 67, securely mounted on the left hand frame plate 720.

The other arm 866 of the return pivot lever 860 pivotally carries a carriage return latch 867, which has a notched latching arm 868 and a bent tab release arm 869. The notch in arm 868 of latch 867, being latched on a tab 870 at the end of a central lever arm 871 on a channel shaped clutch actuating lever 872, rotates the main lever 872 clockwise on its pivot post 873 which is fixed in the bracket 864.

This motion of clutch lever 872 moves a carriage return clutch pulley drum 876 into positive clutching engagement with the driving member 877 (see FIGURE 69) of a carriage return clutch 880. Drive member 877 is rotated through a disc friction clutch 881 by clutch gear 775 meshed with the motor drive belt 774 and, when the clutch 880 is engaged, winds a carriage return belt 882 on the pulley drum 876. Return belt 882 is attached to, and pulls the carriage 708 on its tracks toward the left side of the printer.

As the center arm 871 of the channel shaped clutch actuating lever 872 rotates, it engages and, through a depending tab 883, shifts a rack lift pivot arm 884 which is also pivoted on the auxiliary bracket 864. A forwardly disposed end abutment 885 on the rack lift arm 884 carries and, in initial movement, shifts a latch plate 886 out of latching engagement with a latch lug 887 on an arm 888 of the space rack end mounting plate 889. The rack 834 is pivotally mounted by two end plates like plate 889, both of which are fixedly secured on a rack shaft 890. Thus, when latch 886 is unlatched, the abutment 885 on the rack lift arm 884 continues to raise to engage a stud 891 in rack end plate 889, lifting the space rack 834, against the bias of a spring 892, sufficiently to clear the space pawl 833. This action frees the carriage 708 permitting it to be pulled to the left by the clutch 880 and return belt 882.

As the carriage 708 nears the left hand margin, the head of an actuating pin 894 (see FIGURES 60 and 68), fixed on the carriage 708, contacts a plunger 895 mounted in the right hand frame plate 720, moving the plunger to the left. The plunger 895 pushes against the top end of a carriage return hammer lever 896 and rotates the hammer lever counterclockwise until it hits its stop screw 897. Any further movement of hammer lever 896 is then absorbed by pivot bracket 898 and a damper mechanism 899. Carriage operated rotation of the carriage return hammer lever 896 produces two actions. First, it carries and shifts a carriage return latch release pin 900 into actuating abutment with the bent arm 869 of carriage return lever latch 867, unlatching the carriage return latch from clutch lever center arm 871, and allowing the channel shaped carriage return drum actuation lever 872 to return to its normal rest (declutch) position. The other action of hammer lever 896 positively pulls the channel shaped carriage return drum actuating lever 872 into its normal rest position, disengaging the carriage return clutch drum, through the medium of carriage return hammer end link 901. As the carriage return drum actuating lever 896 returns to its normal declutch position, it allows the rack lift arm 884 to drop away from the rack end plate stud 891. Once the carriage return drum actuating lever 872 is back to its normal rest position, it is latched by the carriage return drum actuating lever latch 902 to positively maintain the carriage return clutch drum 876 out of any rebound engagement with its driving clutch element.

To prevent bounce-out of the carriage 708, when returned to the left hand margin, a forked arm, left hand margin latch plate 903 (see FIGURES 60 and 66) is provided, pivotally mounted on top of the carriage 708 and biased clockwise by a spring 904. When the carriage 708 is moved to the left hand position, it is latched by latching of the latch plate 903 with a stud 905 in an abutment plate 906 fixedly secured to the left hand printer frame plate 720. At this stage the space rack 834 is maintained in its up position by a space rack latch 907 (see FIGURES 66 and 68) being latched over the edge of a lug 908 on the carriage backstop 823. After a period of time determined by the printer electronic circuitry, the carriage return solenoid 308 de-energizes and allows its plunger 854 to return to its normal position. This movement unlatches the carriage return drum actuating arm latch 902 and restores all the parts, with the exception of the space rack 834 to their normal rest position.

After the first character is printed and the space cycle starts, the accompanying first operation of the space bail 835 operates a release bellcrank 910, which pushes a link 911 against the margin latch 903, releasing the carriage left hand margin latch and allowing the carriage 708 to start a space movement to the right. As the carriage 708 is spaced for the first character, the space rack latch 907 releases, allowing the space rack 834 to drop to its normal position, in which position the left rack lift plate 888 is latched by the rack lift arm plate 886 engaging the end plate lug 887. This latching prevents raising of the space rack 834, which assures even spacing under normal operation, until the next carriage return operation.

Turning now to FIGURES 69–72, the details of the carriage return drum and clutch assembly 880 are shown. The assembly is mounted on a stud 920 rigidly secured by units 921 and 922 to the left hand printer frame plate 720. The driven clutch member 877 has a sleeve hub 923 axially fixed on stud 920 by clip rings and rotatable on bushings 924. The clutch drive gear 775 is fixed to the disc friction clutch input member 925 which is rotatably mounted on the sleeve 923. The friction clutch discs are alternately fixed to ears on the friction clutch input 925 and to a flat 926 on sleeve 923. Sleeve 923 has a left hand flange 927 with axially projecting positive input clutch teeth 928 facing similar output clutch teeth 929 fixed on a flanged, axially slidable operating sleeve 930.

The drum pulley 876 is coaxially disposed on and riveted to the flanged operating sleeve 930 and is thus rigid with the positive clutch output member. The end 931 of clutch output sleeve 930 is spool shaped to permit connection to the clutch actuating lever which in operation slides the positive clutch output sleeve 930 into and away from positive clutching engagement with input clutch teeth 928.

A continuous back bias is provided on the return belt pulley 876 to keep slack out of the return belt 882. This is accomplished by an auxiliary coil spring 934 in a spring drum cover 935, one end of the coil spring 934 being connected to the output sleeve 930 by a clamp 936 (see FIGURE 72) and the other end passing rearwardly out of the drum cover (see FIGURE 66) and being anchored to the printer frame.

A flywheel disc 940 is rotatably mounted on the positive clutch output sleeve and frictionally engaged to the drum pulley by a light coil spring 942 to damp out any tendency for the drum pulley to undergo a rotational rebound when unclutched. The flywheel 940 tends to keep rotating a short period and applies a friction force against the drum 876 to keep the return belt 882 taut until rebound tendencies are taken over by the light auxiliary carriage return belt coil spring 934.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A multiple bit code signal communication keyboard transmitter, printer and magnetic tape recorder-reader set including:
electronic controls and a common power supply unit for all three major components and a time base device for said keyboard transmitter;
electronic means in said keyboard transmitter for enabling encoding of keyboard selections in both parallel and serial form in sequential order;
and said electronic controls including a mode control means permitting selective code transmission output under control of said keyboard and of said recorder with monitoring in either case by said printer and including:
means enabling conjoint transmission of serial code form information from said keyboard transmitter, at a transmission rate controlled by said time base device, to said printer and of the same information in parallel code form from said keyboard transmitter to said recorder.

2. A keyboard transmitter, printer and tape recorder-reader set as defined in claim 1 wherein:
electronic means in said recorder enable receipt and storage of parallel code form information transmitted from said keyboard transmitter.

3. A keyboard transmitter, printer and tape recorder-reader set as defined in claim 2, wherein:
said electronic means in said recorder includes a high-speed parallel-to-serial code convertor and synchronizing clock pulsed recording means to record the said converted parallel-to-serial information on moving magnetizable tape in serial digital bit form.

4. A keyboard transmitter, printer and tape recorder-reader set as defined in claim 3, wherein:
said electronic means in said recorder further includes a high-speed serial-to-parallel code convertor, and means to playback and gate said serial digital form recording through said high-speed serial-to-parallel code convertor to transmit said coded information in parallel bit form.

5. A keyboard transmittter, printer and tape recorder set as defined in claim 4, wherein:
the electronic means in said keyboard transmitter includes a multiple parallel register group, low-speed parallel-to-serial code form convertor, and means to gate parallel code information under control of said time base device through said parallel code form convertor to an outgoing transmission line;
means connect the parallel code information and output of said recorder high-speed serial-to-parallel code convertor to corresponding inputs of said keyboard transmitter parallel code information register for low-speed transmission in serial form through said keyboard transmitter parallel-to-serial code information convertor.

6. A keyboard transmitter, printer and tape recorder-reader set as defined in claim 5, wherein:
said electronic controls include means to inhibit keyboard generation of coded signals in said parallel register whenever said recorder is transmitting playback information.

7. A multiple bit code signal communication transistorized keyboard transmitter, transistorized printer and transistorized magnetic tape recorder-reader set including:
electonic controls and a common power supply unit for all three major components;
means in said keyboard transmitter enabling keyboard generation of parallel code information bits;
means in said recorder-reader enabling playback and generation of parallel code information bits;
selectively controlled means in said keyboard transmitter enabling parallel-to-serial conversion of parallel code information bits, independently generated by either of said keyboard and said recorder, and serial transmission of such converted code information bits; and
said electronic controls enabling monitoring by said printer of the serial transmission of said converted code information bits.

8. A keyboard transmitter, printer and recorder-reader set as defined in claim 7, wherein:
a common chassis means mount all of said major components, said electronic controls and said power supply unit.

9. A multiple bit, coded data communication set comprising:
an encoding keyboard transmitter unit with keys including:
means including switches responsive to depression of a key on said keyboard for converting such depression movements to a permutated coded switch condition, representative of a code message unit assigned to the depressed key,
means responsive to such coded switch condition for creating a parallel bit registered electrical code condition, and means enabling
such parallel coded bit condition to be transmitted in serial bit form;
a magnetic tape recorder comprising combination recording and playback head means, and means for stepping the magnetic tape across said head and storing and playing back information signal units consisting of multiple code bits in digital serial form on the magnetic tape;
an electronically controlled, transistorized rotary type unit page printer comprising:
print hammer carriage means movable in spacing steps from left to right in front of said rotary type unit, and electronic control means providing coincidence between a multiple bit serial code signal received and impulse signals derived from said type unit rotational positions for causing a printing action between said print hammer carriage means and said type unit once per revolution of said type unit for each character to be printed and to thereafter space said carriage one step across the page; and
electronic mode control means selectively enabling:
keyboard generated multiple code bit parallel registered information to be transmitted by said keyboard transmitter to, and recorded by, said recorder and also to be transmitted in serial form,
recorder playback generated digital serial code bits to be converted to multiple bit parallel form and transmitted into said keyboard transmitter and therein creating a parallel bit registered code condition to be transmitted by said keyboard transmitter in serial form, and monitoring receipt by said printer electronic control means of serial form multiple transmission from said keyboard transmitter.

10. A multiple bit, coded data communication set comprising:

a keyboard transmitter unit with a plurality of character and function key levers comprising:

means to convert mechanical depression of any key lever into a permutation arrangement of on-off switch contacts, transistorized electronic means responsive to code switch operation by a depressed key for generating and transmitting both a parallel signal and a start-stop serial signal representative of the selected keyboard character or function;

a magnetic tape recorder, comprising a combination recording and playback head means, and means for stepping the magnetic tape across said head and storing and playing back information signal units consisting of multiple code bits in digital serial form on the magnetic tape;

an electronic transistorized drum printer including an automatic print hammer carriage return, comprising:

electronic control circuitry capable of receiving multiple serial information bits on an incoming line, means including a first register to be connected to said incoming line to convert and register serially received code signal units in parallel bit form, means determining whether such registered code unit bits call for printing of a character or for a machine function and determining, if a machine function is called for, what that machine function is, a second set of registers to receive said multiple bit parallel information from said first register to make room for receiving the next following character on the incoming line while the first character is being printed or while the represented function is being performed, a third register and means to shift the multiple code unit bits from said second register into the third register to provide storage for two additional characters during an automatic carriage return, and means providing coincidence control responsive to the code unit bits in said third register and to position pulses derived from print drum rotation, to determine when the character corresponding to the registered code signal is about to pass the print hammer, thereafter controlling printing action, clearing said third register, controlling subsequent operation of carriage spacing after the character is printed and enabling automatic control for operation of carriage return and line feed; and electronic mode control means selectively enabling:

keyboard generated multiple code bit parallel information to be transmitted to and recorded by, said recorder and also to be transmitted in serial form, recorder playback generated digital serial code bits to be converted to multiple bit parallel form and transmitted through said keyboard transmitter unit in start-stop serial signal form, and monitoring receipt by said printer electronic control circuitry of start-stop serial signals from said keyboard transmitter.

11. A multiple bit coded data communication set as defined in claim 10, wherein:

said mode control means includes means responsive to receipt by said printer of signals generated externally of said keyboard transmitter to inhibit transmission by said keyboard transmitter to said printer 12. A multiple bit, coded data communication set comprising:

a keyboard transmitter and tape recorder combination comprising:

interrelated electronic control circuitry, said keyboard transmitter portion having mechanism enabling encoding of key selected characters, means to transfer the encoded characters to keyboard electronic circuitry in parallel signal bit registered form and to selectively transfer such parallel form of signal information into recorder electronics or into said inter-related electronics for conversion to line speed, serial form code and subsequent transmission to a signal line, said recorder portion comprising electronic control circuitry connected to selectively receive parallel information signal bits from said keyboard registered parallel form signal bits and to convert such parallel signal bit information into high-speed serial digital pulses together with a plurality of synchronizing clock pulses and record both the high-speed serial digital information pulses and matching coincidence synchronizing pulses in parallel record tracks on a magnetizable record tape, selective means in said interrelated electronic controls enabling transmission by said recorder electronic circuitry of signals read from said tape during a playback operation accompanied by high-speed electronic conversion of such playback recorded serial pulses into parallel pulses and gating such pulses into the keyboard electronic circuitry in parallel signal bit registered form, whereby such playback signals may then be processed through the interrelated electronics for conversion to line speed, serial form code and transmission to said signal line;

an electronic transistorized rotary type unit page printer comprising:

a print hammer carriage means movable in spacing steps from left to right in front of said rotary type unit, and electronic control means providing coincidence between a serial form code signal received and impulse signals derived from said type unit rotational positions for causing a printing action between said print hammer carriage means and said type unit once per revolution of said type unit for each character to be printed and to thereafter space said carriage one step across the page; and means enabling monitoring by said printer of keyboard transmitter transmitted, serial form code signals.

13. A multiple bit, coded data communication set comprising: a keyboard transmitter unit with a plurality of character and function key levers and associated switches comprising means to convert mechanical depression of any key lever into a coded permutation arrangement of said switches, transistorized electronic means responsive to coded switch condition operation by a depressed key for generating and transmitting both a parallel signal and a start-stop serial signal representative of the selected keyboard character or function; a magnetic tape recorder comprising a combination recording and playback head means, and means for stepping the magnetic tape across said head and storing and playing back information signal units consisting of multiple code bits on the magnetic tape; an electronic transistorized drum printer, including an automatic print hammer carriage return, comprising electronic control circuitry capable of receiving multiple serial information bits on an incoming line, means including a first register to be connected to said incoming line to convert and register serially received code signal units in parallel bit form, means determining whether such registered code unit bits call for printing of a character or for a machine function and determining, if a machine function is called for, what that machine function is, a second register means to receive said multiple bit parallel information from said first register to make room for receiving the next following character on the incoming line while the first character is being printed or while the represented function is being performed and including means to provide storage for additional characters during an automatic carriage return, and means providing coincidence control responsive to code unit bits in storage in said second register means and to position pulses derived from print drum rotation, to determine when the character corresponding to the registered code signal is about to pass the print hammer, thereafter controlling printing action, clearing the storage of said second register means, controlling subsequent operation of carriage spacing after the character is printed and enabling automatic control for operation of carriage return and line feed; and electronic mode control means selectively enabling keyboard generated multiple code bit parallel information to be transmitted to, and recorded by, said recorder and also to be transmitted in serial form, recorder playback generated digital serial code bits to be converted to multiple bit parallel form and transmitted through said keyboard transmitter unit in start-stop serial signal form, and monitoring receipt by said printer electronic control circuitry of start-stop serial signals from said keyboard transmitter.

References Cited by the Examiner

UNITED STATES PATENTS

| | | | |
|---|---|---|---|
| 1,998,555 | 4/1935 | Norton | 197—23 |
| 2,267,915 | 12/1941 | Henry | 197—23 |
| 2,375,902 | 5/1945 | Ehrenberg | 178—80 |
| 2,770,304 | 11/1956 | Tholstrup | 178—17.5 |
| 2,859,276 | 11/1958 | Saykay | 178—79 |
| 2,860,325 | 11/1958 | Welsh et al. | 178—17.5 |
| 2,972,016 | 2/1961 | Dirks | 178—23 |
| 3,006,997 | 10/1961 | Evensen | 178—17 |
| 3,013,119 | 12/1961 | Brown | 178—25 |
| 3,016,423 | 1/1962 | Ambrosio et al. | 178—79 |
| 3,018,332 | 1/1962 | Johnson et al. | 178—17 |
| 3,018,721 | 1/1962 | Monticello et al. | 101—93 |
| 3,025,348 | 3/1962 | Handley | 178—25 |
| 3,059,048 | 10/1962 | Lamin et al. | 178—17.5 |
| 3,064,561 | 11/1962 | Mauduit | 101—93 |
| 3,084,219 | 4/1963 | Durkee | 178—23 |
| 3,156,181 | 11/1964 | Dubin | 101—110 |
| 3,157,116 | 11/1964 | Reiner | 101—110 |

NEIL C. READ, *Primary Examiner.*

ROBERT H. ROSE, *Examiner.*

A. J. DUNN, T. A. ROBINSON, *Assistant Examiners.*